US012747183B2

(12) United States Patent
Amma et al.

(10) Patent No.: US 12,747,183 B2
(45) Date of Patent: Sep. 29, 2026

(54) OPTICAL FIBER PREFORM PRODUCTION METHOD, OPTICAL FIBER PREFORM, AND OPTICAL FIBER PRODUCTION METHOD

(71) Applicant: Fujikura Ltd., Tokyo (JP)

(72) Inventors: Yoshimichi Amma, Sakura (JP); Katsuhiro Takenaga, Sakura (JP); Ryohei Fukumoto, Sakura (JP)

(73) Assignee: Fujikura Ltd., Tokyo (JP)

( * ) Notice: Subject to any disclaimer, the term of this patent is extended or adjusted under 35 U.S.C. 154(b) by 93 days.

(21) Appl. No.: 18/491,956

(22) Filed: Oct. 23, 2023

(65) Prior Publication Data

US 2024/0051865 A1 Feb. 15, 2024

Related U.S. Application Data

(62) Division of application No. 16/636,820, filed as application No. PCT/JP2018/029563 on Aug. 7, 2018, now Pat. No. 11,834,365.

(30) Foreign Application Priority Data

Aug. 9, 2017 (JP) ................................ 2017-154691
Jun. 27, 2018 (JP) ................................ 2018-122427

(51) Int. Cl.
*C03B 37/027* (2006.01)
*C03B 37/012* (2006.01)
*G02B 6/02* (2006.01)

(52) U.S. Cl.
CPC .. *C03B 37/02718* (2013.01); *C03B 37/01222* (2013.01); *G02B 6/02042* (2013.01)

(58) Field of Classification Search
None
See application file for complete search history.

(56) References Cited

U.S. PATENT DOCUMENTS 5,735,927 A 4/1998 Sanghera et al.
5,917,109 A * 6/1999 Berkey .............. G02B 6/03627 65/412

(Continued)

FOREIGN PATENT DOCUMENTS

CN 1284049 A 2/2001
CN 1782756 A 6/2006

(Continued)

OTHER PUBLICATIONS

International Search Report issued in corresponding International Application No. PCT/JP2018/029563 mailed Oct. 23, 2018 (1 page).

(Continued)

*Primary Examiner* — Queenie S Dehghan
(74) *Attorney, Agent, or Firm* — Osha Bergman Watanabe & Burton LLP

(57) ABSTRACT

An optical fiber preform includes: a cladding glass body that is a cladding of an optical fiber, is cylindrical, and comprises an inner hole along an axial direction; a glass rod accommodated in the inner hole; and a dummy silica rod selected from either one of a first solid dummy silica rod fixed to a first end of the cladding glass body that closes a first end of the inner hole positioned at the first end of the cladding glass body, or a second solid dummy silica rod accommodated and integrated in a connecting glass tube fixed to the first end to close a first tip opening end of the connecting glass tube. A tip seal that closes a second end of the inner hole at a second end of the cladding glass body is provided in the second end of the cladding glass body.

10 Claims, 32 Drawing Sheets

(56) References Cited

U.S. PATENT DOCUMENTS

| | | | | |
|---|---|---|---|---|
| 6,460,378 | B1 | 10/2002 | Dong et al. | |
| 6,584,808 | B1 * | 7/2003 | Roba | C03B 37/02754<br>65/412 |
| 2003/0145630 | A1 | 8/2003 | Hirano et al. | |
| 2004/0206128 | A1 | 10/2004 | Zilnyk | |
| 2016/0075590 | A1 * | 3/2016 | Gonda | C03B 37/01222<br>65/409 |
| 2016/0257599 | A1 * | 9/2016 | Trevor | C03B 37/01257 |
| 2018/0244556 | A1 | 8/2018 | Nagashima et al. | |
| 2018/0244557 | A1 * | 8/2018 | Nagashima | C03B 37/0126 |

FOREIGN PATENT DOCUMENTS

| | | | |
|---|---|---|---|
| JP | H11-139841 | A | 5/1999 |
| JP | 2003-146681 | A | 5/2003 |
| JP | 2003-294969 | A | 10/2003 |
| JP | 2004-123468 | A | 4/2004 |
| JP | 2006-160550 | A | 6/2006 |
| JP | 2014-201494 | A | 10/2014 |
| JP | 2017-014078 | A | 1/2017 |

OTHER PUBLICATIONS

Office Action issued in related U.S. Appl. No. 16/636,820 dated Nov. 23, 2021 (9 pages).
Office Action issued in related U.S. Appl. No. 16/636,820 dated Jun. 2, 2022 (11 pages).
Office Action issued in related U.S. Appl. No. 16/636,820 dated Dec. 22, 2022 (6 pages).
Office Action issued in related U.S. Appl. No. 16/636,820 dated May 1, 2023 (6 pages).

* cited by examiner

OPTICAL FIBER PREFORM PRODUCTION METHOD, OPTICAL FIBER PREFORM, AND OPTICAL FIBER PRODUCTION METHOD

CROSS-REFERENCE TO RELATED APPLICATIONS

This is a divisional application of U.S. patent application Ser. No. 16/636,820 filed on Feb. 5, 2020, which is a national stage of International Patent Application No. PCT/JP2018/029563 filed on Aug. 7, 2018, which claims priority to Japanese Patent Application No. 2017-154691 filed in Japan on Aug. 9, 2017, and Japanese Patent Application No. 2018-122427 filed in Japan on Jun. 27, 2018. The contents of these applications are incorporated herein by reference in their entirety.

TECHNICAL FIELD

The present invention relates to an optical fiber preform production method, an optical fiber preform, and an optical fiber production method.

BACKGROUND ART

In recent years, optical fibers having various structures have been proposed in order to realize increases in the transmission capacity of optical fiber communication systems. One example thereof is a multi-core fiber. A multi-core fiber has a structure in which the outer periphery of a plurality of cores is surrounded by a single cladding and it is possible to transmit a plurality of signals by light propagating through each core. For this reason, it is possible for the multi-core fiber to greatly increase the amount of transmission information in comparison with an optical fiber having only one core.

Various proposals have also been made regarding preform production methods used for producing an optical fiber, according to the structure of the optical fiber. For example, as production methods for obtaining a preform for producing a multi-core fiber (also referred to below as a multi-core fiber preform), a hole opening method (a piercing method) and a stack and draw method are known.

In the hole opening method, first, a plurality of through-holes are formed in a glass rod which is a cladding using a drill or the like. Then, core rods which form the cores of multi-core fibers are inserted in each through-hole and these are heated and integrated to form a multi-core fiber preform.

In the stack and draw method, a glass tube having a through-hole and core-covered rods in which the core rods are covered with cladding glass layers are used. The glass tube forms an outer peripheral portion of the cladding. The core rods form the cores of the multi-core fiber. The cladding glass layers of the core-covered rods form a part of the cladding. Core-covered rods are inserted into the through-hole of the glass tube and a plurality of glass rods are inserted into the gaps between the glass tube and the core-covered rods and are heated and integrated to form a multi-core fiber preform.

A step of drawing a multi-core fiber from a preform produced by the hole opening method or stack and draw method is often performed by vacuum suctioning the inside of the preform from one of the end (also referred to as the base end) opposite to the end of the preform being drawn.

The vacuum suctioning inside the preform specifically uses a dummy tube made of glass, which is attached by welding to the preform base end so as to extend coaxially to the preform from the preform base end. A connector for tube connection is attached to the dummy tube, a vacuum pump is connected to the connector via a tube, and vacuum pressure generated by the vacuum pump is applied to the inside of the preform via the tube, connector, and dummy tube (for example, PTL 1).

Here, the producing of the preform by the hole opening method or the stack and draw method is also used for producing a preform used for producing optical fibers other than multi-core fibers. In addition, the drawing of optical fibers while carrying out vacuum suctioning from a base end in a preform obtained by a hole opening method or a stack and draw method is also used for the producing of optical fibers other than multi-core fibers. For example, it is also possible to produce a preform by inserting glass rods other than core rods into the through-holes of the glass tubes.

PATENT LITERATURE

[PTL 1] Japanese Unexamined Patent Publication, First Publication No. 2014-201494

The total length of a preform with an attached dummy tube in which the dummy tube is welded to the preform base end is restricted because the length of the preform which is able to be installed in a drawing device is limited. In addition, in order to prevent sealing components from being heated by heat conducted from the preform, it is necessary to secure a large distance between the connector attached to the dummy tube and the preform. In a case where a large distance is secured between the connector attached to the dummy tube and the preform, it may be difficult to secure the length of a region (referred to below as an effective drawing region) used for drawing the optical fiber of the preform in the axial direction.

The dummy tube is welded so as to abut the outer peripheral portion of the base end of the preform. The dummy tube has a cylindrically shaped configuration which secures a space communicating with a gap in the preform, on the inner side thereof.

When the preform to which the dummy tube is welded enters into a heating furnace, there is a possibility that the dummy tube may be destroyed due to heat some time before entering the heat zone (the most heated region) of the heating furnace. The phenomenon may occur before completing to draw the effective drawing region of the preform. For this reason, in order to avoid the deformation and destruction of the dummy tube by the heat, there were cases where the region (referred to below as a residual preform length) in the preform which is left without being drawn may be secured at certain length. In a case where the residual preform length is increased, it is difficult in some cases to secure the length of the effective drawing region in the axial direction in the preform.

SUMMARY

One or more embodiments of the present invention provide an optical fiber preform production method, an optical fiber preform, and an optical fiber production method, which are able to realize a reduction in the length of a residual preform and an increase in the length of an effective drawing region in the preform.

An optical fiber preform production method according to one or more embodiments of the present invention includes a rod inserting step of inserting at least one glass rod into at least one through-hole penetrating a cladding glass body which forms a cladding of an optical fiber, a dummy rod integrating step selected from either one step of a step of integrating a solid dummy silica rod with a first end portion (first end) of the cladding glass body by heating the first end portion of the cladding glass body, so as to close a first opening portion of the through-hole that opens in the first end portion of the cladding glass body, or a step of forming a base end sealing portion (base end seal) which closes the first opening portion (first opening) of the cladding glass body in the first end portion of the cladding glass body and integrating a solid dummy silica rod with the base end sealing portion, and a tip sealing step of closing a second opening portion (second opening) of the through-hole, which opens in a second end portion (second end) of the cladding glass body, by heating and deforming the second end portion of the cladding glass body, in which the rod inserting step is performed before completion of at least one of the dummy rod integrating step and the tip sealing step, and an inner hole is formed by sealing both ends of the through-hole by the rod inserting step, the dummy rod integrating step, and the tip sealing step.

In the optical fiber preform production method according to the first aspect, the cladding glass body may be formed in a cylindrical shape and includes one through-hole, the cladding glass body accommodates a plurality of glass rods including the glass rod in the one through-hole, the plurality of glass rods may be inserted into the one through-hole of the cladding glass body in the rod inserting step, and in the dummy rod integrating step, the dummy silica rod may be inserted into the first opening portion of the cladding glass body, the dummy silica rod and the cladding glass body may be integrated by heating the first end portion of the cladding glass body, and the first opening portion of the cladding glass body may be closed.

An optical fiber preform production method according to one or more embodiments of the present invention may include a rod inserting step of inserting a glass rod into a through-hole penetrating a cladding glass body which forms a cladding of an optical fiber, a dummy rod integrating step of inserting a solid dummy silica rod into a connecting glass tube welded in advance to a first end portion of the cladding glass body, heating the connecting glass tube to integrate the dummy silica rod and the connecting glass tube, and closing a first tip opening end of the connecting glass tube, and a tip sealing step of closing a second opening portion of the through-hole which opens in a second end portion of the cladding glass body by heating and deforming the second end portion of the cladding glass body, in which the rod inserting step is performed before completion of at least one of the dummy rod integrating step and the tip sealing step, and an inner hole is formed by sealing both ends of the through-hole by the rod inserting step, the dummy rod integrating step, and the tip sealing step.

In the optical fiber preform production method according to the first and second aspects, when the tip sealing step is performed after completion of the rod inserting step and the dummy rod integrating step, the second opening portion of the cladding glass body may be closed by heating and deforming the second end portion of the cladding glass body while vacuum suctioning the inside of the through-hole of the cladding glass body from the second end portion of the cladding glass body.

In the optical fiber preform production method according to the first and second aspects, the dummy rod integrating step and the tip sealing step may be performed in a state where the glass rod is away from at least one of the first end portion and the second end portion of the cladding glass body in an axial direction of the cladding glass body such that a region in which the glass rod is not inserted into the through-hole is secured, and a gap portion in which the glass rod is not inserted into the inside of the through-hole in the axial direction may be secured on the side near to the first end portion of the cladding glass body when the tip sealing step is completed.

An optical fiber preform production method according to one or more embodiments of the present invention includes a silica powder filling step of inserting a glass rod into a through-hole penetrating a cladding glass body which forms a cladding of an optical fiber, sealing a first opening portion of the through-hole, which opens in a first end portion of the cladding glass body, with a solid dummy silica rod integrated at the first end portion of the cladding glass body, and filling the through-hole of the cladding glass body with silica powder from a second end portion of the cladding glass body, and a second end portion sealing step of heating and deforming the second end portion to seal a second opening portion of the through-hole which opens in the second end portion of the cladding glass body, and forming an inner hole with a configuration in which both ends of the through-hole are sealed.

The optical fiber preform production method of the third aspect may include a base end dummy rod integrating step which is included in the second end portion sealing step, the base end dummy rod integrating step of heating a base end sealing portion formed by sealing the second opening portion of the cladding glass body and integrating a solid dummy silica rod with the base end sealing portion, in which, in the second end portion sealing step, the base end sealing portion may be formed by heating and deforming a portion where the silica powder is not present in the second end portion of the cladding glass body, a gap portion in which the silica powder is not present is secured between the base end sealing portion and a region in which the through-hole is filled with the silica powder in the axial direction of the cladding glass body.

In the optical fiber preform production methods of the first, second, and third aspects, an internal pressure secured in the inner hole may be 20 kPa or less.

In the optical fiber preform production methods of the first, second, and third aspects, an internal pressure secured in the inner hole may be 1 kPa or less.

An optical fiber preform according to one or more embodiments of the present invention includes a cladding glass body which forms a cladding of an optical fiber, and which is formed in a cylindrical shape and having an inner hole formed along an axial direction of the cylindrical shape, a glass rod accommodated in the inner hole, and a dummy silica rod selected from either one of a solid dummy silica rod fixed to a first end portion of the cladding glass body and closing a first end portion (first end) of the inner hole positioned at the first end portion of the cladding glass body or a solid dummy silica rod accommodated and integrated in a connecting glass tube fixed to the first end portion of the cladding glass body so as to close a first tip opening end of the connecting glass tube, in which a tip sealing portion (tip seal) which closes a second end portion (second end) of the inner hole positioned at a second end portion of the cladding glass body is provided in the second end portion of the cladding glass body.

In the optical fiber preform of the fourth aspect, a gap portion in which the glass rod is not inserted into the inside of the inner hole in the axial direction may be secured on side near to the first end portion of the cladding glass body.

In the optical fiber preform according to the fourth aspect, the inner hole may accommodate silica powder in a sufficient quantity to fill the entire inner hole, or in a quantity to be capable of securing a gap portion in which silica powder is not present in an inside of the inner hole in the axial direction.

In the optical fiber preform of the fourth aspect, an internal pressure of the inner hole may be 20 kPa or less.

In the optical fiber preform of the fourth aspect, an internal pressure of the inner hole may be 1 kPa or less.

An optical fiber production method according to one or more embodiments of the present invention includes inserting the optical fiber preform of one or more embodiments into a heating furnace from the tip sealing portion to be heated, and continuously feeding the optical fiber preform into the heating furnace such that an optical fiber is continuously drawn from the tip sealing portion while the glass rod is integrated with the cladding glass body.

According to the optical fiber preform production method, the optical fiber preform, and the optical fiber production method according one or more embodiments of the present invention, it is possible to realize a reduction in the length of a residual preform and an increase in the length of an effective drawing region in a preform and, as a result, it is possible to realize an increase in the drawing length of an optical fiber.

DETAILED DESCRIPTION

An optical fiber preform production method, an optical fiber preform, and an optical fiber production method according to one or more embodiments of the present invention will be described below with reference to the drawings.

First, one or more embodiments of an optical fiber preform production method, an optical fiber preform, and an optical fiber production method will be described with reference to FIG. 1 to FIG. 6.

Figure 6:
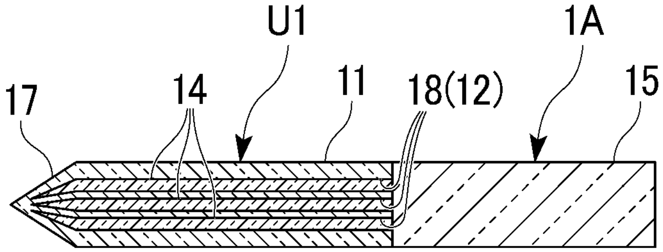
FIG. 6 is a cross-sectional view showing a structure of an optical fiber preform obtained by completing the tip sealing step of FIG. 5.

An optical fiber preform 1A shown in FIG. 6 is produced by the optical fiber preform production method of one or more embodiments.

<Definitions of Directions>

Here, in one or more embodiments of the present embodiment, the direction along a central axis of the optical fiber preform 1A is referred to as an axial direction. In addition, a cross-sectional view perpendicular to the central axis is referred to as a vertical cross-sectional view and a cross-sectional view along the central axis is referred to as a longitudinal cross-sectional view.

In addition, each component will be described with the right side end of the drawing as the first end portion and the left side end as the second end portion. For example, in both ends of the cladding glass body 11 in the axial direction, the right side end in FIG. 1 to FIG. 6 is referred to as a first end portion 11*a* and the left side end is referred to as a second end portion 11*b*.

Figure 1:
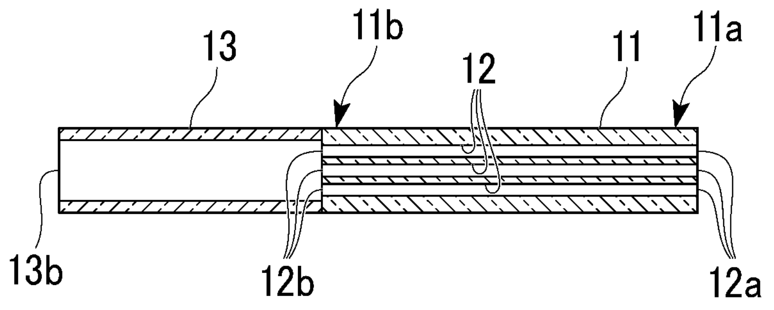
FIG. 1 is a cross-sectional view for illustrating a dummy silica tube welding step of an optical fiber preform production method according to one or more embodiments of the present invention.

As shown in FIG. 1, in the optical fiber preform production method of one or more embodiments, first, a cladding glass body 11 with a cylindrical shape in which a plurality of through-holes 12 are formed is prepared and a dummy silica tube 13 is welded and connected to the second end portion 11*b* in the axial direction of the cladding glass body 11 (a dummy silica tube welding step).

The entire cladding glass body 11 is an integrally molded product made of silica glass.

The plurality of through-holes 12 of the cladding glass body 11 are formed to penetrate the cladding glass body 11 in parallel to the central axis thereof. The through-holes 12 are open on both end surfaces of the cladding glass body 11 in the axial direction. The opening portions of the through-holes 12 which open in the first end portion 11*a* of the cladding glass body 11 are first opening portions (opening portions) 12*a* and the opening portions of the through-holes 12 which open in the second end portion 11*b* of the cladding glass body 11 are second opening portions (opening portions) 12*b*.

The plurality of through-holes 12 of the cladding glass body 11 are formed so as to surround the central axis of the cladding glass body 11, for example.

FIG. 1 to FIG. 6 schematically show the arrangement of the plurality of through-holes 12 in the cladding glass body 11. The plurality of through-holes 12 of the cladding glass body 11 shown in FIG. 1 to FIG. 6 are not explicitly shown the positions of the through-holes 12 in the vertical cross-sectional view of the cladding glass body 11. FIG. 1 to FIG. 6 show some or all of the plurality of through-holes 12 of the cladding glass body 11.

The dummy silica tube 13 is a cylindrically shaped member made of silica glass.

As shown in FIG. 1, the dummy silica tube 13 is welded and integrated with the cladding glass body 11 such that the end surface of one end in the axial direction thereof abuts the end surface of the second end portion 11*b* of the cladding glass body 11.

The dummy silica tube 13 is welded to the cladding glass body 11 so as to be coaxial with the cladding glass body 11.

The plurality of through-holes 12 of the cladding glass body 11 are formed in a region inside the outer peripheral portion of the cladding glass body 11 in a vertical cross-sectional view. The through-hole 12 are not positioned in the outer peripheral portion of the cladding glass body 11 in a vertical cross-sectional view.

The dummy silica tube 13 is arranged so as not to seal each second opening portion 12*b* of the cladding glass body 11 when welded coaxially to the cladding glass body 11. For example, the inner diameter of the dummy silica tube 13 is set to a size at which it is possible to maintain the open state of at least a part of each of the second opening portions 12*b*. That is, the dummy silica tube 13 welded to the cladding glass body 11 may overlap a part of each of the second opening portions 12*b*. The inner space of the dummy silica tube 13 welded to the cladding glass body 11 communicates with all of the through-holes 12 of the cladding glass body 11.

The dummy silica tube welding step may be performed while dry air (for example, air or an inert gas) flows so as to pass from each through-hole 12 on the first end portion 11*a* side of the cladding glass body 11 to the second end portion 11*b* side to which the dummy silica tube 13 is welded. The dry air supplied to each of the through-holes 12 of the cladding glass body 11 is discharged from between the cladding glass body 11 and the dummy silica tube 13 after passing through the through-holes 12 until the dummy silica tube 13 is connected (welded) to the cladding glass body 11. In addition, after the dummy silica tube 13 is connected (welded) to the cladding glass body 11, the dry air supplied to each of the through-holes 12 of the cladding glass body 11 passes through the inner space of the through-holes 12 and the dummy silica tube 13 to be discharged from the opening portion (second tip opening end 13*b*) of the end on the opposite side (the left side in FIG. 1) to the cladding glass body 11 of the dummy silica tube 13.

Dry air is supplied to each of the through-holes 12 of the cladding glass body 11 in the dummy silica tube welding step. Due to this, it is possible to prevent moisture from entering each of the through-holes 12 of the cladding glass body 11, the moisture produced by an oxyhydrogen flame used for welding the dummy silica tube 13 to the cladding glass body 11.

In addition, it is possible to prevent impurities in the atmosphere from entering the through-holes 12 of the cladding glass body 11 by supplying dry air to each of the through-holes 12 of the cladding glass body 11 in the dummy silica tube welding step.

In addition, supplying dry air to each of the through-holes 12 of the cladding glass body 11 in the dummy silica tube welding step makes it possible to prevent the through-holes 12 from being closed due to the end surface of the cladding glass body 11 being melted by heating during the welding operation.

In addition, in the dummy silica tube welding step, for example, the operation of welding the dummy silica tube 13 to the cladding glass body 11 may be performed while supplying dry air from both the first end portion of each of the through-holes 12 of the cladding glass body 11 and the second tip opening end 13*b* of the dummy silica tube 13. The dry air supplied from both the first end portions of the through-holes 12 and the second tip opening end 13*b* of the dummy silica tube 13 is discharged from between the cladding glass body 11 and the dummy silica tube 13 until the dummy silica tube 13 is connected (welded) to the cladding glass body 11. However, in the case of supplying dry air from both the first end portions of the through-holes 12 and the second tip opening end 13*b* of the dummy silica tube 13, the total supply flow rate of the dry air from the first end portion of each through-hole 12 of the cladding glass body 11 is set to be larger than the supply flow rate of the dry air from the second tip opening end 13*b* of the dummy silica tube 13.

The supply of dry air from the first end portion of each through-hole 12 of the cladding glass body 11 and the second tip opening end 13*b* of the dummy silica tube 13 stops before the connection (welding) of the dummy silica tube 13 to the cladding glass body 11 is completed, and after the dummy silica tube 13 contacts the cladding glass body 11. After the dummy silica tube 13 is connected (welded) to the cladding glass body 11, a dry air outlet such as a leak valve is secured at the second tip opening end 13*b* of the dummy silica tube 13, dry air is supplied only from the first end portions of each of the through-holes 12 of the cladding glass body 11, and the supplied dry air is discharged from the dry air outlet.

Figure 2:
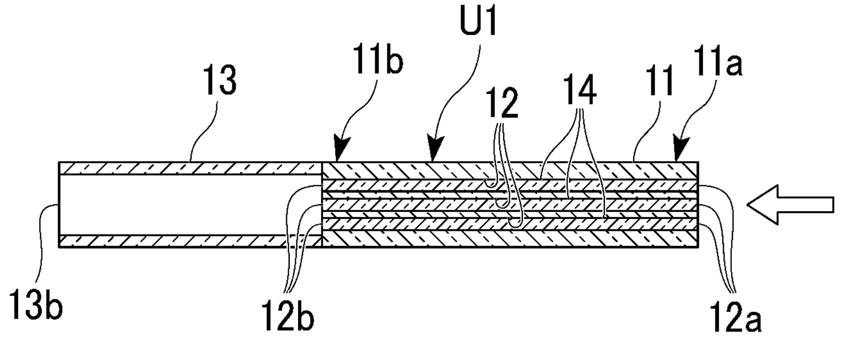
FIG. 2 is a cross-sectional view for illustrating a rod inserting step performed after the step of FIG. 1.

As shown in FIG. 2, after the dummy silica tube welding step, glass rods 14 (also referred to below as core glass rods) are inserted into each of the plurality of through-holes 12 of the cladding glass body 11 (rod inserting step). The glass rods 14 become the core of the optical fiber due to the drawing of the optical fiber preform 1A (refer to FIG. 6).

The core glass rods 14 are inserted into the through-holes 12 from the first opening portions 12*a* of the cladding glass body 11, for example. However, the insertion of the core glass rods 14 into the through-holes 12 of the cladding glass body 11 may be performed from the second tip opening end 13*b* side of the dummy silica tube 13.

In the rod inserting step, a core identifying marker glass rod may be inserted into one or more among the plurality of through-holes 12 of the cladding glass body 11, instead of the core glass rods 14. As the core identifying marker glass rod, for example, it is possible to adopt a glass rod having a different refractive index from both the cladding glass body 11 and the core glass rods 14, a glass rod formed of colored glass or the like, or a glass rod with a known configuration. It is possible to perform the insertion of the core identifying marker glass rod into the through-holes 12 of the cladding glass body 11 in the same manner as the insertion of the core glass rods 14 into the through-holes 12 of the cladding glass body 11.

In the rod inserting step, a glass material unit U1 with a configuration in which the core glass rods 14 are inserted into each of the plurality of through-holes 12 of the cladding glass body 11 is obtained.

Between the dummy silica tube welding step and the rod inserting step, an etching step for etching the inner surface of each of the through-holes 12 of the cladding glass body 11 with an etching gas or an etching solution, a cleaning step for cleaning the insides of the through-holes 12, and a drying step may be performed.

As the etching gas used in the etching step, it is possible to adopt, for example, $SF_6$ (sulfur hexafluoride) gas, $C_2F_6$ (ethane hexafluoride) gas, or the like. As the etching solution, for example, it is possible to adopt hydrofluoric acid (HF) or the like.

In the cleaning step, for example, a cleaning liquid such as an alcohol such as ethanol or pure water is passed through the through-holes 12 to clean the insides of the through-holes 12. In the drying step, after the cleaning step, the through-holes 12 are dried by causing dry air (such as air or an inert gas) to flow through the through-holes 12.

Figure 3:
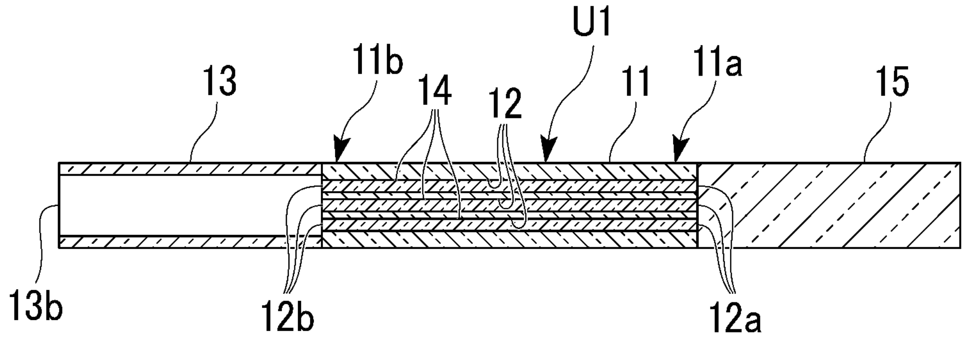
FIG. 3 is a cross-sectional view for illustrating a dummy rod integrating step performed after the step of FIG. 2.

Following the rod inserting step, as shown in FIG. 3, a solid dummy silica rod 15 made of silica glass is welded and integrated with the first end portion 11*a* of the cladding glass body 11. Due to this, the first opening portions 12*a* of the cladding glass body 11 are closed and hermetically sealed by the dummy silica rod 15 (dummy rod integrating step).

In one or more embodiments, the dummy silica rod 15 is coaxially aligned, welded, and integrated with the cladding glass body 11 so as to abut the end surface of the first end portion 11*a* of the cladding glass body 11.

The dummy silica rod 15 is formed in a cylindrical shape. As the dummy silica rod 15, a dummy silica rod having an outer diameter capable of closing all the first opening portions 12*a* of the cladding glass body 11 when welded to the cladding glass body 11 is used.

The welding of the dummy silica rod 15 to the cladding glass body 11 may be performed while supplying dry air from the second tip opening end 13*b* of the dummy silica tube 13 to each through-hole 12 of the cladding glass body 11 through the inner space of the dummy silica tube 13.

The dry air supplied from the second tip opening end 13*b* of the dummy silica tube 13 to each through-hole 12 of the cladding glass body 11 is continuously discharged from the first opening portions 12*a* until the first opening portions 12*a* of the cladding glass body 11 are closed by the end surface of the dummy silica rod 15. Therefore, in each of the through-holes 12 of the cladding glass body 11, the flow of the dry air from the second end portion 11*b* side of the cladding glass body 11 to the first end portion 11*a* side is maintained until the first opening portions 12*a* of the cladding glass body 11 are closed by the end surface of the dummy silica rod 15. As a result, it is possible to prevent moisture, other impurities, and the like from entering the through-holes 12 from the first end portion 11*a* side of the cladding glass body 11 in the operation of welding the dummy silica rod 15 to the cladding glass body 11.

Figure 4:
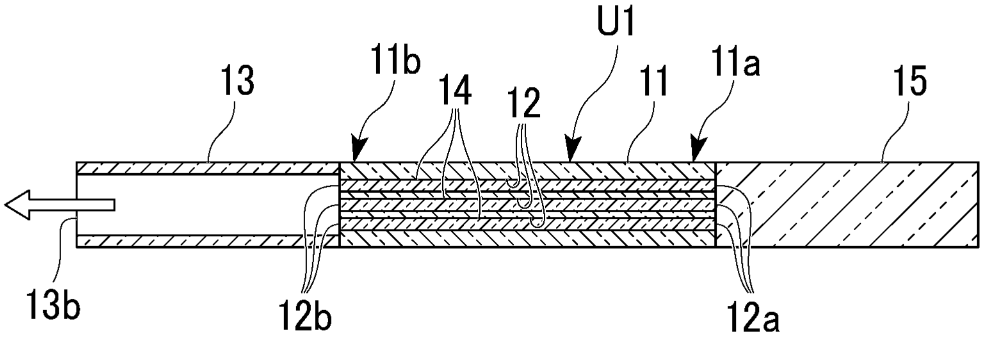
FIG. 4 is a cross-sectional view for illustrating a vacuum suctioning step performed after the step of FIG. 3.

Following the dummy rod integrating step, as shown in FIG. 4, a vacuum pump (not shown) is connected to the second tip opening end 13*b* of the dummy silica tube 13, and the insides of the through-holes 12 of the cladding glass body 11 are vacuum suctioned by driving the vacuum pump (vacuum suctioning step).

In the vacuum suctioning step, the insides of all the through-holes 12 of the cladding glass body 11 are vacuum suctioned from the second end portion 11*b* side of the cladding glass body 11 through the inner space of the dummy silica tube 13.

In the vacuum suctioning step, for example, it is also possible to alternately perform the supply of helium gas from the gas supply apparatus connected to the second tip opening end 13*b* of the dummy silica tube 13 to the through-holes 12 of the cladding glass body 11 and the vacuum suctioning by the vacuum pump.

Figure 5:
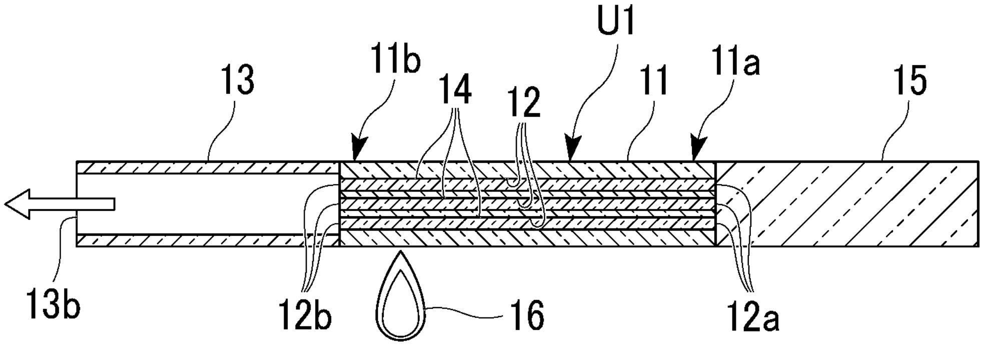
FIG. 5 is a cross-sectional view for illustrating thermal cutting of a second end portion tip of the cladding glass body in the tip sealing step performed after the step of FIG. 4.

As shown in FIG. 5 and FIG. 6, in the optical fiber preform production method of one or more embodiments, after starting the vacuum suctioning step, in a state where the vacuum suctioning by the vacuum pump continues, the second opening portions 12*b* of the cladding glass body 11 are closed and hermetically sealed by heating and reducing the diameter of the second end portion of the glass material unit U1 including the second end portion 11*b* of the cladding glass body 11 using a flame 16 (for example, an oxyhydrogen flame) or the like (tip sealing step).

The second end portion of the glass material unit U1 in a state where all the second opening portions 12*b* are hermetically sealed in the tip sealing step is also referred to below as a tip sealing portion 17. The tip sealing portion 17 is solidified and formed by heating and reducing the diameter of the second end portion 11*b* of the cladding glass body 11 together with the tip end portions of the core glass rods 14 on the insides thereof.

In addition, in a case where the core identifying marker glass rod is inserted in one or more of the through-holes 12 of the cladding glass body 11, the tip sealing portion 17 is formed with a configuration solidified by heating and reducing the diameter of the second end portions 11*b* of the cladding glass body 11 together with the tip end portions of the core glass rods 14 on the insides thereof and the tip end portion of the core identifying marker glass rod.

As shown in FIG. 6, in the tip sealing step of one or more embodiments, the tip sealing portion 17 in which the second end portion of the glass material unit U1 is processed into a tapered shape at the tip is formed.

In addition, in the tip sealing step of one or more embodiments, the tip of the second end portion of the glass material unit U1 is thermal cut in the process of forming the tip sealing portion 17 with a tapered shape at the tip to remove the dummy silica tube 13 from the cladding glass body 11.

The optical fiber preform production method of one or more embodiments is completed by completing the tip sealing step and enables the optical fiber preform 1A shown in FIG. 6 to be obtained.

In the inside of the cladding glass body 11 of the optical fiber preform 1A of FIG. 6, the first end portions of the through-holes 12 are hermetically sealed by the dummy silica rod 15, and the second end portions are hermetically sealed by the tip sealing portion 17. That is, in the inside of the cladding glass body 11, a plurality of inner holes 18 in which both ends of the through-holes 12 are sealed are secured. Since the inner holes 18 are spaces formed in the inside of the cladding glass body 11, similarly to the through-holes 12, the inner holes 18 may be referred to below as inner holes 18 (12).

In the optical fiber preform production method of one or more embodiments, the tip sealing portion 17 is formed by performing the tip sealing step while continuing to vacuum suction the through-holes 12 by the vacuum pump. For this reason, the pressure (atmospheric pressure) in the inner holes 18 of the optical fiber preform 1A after completion of the tip sealing step is a negative pressure (negative pressure with respect to atmospheric pressure).

In the tip sealing step, the second end portion 11*b* of the cladding glass body 11 is heated and reduced in diameter so as to be solidified and the second end portion 11*b* of the cladding glass body 11 softened by the heating is processed into a tapered shape to form the tip sealing portion 17.

The internal pressure of the inner holes 18 secured by the formation of the tip sealing portion 17 in the tip sealing step is equal to the pressure of the through-holes 12 of the cladding glass body 11 before the tip sealing portion 17 is formed by the vacuum pump.

In the tip sealing step, the tip sealing portion 17 is formed in a state where the insides of the through-holes 12 of the cladding glass body 11 are reduced from atmospheric pressure by approximately 100 kPa using a vacuum pump. The internal pressure of the through-holes 12 of the cladding glass body 11 after forming the tip sealing portion 17 is suitably 1 kPa or less. In the tip sealing step, by forming the tip sealing portion 17 while setting the internal pressure of the through-holes 12 of the cladding glass body 11 to 1 kPa or less, the optical fiber preform 1A having the inner holes 18 with an internal pressure of 1 kPa or less is obtained.

Figure 7:
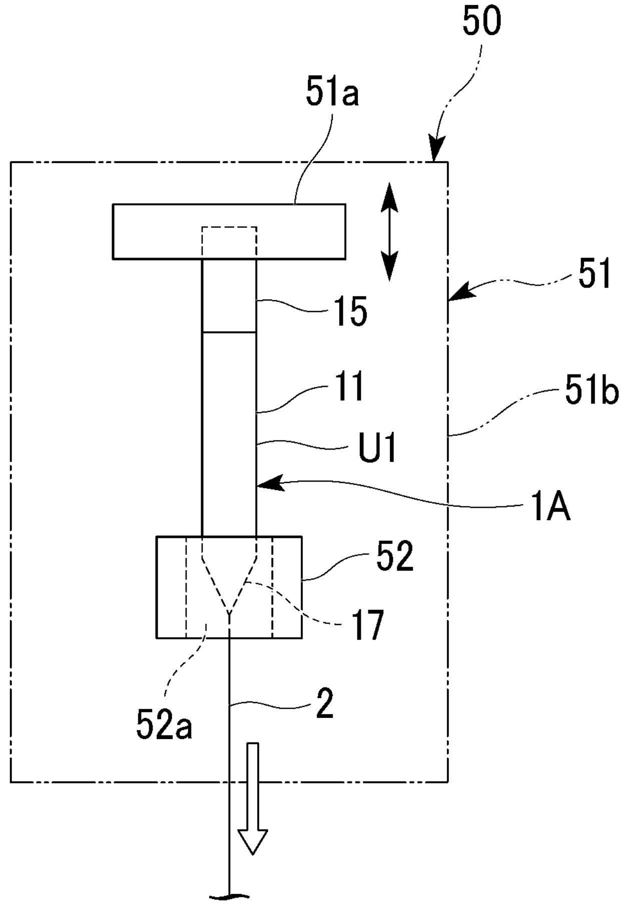
FIG. 7 is a front view showing an example of a drawing device for drawing an optical fiber from an optical fiber preform.

FIG. 7 is a diagram for illustrating a production method for producing the optical fiber 2 by drawing from the optical fiber preform 1A attached to the drawing device 50 (optical fiber production method). The step of producing the optical fiber 2 by drawing from the optical fiber preform 1A attached to the drawing device 50 is referred to below as a drawing step.

As shown in FIG. 7, the drawing device 50 has a preform lifting device 51 which suspends the optical fiber preform 1A, and a ring-shaped heating furnace 52 for heating a lower end portion (tip sealing portion 17) of the optical fiber preform 1A suspended by the preform lifting device 51. The preform lifting device 51 has a lifting frame 51*a* and a lifting device main body 51*b* which lifts the lifting frame 51*a*. The lifting frame 51*a* is arranged above the heating furnace 52 and is lifted by the lifting device main body 51*b*.

A protruding portion of the dummy silica rod 15 protruding from the cladding glass body 11 of the optical fiber preform 1A is attached to the lifting frame 51*a* of the preform lifting device 51 of the drawing device 50.

That is, the optical fiber preform 1A is suspended from the lifting frame 51*a* such that the tip sealing portion 17 becomes the lower end portion. The lower end portion of the optical fiber preform 1A supported in a suspended state by the lifting frame 51*a* is inserted into the inner side through-hole 52*a* (preform insertion hole) of the ring-shaped heating furnace 52.

In the drawing step, first, the lower end portion of the optical fiber preform 1A supported in a suspended state on the lifting frame 51*a* is inserted into the inner side through-hole 52*a* of the heating furnace 52. The lower end portion is drawn downward while maintaining a state in which the glass viscosity is lowered (softened) by being heated by the heating furnace 52. Due to this, the optical fiber 2 is formed.

In addition, in the drawing step, the optical fiber preform 1A is lowered by the lifting frame 51*a*, such that the optical fiber preform 1A is fed into the inner side through-hole 52*a* of the heating furnace 52. Due to this, it is possible to continuously draw the optical fiber 2 from the lower end portion of the optical fiber preform 1A.

The lower end portion of the optical fiber preform 1A is heated to a temperature (heating temperature during drawing) at which the glass viscosity decreases (softens) to a level at which it is possible to draw the optical fiber 2. Due to this, there is a contraction in the glass material forming the optical fiber preform 1A while the glass viscosity decreases, and the cladding glass body 11 reduces in diameter. Then, the cladding glass body 11 is integrated with the core glass rods 14. In a case where there is a core identifying marker glass rod inserted into the through-holes 12 of the cladding glass body 11, the cladding glass body 11 is also integrated with the core identifying marker glass rod as well as the core glass rods 14 at the lower end portion of the optical fiber preform 1A heated to the heating temperature during drawing.

Glass rods such as the core glass rods 14 and the core identifying marker glass rod inserted into the through-holes 12 of the cladding glass body 11 are also referred to below as insertion glass rods. Integration of the cladding glass body 11 with the insertion glass rods proceeds as the optical fiber preform 1A is fed into the heating furnace 52 by the lowering of the lifting frame 51*a*.

That is, the drawing step described here is performed while the integration of the cladding glass body 11 with the insertion glass rods progresses as the optical fiber preform 1A is fed into the heating furnace 52.

The insertion glass rods and the cladding glass body 11 heated to the heating temperature during drawing are softened and the surface tension is lowered as compared with normal temperatures. The cladding glass body 11 heated to the heating temperature during drawing is easily influenced by the internal pressure of the inner holes 18.

When the lower end portion of the optical fiber preform 1A is heated to the heating temperature during drawing, since the insides of the inner holes 18 have a negative pressure, the entire body is reduced in diameter together with the reduction in the diameter of the through-holes 12, in addition to the contraction of the glass of the cladding glass body 11. For this reason, the cladding glass body 11 is integrated with the insertion glass rods. According to this optical fiber preform 1A, in the drawing step, since the insides of the inner holes 18 have a negative pressure, it is possible to efficiently integrate the cladding glass body 11 with the insertion glass rods.

The integration of the cladding glass body 11 into the insertion glass rods progresses while the intervals between the inner surfaces of the inner holes 18 of the cladding glass body 11 and the outer peripheral surface of the insertion glass rods are narrowed as the optical fiber preform 1A is fed into the heating furnace 52. That is, in the drawing step, the inner surfaces of the inner holes 18 of the cladding glass body 11 and the outer peripheral surfaces of the insertion glass rods come into contact.

In the optical fiber 2 production method described above, the volumes of the inner holes 18 are reduced by narrowing the intervals between the inner surfaces of the through-holes 12 of the cladding glass body 11 and the outer peripheral surfaces of the insertion glass rods.

In the cladding glass body 11 of the optical fiber preform 1A, the end portion on the side where the dummy silica rod 15 is welded is also referred to as a base end portion. The base end portion is more easily deformed than the central portion of the cladding glass body 11 in the axial direction due to the influence of the welding with the dummy silica rod 15. For this reason, the drawing of the optical fiber 2 from the lower end portion of the optical fiber preform 1A is stopped before the base end portion of the cladding glass body 11 is used for drawing in order to stably maintain the cross-sectional structure of the optical fiber 2. In addition, the drawing of the optical fiber 2 from the lower end portion of the optical fiber preform 1A is completed before the inner holes 18 disappear.

The internal pressure of the through-holes 12 is set in the tip sealing step in advance such that the internal pressure of the inner holes 18 of the optical fiber preform 1A before the start of drawing is a negative pressure even when the drawing of the optical fiber 2 is complete. Due to this, it is possible to maintain the internal pressure of the inner holes 18 of the optical fiber preform 1A at a negative pressure from the start of the drawing of the optical fiber 2 to the completion. That is, in the tip sealing step in the producing of the optical fiber preform 1A, the inner holes 18 are formed while the through-holes 12 of the cladding glass body 11 are vacuum suctioned by the vacuum pump such that the negative pressure is secured in the inner hole 18 when the drawing of the optical fiber 2 is complete.

It is possible to suitably use insertion glass rods with outer diameters of 80% to 98% of the inner diameters of the through-holes 12 of the cladding glass body 11. In the optical fiber 2 obtained by drawing, the outer diameters of the insertion glass rods may be 90% to 98% of the inner diameters of the through-holes 12 of the cladding glass body 11 in order to increase the accuracy of arranging the core at the target position, or may be 95% to 98%.

The tip sealing step is not limited to forming the tip sealing portion 17 in a state where the insides of the through-holes 12 of the cladding glass body 11 are reduced from atmospheric pressure by approximately 100 kPa, and securing the inner holes 18 with an internal pressure of 1 kPa or less.

It is sufficient to set the internal pressure of the inner holes 18 such that it is possible to maintain the negative pressure from the start to the completion of the drawing step and the internal pressure may be, for example, approximately more than 1 kPa to 20 kPa.

However, in a case where the degree of vacuum of the inner holes 18 formed in the tip sealing step is low (for example, the internal pressure of the inner hole 18 is more than 1 kPa to 20 kPa), the internal pressure of the inner holes 18 is easily influenced by the temperature of the cladding glass body 11 in comparison with a case of being 1 kPa or less. For this reason, the vacuum pressure which the vacuum pump applies to the through-holes 12 in the tip sealing step is set such that it is possible to stably maintain the negative pressure in the inner holes 18 in the drawing step. This is because, in addition to the reduction in the volume of the inner holes 18 accompanying the progress of the drawing step, there is a change in the internal pressure of the inner holes 18 accompanying the temperature change of the components of the preform 1A, such as the cladding glass body 11.

In the tip sealing step, for example, the inner holes 18 having an internal pressure of 20 kPa or less are formed such that the internal pressure of the inner holes 18 is a negative pressure in the drawing step. If the internal pressure of the inner holes 18 of the optical fiber preform 1A is 20 kPa or less before starting the drawing, it is possible to draw an optical fiber having a sufficient length while maintaining a negative pressure for the internal pressure of the inner holes 18 in the drawing step.

The internal pressure of the inner holes 18 is, for example, 20 kPa or less, but may be 10 kPa or less, or 1 kPa or less.

In the drawing step using the optical fiber preform 1A, it is not necessary to separately connect a vacuum pump for vacuum suctioning the inner holes 18 to the optical fiber preform 1A. In comparison with the configuration of the related art in which the dummy tube is connected to the optical fiber preform, it is not necessary to provide a connector for connecting a vacuum pump in the optical fiber preform 1A. Furthermore, the optical fiber preform 1A does not have a connector for connecting a vacuum pump to the inner holes 18. In the optical fiber preform 1A, it is not necessary to prevent the sealing component installed together with the connector for connecting the vacuum pump from being heated to a temperature exceeding the heat resistance temperature. That is, it is possible to shorten the length of the dummy silica rod 15 of the optical fiber preform 1A in the axial direction in comparison with the length of the dummy tube in the axial direction in the configuration of the related art.

The dummy tube of the optical fiber preform in the configuration of the related art may be subjected to a process such as pleated tube processing, ground glass processing, and opacification in order to reduce or prevent heat transfer to the sealing components installed together with the connector in the dummy tube and it may be difficult to secure the strength of the sealing components.

On the other hand, the optical fiber preform 1A according to one or more embodiments of the present invention uses a solid dummy silica rod 15 which has a simple structure and which is advantageous for securing strength, in comparison with the dummy tube. For this reason, it is easy to secure the strength of the dummy silica rod for suspending the optical fiber preform 1A on the lifting frame 51*a* of the preform lifting device 51 of the drawing device 50. As described above, the solid dummy silica rod 15 is advantageous in terms of securing strength in comparison with the dummy tube, even when heated in the drawing step, and can easily secure the strength for suspending the optical fiber preform 1A on the lifting frame 51*a* of the preform lifting device 51 of the drawing device 50.

As shown in FIG. 7, the dummy silica rod 15 of the optical fiber preform 1A suspended on the lifting frame 51*a* of the preform lifting device 51 of the drawing device 50 is positioned at the top portion of the optical fiber preform 1A.

In the drawing step, the dummy silica rod 15 is heated by radiant heat from the heating furnace 52 below or by transfer heat transferred from the cladding glass body 11. At this time, the solid dummy silica rod 15 is particularly hard to deform by heating, in comparison with the dummy tube.

In an optical fiber preform with a configuration of the related art using a dummy tube, when the preform is lowered to the heating furnace, the dummy tube may be deformed earlier than the preform due to the heat and the inner diameter thereof may be destroyed. In order to prevent the deformation of the dummy tube, it was necessary to secure a long residual preform length not used for drawing. On the other hand, the optical fiber preform 1A according to one or more embodiments of the present invention is configured to use a solid dummy silica rod 15 which is particularly hard to deform by heating in comparison with the dummy tube. For this reason, it is possible to shorten the residual preform length in comparison with the optical fiber preform of the structure of the related art using a dummy tube. As a result, it is possible to secure a large length for the optical fiber preform 1A in the axial direction of the effective drawing region and to contribute effectively to the lengthening of the optical fiber 2.

From the above, it is possible to easily realize an increase in the length of the optical fiber preform 1A in the axial direction of the effective drawing region in comparison with the optical fiber preform with a configuration of the related art using a dummy tube. As a result, it is possible to easily realize the lengthening of the optical fiber 2 obtained by drawing the optical fiber preform 1A. In addition, it is possible to use the ring-shaped heating furnace 52 having a larger inner diameter.

Next, one or more embodiments of the optical fiber preform production method, the optical fiber preform, and the optical fiber production method will be described with reference to FIG. 8 to FIG. 14.

In FIG. 8 to FIG. 14, the same reference numerals are assigned to the same components as those in FIG. 1 to FIG. 6 and description thereof will be omitted or simplified.

Figure 14:
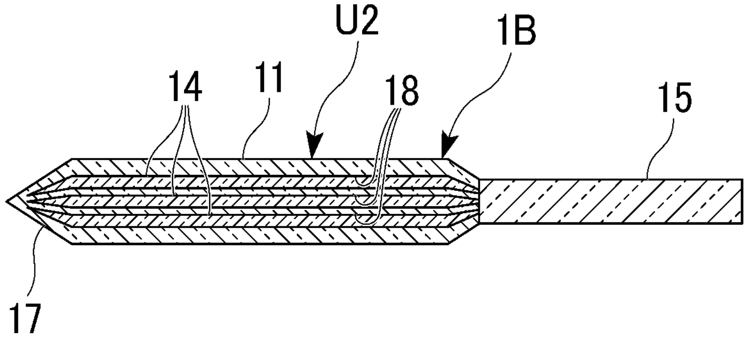
FIG. 14 is a cross-sectional view showing an optical fiber preform obtained by completing the tip sealing step of FIG. 13.

FIG. 14 is a vertical cross-sectional view showing an optical fiber preform 1B of one or more embodiments.

The optical fiber preform 1B shown in FIG. 14 is produced by the optical fiber preform production method of one or more embodiments.

Figure 8:
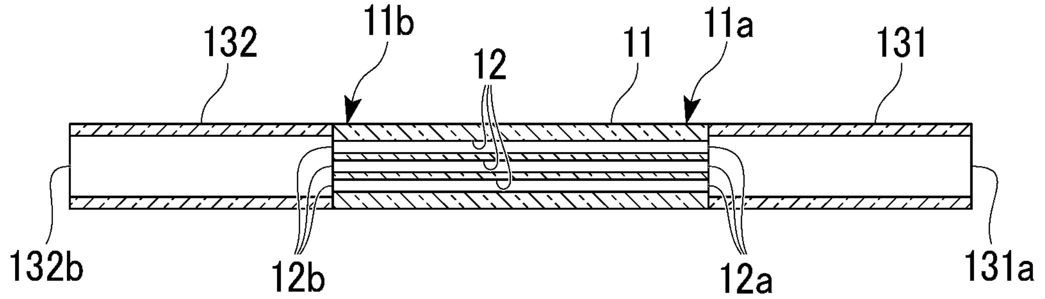
FIG. 8 is a cross-sectional view for illustrating a dummy silica tube welding step of an optical fiber preform production method according to one or more embodiments of the present invention.

In the optical fiber preform production method of one or more embodiments, as shown in FIG. 8, dummy silica tubes 131 and 132 are welded and connected to both ends of the cladding glass body 11 in the axial direction (dummy silica tube welding step). In addition, among the dummy silica tubes 131 and 132 welded to both ends of the cladding glass body 11 in the axial direction, the dummy silica tube 131 welded to the first end portion 11*a* of the cladding glass body 11 is referred to as a first dummy silica tube, and the dummy silica tube 132 welded to the second end portion 11*b* of the cladding glass body 11 is also referred to as a second dummy silica tube.

The dummy silica tubes 131 and 132 are cylindrically shaped silica glass members.

As shown in FIG. 8, each of the dummy silica tubes 131 and 132 is welded and integrated with the cladding glass body 11 in the axial direction such that one end surface thereof abuts the end surface of the cladding glass body 11 in the axial direction.

The dummy silica tubes 131 and 132 are welded to the cladding glass body 11 so as to be coaxial with the cladding glass body 11. The dummy silica tube 131 is arranged so as not to seal each of the first opening portions 12*a* of the cladding glass body 11 when welded coaxially to the cladding glass body 11. Similarly, the dummy silica tube 132 is arranged so as not to seal each of the second opening portions 12*b* of the cladding glass body 11 when welded coaxially to the cladding glass body 11. The inner diameters of the dummy silica tubes 131 and 132 are set to a size at which it is possible to maintain the open state of at least a part of each of the first opening portions 12*a* and each of the second opening portions 12*b*. The dummy silica tubes 131 and 132 welded to the cladding glass body 11 may overlap a part of each of the opening portions 12*a* and 12*b* of the cladding glass body 11. The inner space of the dummy silica tubes 131 and 132 welded to the cladding glass body 11 communicates with all the through-holes 12 of the cladding glass body 11.

The dummy silica tube welding step has a welding operation (first silica tube welding operation) for welding the dummy silica tube to either end portion of the cladding glass body 11 in the axial direction, and a welding operation (second silica tube welding operation) for welding a dummy silica tube to the other end portion of the cladding glass body 11 in the axial direction after the first silica tube welding operation. Each welding operation may be performed while dry air (for example, air or an inert gas) is caused to flow through each of the through-holes 12 of the cladding glass body 11. The dry air may flow from the side of the cladding glass body 11 opposite to the side to which the dummy silica tube is welded to the side where the dummy silica tube is welded.

Here, the dummy silica tube welded to the cladding glass body 11 in the first silica tube welding operation is referred to as the first welding dummy silica tube and the dummy silica tube welded to the cladding glass body 11 in the second silica tube welding operation is also referred to as the second welding dummy silica tube.

As an example, a case in which, after the first dummy silica tube 131 is welded to the first end portion 11*a* of the cladding glass body 11 (first silica tube welding operation), the second dummy silica tube 132 is welded to the second end portion 11*b* of the cladding glass body 11 (second silica tube welding operation) will be described. In this example, the first dummy silica tube 131 is used as the first welding dummy silica tube and the second dummy silica tube 132 is adopted as the second welding dummy silica tube.

In this case, the first silica tube welding operation is performed while causing dry air to flow in the through-holes 12 from the second end portion 11*b* of the cladding glass body 11 to the first end portion 11*a*. The dry air supplied to each through-hole 12 of the cladding glass body 11 is discharged from between the cladding glass body 11 and the first dummy silica tube 131 after passing through the through-holes 12 until the first dummy silica tube 131 is connected (welded) to the cladding glass body 11. In addition, after the first dummy silica tube 131 is connected (welded) to the cladding glass body 11, the dry air supplied to each through-hole 12 of the cladding glass body 11 passes through the inner spaces of the through-holes 12 and the first dummy silica tube 131 to be discharged from the first tip opening end 131*a* of the end on the opposite side (the right side in FIG. 1) to the cladding glass body 11 of the first dummy silica tube 131.

In the second silica tube welding operation, dry air is supplied from the first tip opening end 131*a*. The dry air flows into the through-holes 12 from the first end portion 11*a* of the cladding glass body 11 to the second end portion 11*b*. The dry air that has passed through the inner space of the first dummy silica tube 131 and each of the through-holes 12 in the cladding glass body 11 is discharged from between the cladding glass body 11 and the second dummy silica tube 132 until the second dummy silica tube 132 is connected (welded) to the cladding glass body 11. In addition, the dry air that has passed through the through-holes 12 of the cladding glass body 11 passes through the inner space of the second dummy silica tube 132 from the through-holes 12 after the second dummy silica tube 132 is connected (welded) to the cladding glass body 11 so as to be discharged from the second tip opening end 132*b* on the end on the opposite side (the left side in FIG. 1) to the cladding glass body 11 of the second dummy silica tube 132.

During the first silica tube welding operation and the second silica tube welding operation, dry air is caused to flow through each through-hole 12 of the cladding glass body 11. At this time, the dry air is caused to flow from the side of the cladding glass body 11 opposite to the side to which the dummy silica tube is welded. Due to this, it is possible to prevent moisture from entering each through-hole 12 of the cladding glass body 11, the moisture produced by the oxyhydrogen flame used for welding the dummy silica tube to the cladding glass body 11. In addition, the dummy silica tube welding step performed while allowing dry air to flow into each through-hole 12 of the cladding glass body 11 in this manner is able to prevent impurities in the atmosphere from entering the through-holes 12 of the cladding glass body 11.

In addition, the supply of dry air to each through-hole 12 of the cladding glass body 11 in the dummy silica tube welding step prevents from closing of the through-holes 12 due to the end surface of the cladding glass body 11 melting due to the heating at the time of the welding operation.

In the dummy silica tube welding step, the first silica tube welding operation may be performed while supplying dry air from both the second end portion 11*b* of the cladding glass body 11 and the first tip opening end 131*a*. After completion of the first silica tube welding operation, the second silica tube welding operation for welding the second dummy silica tube to the other end of the cladding glass body 11 in the axial direction may be performed while supplying dry air from both of the first end portion 11*a* of the cladding glass body 11 and the second tip opening end 132*b*.

In the first silica tube welding operation, the supply of the dry air is continued from both the second opening portions 12*b* of the cladding glass body 11 and the first tip opening end 131*a* of the dummy silica tube until the dummy silica tube (first welding dummy silica tube) is connected (welded) to the cladding glass body 11. However, the total supply flow rate of the dry air to each second opening portion 12*b* of the cladding glass body 11 is set to be larger than the supply flow rate of the dry air from the first tip opening end 131*a* of the dummy silica tube. The dry air supplied from the second opening portions 12*b* of the cladding glass body 11 and the first tip opening end 131*a* of the dummy silica tube is discharged from between the cladding glass body 11 and the dummy silica tube until the dummy silica tube is connected (welded) to the cladding glass body 11.

The supply of the dry air from the second opening portion 12*b* of each through-hole 12 of the cladding glass body 11 and the first tip opening end 131*a* of the dummy silica tube is stopped before the connection (welding) of the dummy silica tube to the cladding glass body 11 is completed, and after the dummy silica tube has been brought into contact with the cladding glass body 11. After the dummy silica tube is connected (welded) to the cladding glass body 11, a dry air outlet such as a leak valve is secured at the first tip opening end 131*a* of the dummy silica tube, dry air is supplied from only the second opening portions 12*b* of the cladding glass body 11, and the supplied dry air is discharged from the dry air outlet such as a leak valve.

In the silica tube second welding operation, the supply of the dry air is continued from both the first tip opening end 131*a* of the first welding dummy silica tube for which welding to the cladding glass body 11 is finished and the second tip opening end 132*b* of the second welding dummy silica tube until the dummy silica tube (second welding dummy silica tube) is connected (welded) to the cladding glass body 11. However, the supply flow rate of the dry air from the first tip opening end 131*a* of the first welding dummy silica tube is made to be larger than the supply flow rate of the dry air from the second tip opening end 132*b* of the second welding dummy silica tube. The dry air supplied from the first tip opening end 131*a* of the first welding dummy silica tube and the second tip opening end 132*b* of the second welding dummy silica tube is discharged from between the cladding glass body 11 and the second welding dummy silica tube until the second welding dummy silica tube is connected (welded) to the cladding glass body 11.

The supply of dry air from the first tip opening end 131*a* of the first welding dummy silica tube and the second tip opening end 132*b* of the second welding dummy silica tube is stopped before the connection (welding) of the second welding dummy silica tube to the cladding glass body 11 is completed, and after the second welding dummy silica tube comes into contact with the cladding glass body 11. After the second welding dummy silica tube is connected (welded) to the cladding glass body 11, a dry air outlet such as a leak valve is secured at the second tip opening end 132*b* of the second welding dummy silica tube, dry air is supplied only from the first tip opening end 131*a* of the first welded dummy silica tube, and the supplied dry air is discharged from the dry air outlet such as a leak valve.

The dummy silica tube welding step may be configured such that the second silica tube welding operation is performed after the first silica tube welding operation is completed by adopting the first dummy silica tube 131 as the first welding dummy silica tube and the second dummy silica tube 132 as the second welding dummy silica tube. Alternatively, there may be a configuration in which second silica tube welding operation is performed after the first silica tube welding operation is completed by adopting the second dummy silica tube 132 as the first welding dummy silica tube and the first dummy silica tube 131 as the second welding dummy silica tube.

Figure 9:
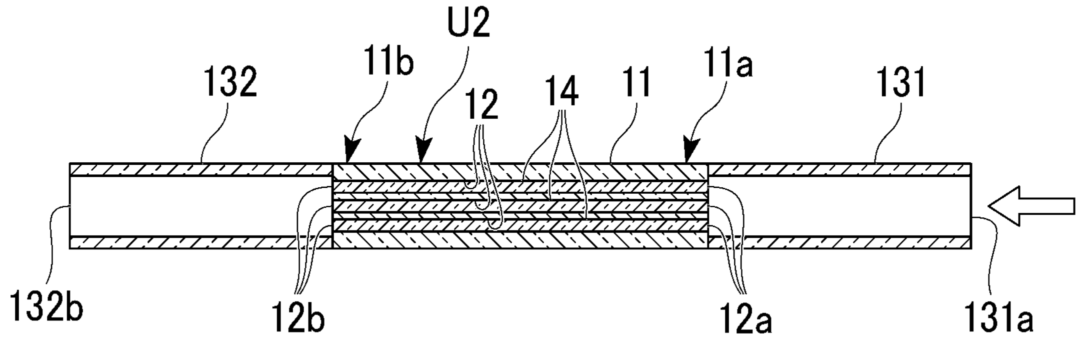
FIG. 9 is a cross-sectional view for illustrating a rod inserting step performed after the step of FIG. 8.

Following the dummy silica tube welding step, the core glass rods 14 are inserted into each of the plurality of through-holes 12 of the cladding glass body 11 as shown in FIG. 9 (rod inserting step). The core glass rods 14 are inserted into the through-holes 12 of the cladding glass body 11 through the inner space of the first dummy silica tube 131 or the inner space of the second dummy silica tube 132.

In the axial direction, the length of the core glass rods 14 is equal to the length of the through-holes 12 of the cladding glass body 11.

In the rod inserting step, instead of the core glass rods 14, the core identifying marker glass rod may be inserted into one or more through-holes among the plurality of through-holes 12 of the cladding glass body 11. As the core identifying marker glass rod, for example, it is possible to adopt a glass rod having a different refractive index from both the cladding glass body 11 and the core glass rod 14, a glass rod formed of colored glass, or the like, or a glass rod with a known configuration. It is possible to perform the insertion of the core identifying marker glass rod into the through-holes 12 of the cladding glass body 11 in the same manner as the insertion of the core glass rods 14 into the through-holes 12 of the cladding glass body 11.

In the rod inserting step, a glass material unit U2 with a configuration in which the core glass rods 14 are inserted into each of the plurality of through-holes 12 of the cladding glass body 11 is obtained.

Between the dummy silica tube welding step and the rod inserting step, an etching step for etching the inner surface of each through-hole 12 of the cladding glass body 11 with an etching gas or an etching solution, a cleaning step for cleaning the insides of the through-holes 12, and a drying step may be performed.

As the etching gas used in the etching step, it is possible to adopt, for example, $SF_6$ (sulfur hexafluoride) gas, $C_2F_6$ (ethane hexafluoride) gas, or the like. As the etching solution, for example, it is possible to adopt hydrofluoric acid (HF) or the like.

In the cleaning step, for example, a cleaning liquid such as an alcohol such as ethanol or pure water flows through the through-holes 12 to clean the insides of the through-holes 12. In the drying step, after the cleaning step, the through-holes 12 are dried by dry air (such as air or an inert gas) flowing through the through-holes 12.

Figure 10:
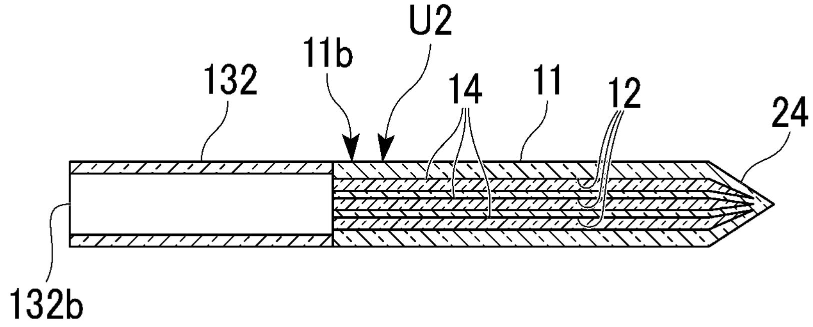
FIG. 10 is a cross-sectional view for illustrating a one-end thermal cutting step performed after the step of FIG. 9.
Figure 11:
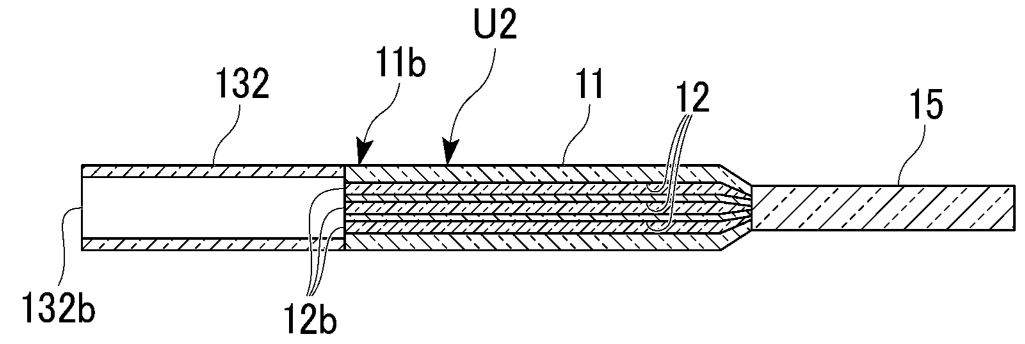
FIG. 11 is a cross-sectional view for illustrating a dummy rod integrating step performed after the step of FIG. 10.

Following the rod inserting step, as shown in FIG. 10, the first dummy silica tube 131 is removed from the cladding glass body 11 by thermal cutting the tip of the first end portion 11*a* of the cladding glass body 11. Furthermore, a base end sealing portion 24 is formed by closing and hermetically sealing the end of each through-hole 12 on the first end portion 11*a* side of the cladding glass body 11 (one-end thermal cutting step). Following the one-end thermal cutting step, as shown in FIG. 11, the dummy silica rod 15 is welded and integrated with the base end sealing portion 24 (dummy rod integrating step).

In one or more embodiments, as shown in FIG. 10, in the one-end thermal cutting step, the first end portion 11*a* of the cladding glass body 11 is formed with a tapered shape at the tip together with the core glass rods 14 in the through-holes 12. As shown in FIG. 11, in the dummy rod integrating step, the dummy silica rod 15 is pressed while the first end portion 11*a* of the cladding glass body 11 formed with a tapered shape at the tip is heated, and the dummy silica rod 15 is aligned on the same axis as the cladding glass body 11 and welded and integrated therewith.

Figure 12:
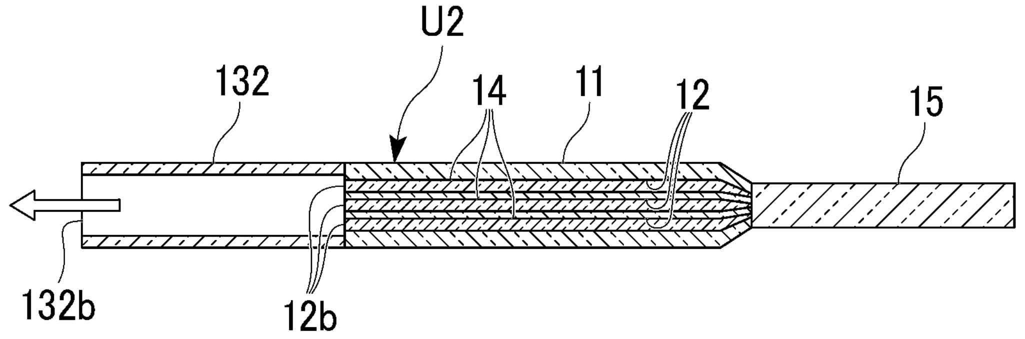
FIG. 12 is a cross-sectional view for illustrating a vacuum suctioning step performed after the step of FIG. 11.

After the dummy rod integrating step, as shown in FIG. 12, a vacuum pump (not shown) is connected to the second tip opening end 132*b* on the opposite side to the cladding glass body 11 of the second dummy silica tube 132, and the insides of the through-holes 12 of the cladding glass body 11 are vacuum suctioned by driving the vacuum pump (vacuum suctioning step).

In the vacuum suctioning step, the insides of all the through-holes 12 of the cladding glass body 11 are vacuum suctioned from the second end portion 11*b* side of the cladding glass body 11 through the inner space of the second dummy silica tube 132.

In the vacuum suctioning step, for example, it is also possible to alternately perform the supply of helium gas from the gas supply apparatus connected to the second tip opening end 132*b* of the second dummy silica tube 132 to the through-holes 12 of the cladding glass body 11 and the vacuum suctioning by the vacuum pump.

Figure 13:
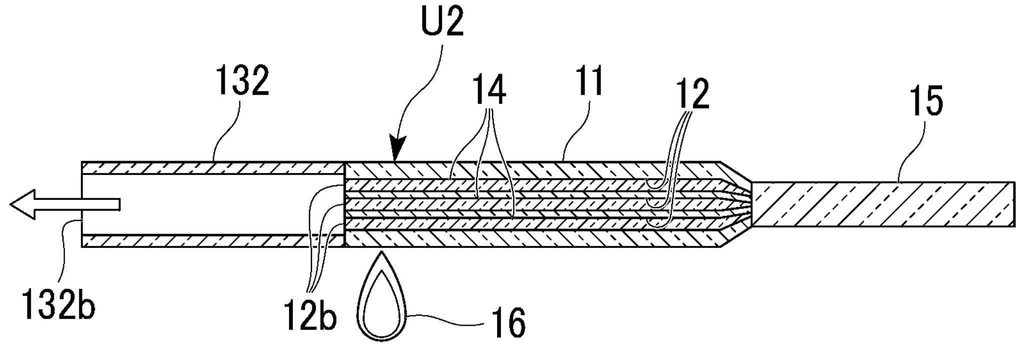
FIG. 13 is a cross-sectional view for illustrating thermal cutting of the second end portion tip of the cladding glass body in the tip sealing step performed after the step of FIG. 12.

As shown in FIG. 13 and FIG. 14, in the optical fiber preform production method of one or more embodiments, after the start of the vacuum suctioning step, in a state where vacuum suctioning is continued by a vacuum pump, the second end portion of the glass material unit U2 including the second end portion 11*b* of the cladding glass body 11 is heated and reduced in diameter using the flame 16 (for example, oxyhydrogen flame) or the like and all of the second opening portions 12*b* of the cladding glass body 11 are closed and hermetically sealed (tip sealing step).

The second end portion of the glass material unit U2 in a state in which the second opening portions 12*b* of all the through-holes 12 are hermetically sealed in the tip sealing step is also referred to below as the tip sealing portion 17. The tip sealing portion 17 is solidified and formed by heating and reducing the diameter of the second end portion 11*b* of the cladding glass body 11 together with the tip end portions of the core glass rods 14 on the inside thereof.

As shown in FIG. 14, in the tip sealing step of one or more embodiments, the tip sealing portion 17 in which the second end portion of the glass material unit U2 is processed into a tapered shape at the tip is formed.

In addition, in the tip sealing step of one or more embodiments, in the process of forming the tip sealing portion 17 with a tapered shape at the tip, the tip of the second end portion of the glass material unit U2 is thermal cut and the second dummy silica tube 132 is removed from the cladding glass body 11.

The optical fiber preform production method of one or more embodiments is completed by completing the tip sealing step and enables the optical fiber preform 1B shown in FIG. 14 to be obtained.

The inner holes 18 are secured in the inside of the cladding glass body 11 of the optical fiber preform 1B in FIG. 14. In the inner holes 18, the first end portion 11*a* sides of the through-holes 12 are hermetically sealed by the dummy silica rod 15 and the second end portion 11*b* sides are hermetically sealed by the tip sealing portion 17.

In the optical fiber preform production method of one or more embodiments, the tip sealing portion 17 is formed by performing the tip sealing step while continuing to vacuum suction the through-holes 12 by the vacuum pump. Due to this, a state in which the pressure (atmospheric pressure) in the inner holes 18 of the optical fiber preform 1B after completion of the tip sealing step is a negative pressure (negative pressure relative to atmospheric pressure) is secured.

In the tip sealing step, the second end portion of the glass material unit U2 is heated and reduced in diameter so as to be solidified and the second end portion of the glass material unit U2 softened by heating is processed into a tapered shape to form a tip sealing portion 17.

The internal pressure of the inner holes 18 secured by forming the tip sealing portion 17 in the tip sealing step is the same as the pressure (internal pressure) of the through-holes 12 of the cladding glass body 11 before the vacuum pump forms the tip sealing portion 17.

In the tip sealing step, the tip sealing portion 17 is formed in a state where the insides of the through-holes 12 of the cladding glass body 11 are reduced from atmospheric pressure by approximately 100 kPa using a vacuum pump. The internal pressure of the through-holes 12 of the cladding glass body 11 is suitably 1 kPa or less, for example. The optical fiber preform 1B having the inner holes 18 with an internal pressure of 1 kPa or less is obtained by forming the tip sealing portion 17 while setting the internal pressure of the through-holes 12 of the cladding glass body 11 to 1 kPa or less.

It is also possible to apply the optical fiber preform 1B to the producing of the optical fiber 2 (the optical fiber 2 production method, a drawing step) using the drawing device 50 (refer to FIG. 7).

In the producing of the optical fiber 2 from the optical fiber preform 1B using the drawing device 50, first, the optical fiber preform 1B is supported (suspended) by the lifting frame 51*a* of the drawing device 50, and the lower end portion (the tip sealing portion 17) of the optical fiber preform 1B is inserted into the inner side through-hole 52*a* of the heating furnace 52. The lower end portion of the optical fiber preform 1B is drawn downward while maintained in a state in which it is heated to the heating temperature during drawing by the heating furnace 52 to lower (soften) the glass viscosity. Due to this, the optical fiber 2 is formed.

In the drawing step, the optical fiber preform 1B is lowered by the lifting frame 51*a* to feed the optical fiber preform 1B into the inner side through-hole 52*a* of the heating furnace 52. Due to this, it is possible to continuously draw the optical fiber 2 from the lower end portion of the optical fiber preform 1B while the integration of the cladding glass body 11 with the insertion glass rods inserted into the through-holes 12 of the cladding glass body 11 progresses.

When the optical fiber 2 is drawn from the lower end portion of the optical fiber preform 1*i*, the volumes of the inner holes 18 are reduced as the integration of the cladding glass body 11 with the insertion glass rods progresses. The drawing is completed before the inner holes 18 disappear. The internal pressure of the inner holes 18 of the optical fiber preform 1B is secured as a negative pressure when the drawing of the optical fiber 2 is completed. Due to this, it is possible to maintain the internal pressure of the inner holes 18 of the optical fiber preform 1B at a negative pressure from the start of the drawing of the optical fiber 2 until the completion.

The internal pressure of the inner holes 18 may be set such that it is possible to maintain the negative pressure from the start of the drawing step to the completion, and may be, for example, approximately more than 1 kPa to 20 kPa.

In the tip sealing step, for example, when the inner holes 18 having an internal pressure of 20 kPa or less are formed, it is possible to set the internal pressure of the inner holes 18 to a negative pressure in the drawing step. If the internal pressure of the inner holes 18 of the optical fiber preform 1B before the start of the drawing is 20 kPa or less, it is possible to draw the optical fiber 2 having a sufficient length while maintaining the negative pressure for the internal pressure of the inner holes 18 in the drawing step.

The internal pressure of the inner holes 18 is, for example, 20 kPa or less, but may be 10 kPa or less, or 1 kPa or less.

As the insertion glass rods, it is possible to suitably use insertion glass rods with outer diameters of 80% to 98% of the inner diameters of the through-holes 12 of the cladding glass body 11. In the optical fiber 2 obtained by drawing, in order to increase the precision of arranging the core at the target position, the outer diameters of the insertion glass rods may be 90% to 98% of the inner diameters of the through-holes 12 of the cladding glass body 11, or may be 95% to 98%.

Next, one or more embodiments of the optical fiber preform production method, optical fiber preform, and optical fiber production method will be described with reference FIG. 15 to FIG. 20.

Figure 20:
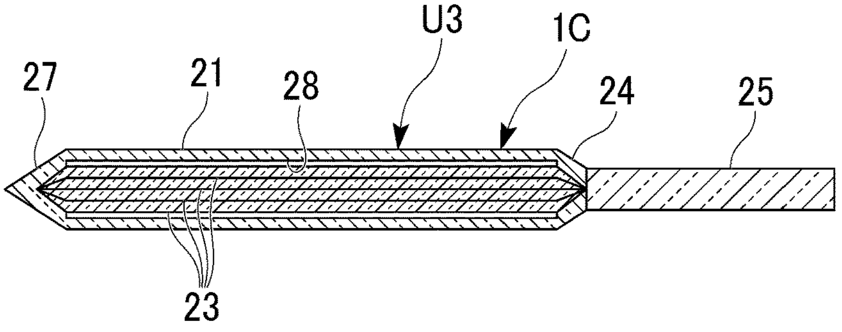
FIG. 20 is a cross-sectional view showing an optical fiber preform obtained by completing the tip sealing step of FIG. 19.

FIG. 20 is a vertical cross-sectional view showing the optical fiber preform 1C of one or more embodiments.

The optical fiber preform 1C shown in FIG. 20 is produced by the optical fiber preform production method of one or more embodiments.

Figure 15:
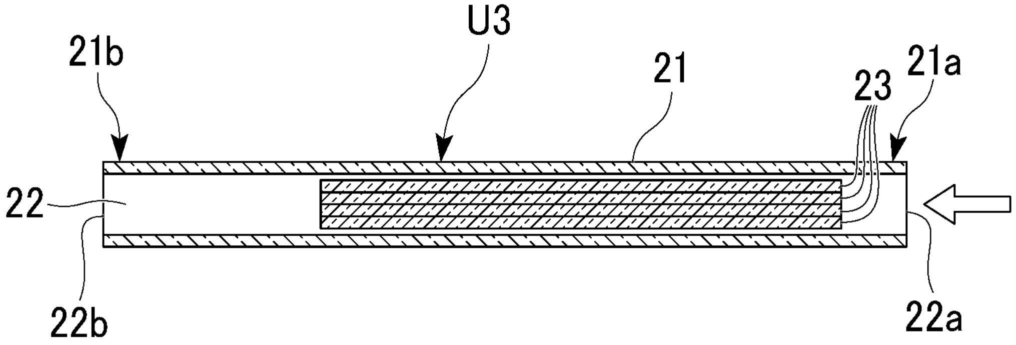
FIG. 15 is a cross-sectional view for illustrating a rod inserting step of the optical fiber preform production method according to one or more embodiments of the present invention.

As shown in FIG. 15 and the like, a cylindrically shaped cladding glass body 21 is used in the optical fiber preform production method of one or more embodiments. The cladding glass body 21 forms a part of the cladding of the optical fiber drawn from the optical fiber preform 1C.

In the optical fiber preform production method of one or more embodiments, as shown in FIG. 15, first, a plurality of glass rods 23 are inserted into through-holes 22 inside the cladding glass body 21 (rod inserting step).

One or more glass rods among the plurality of glass rods 23 inserted into the through-holes 22 inside the cladding glass body 21 are core glass rods. The core glass rods become the core of the optical fiber due to the drawing of the optical fiber preform 1C (refer to FIG. 20). In addition, the plurality of glass rods 23 inserted into the through-holes 22 inside the cladding glass body 21 may include one or more cladding glass rods. The cladding glass rods become a part of the cladding of the optical fiber due to the drawing of the optical fiber preform 1C.

The core glass rods used in one or more embodiments have portions which become the core of the optical fiber due to the drawing and portions which become a part of the cladding of the optical fiber. The portions which become the cores are covered with the portions which become a part of the cladding. However, as the core glass rods, it is possible to adopt core glass rods configured such that the whole rods become the core of the optical fiber.

By performing the rod inserting step, a glass material unit U3 with a configuration in which the plurality of glass rods 23 are inserted into the through-holes 22 of the cladding glass body 21 is obtained.

Here, for the glass material unit U3, the axial direction of the through-hole 22 of the cladding glass body 21 is treated as the axial direction.

Figure 16:
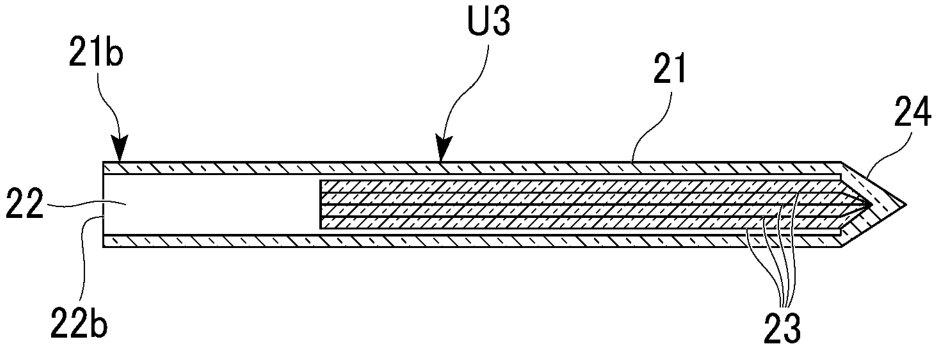
FIG. 16 is a cross-sectional view for illustrating a one-end thermal cutting step performed after the step of FIG. 15.

Following the rod inserting step, the tip of the first end portion 21*a* of the cladding glass body 21 is thermal cut as shown in FIG. 16. Due to this, the base end sealing portion 24 which closes (hermetically seals) the first opening portion 22*a* of the through-hole 22 of the cladding glass body 21 by heating the first end portion 21*a* of the cladding glass body 21 is formed (one-end thermal cutting step). Following the one-end thermal cutting step, as shown in FIG. 17, a dummy silica rod 25 is welded and integrated with the base end sealing portion 24 (dummy rod integrating step).

In one or more embodiments, as shown in FIG. 16, the first end portion of the glass material unit U3 is formed with a tapered shape at the tip in the one-end thermal cutting step. The first end portion of the glass material unit U3 formed with a tapered shape at the tip is solidified by heating and reducing the diameter of the first end portion 21*a* of the cladding glass body 21 together with the glass rods 23 in the through-hole 22.

Figure 17:
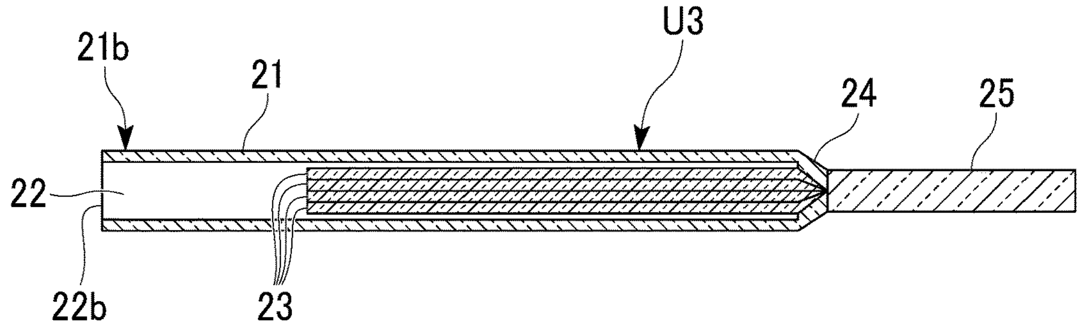
FIG. 17 is a cross-sectional view for illustrating a dummy rod integrating step performed after the step of FIG. 16.

As shown in FIG. 17, in the dummy rod integrating step, the solid dummy silica rod 25 abuts the base end sealing portion 24 while heating the first end portion 21*a* of the cladding glass body 21 formed with a tapered shape at the tip. Furthermore, the dummy silica rod 25 is coaxially aligned with the cladding glass body 21 and welded and integrated with the base end sealing portion 24.

Figure 18:
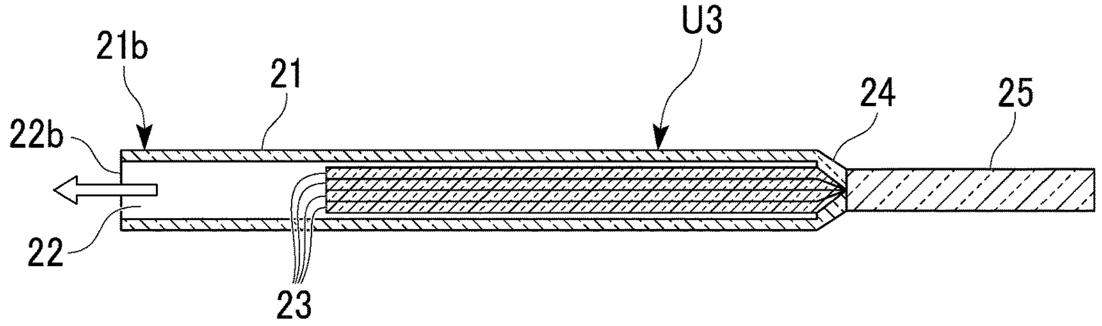
FIG. 18 is a cross-sectional view for illustrating a vacuum suctioning step performed after the step of FIG. 17.

Following the dummy rod integrating step, as shown in FIG. 18, a vacuum pump (not shown) is connected to the second end portion 21*b* of the cladding glass body 21, and the inside of the through-hole 22 of the cladding glass body 21 is vacuum suctioned by driving the vacuum pump (vacuum suctioning step).

In the vacuum suctioning step, for example, it is also possible to alternately perform the supply of helium gas from the gas supply apparatus connected to the second end portion 21*b* of the cladding glass body 21 to the through-holes 22 of the cladding glass body 21 and the vacuum suctioning by the vacuum pump.

Figure 19:
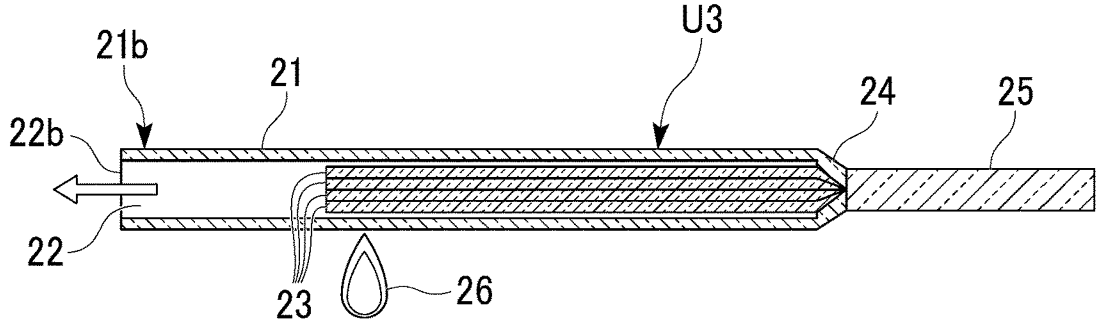
FIG. 19 is a cross-sectional view for illustrating thermal cutting of the second end portion tip of the cladding glass body in the tip sealing step performed after the step of FIG. 18.

As shown in FIG. 19 and FIG. 20, in the optical fiber preform production method of one or more embodiments, after the start of the vacuum suctioning step, in a state where vacuum suctioning is continued by a vacuum pump, the second end portion of the glass material unit U3 including the second end portion 21*b* of the cladding glass body 21 is heated and reduced in diameter using the flame 26 (for example, an oxyhydrogen flame) or the like and the second opening portion 22*b* of the cladding glass body 21 is closed and hermetically sealed (tip sealing step).

The second end portion of the glass material unit U3 in a state where the second opening portion 22*b* of the through-hole 22 is hermetically sealed in the tip sealing step is also referred to below as a tip sealing portion 27. The tip sealing portion 27 is solidified and formed by heating and reducing the diameter of the second end portion 21*b* of the cladding glass body 21 together with the tip end portions of the glass rods 23 on the inside thereof.

As shown in FIG. 20, in the tip sealing step of one or more embodiments, the tip sealing portion 27 in which the second end portion of the glass material unit U3 is processed with a tapered shape at the tip is formed.

In addition, in the tip sealing step of one or more embodiments, the tip of the second end portion of the glass material unit U3 is thermal cut to form the tip sealing portion 27 with a tapered shape at the tip.

The optical fiber preform production method of one or more embodiments is completed by completing the tip sealing step and enables an optical fiber preform 1C shown in FIG. 20 to be obtained.

In the inside of the cladding glass body 21 of the optical fiber preform 1C in FIG. 20, the first end portion of the through-hole 22 is hermetically sealed by the base end sealing portion 24 and inner holes 28 in which the second end portions are hermetically sealed by the tip sealing portion 27 are formed.

In the optical fiber preform production method of one or more embodiments, the tip sealing portion 27 is formed by performing the tip sealing step while continuing to vacuum suction the through-hole 22 using the vacuum pump. Due to this, the pressure in the inner holes 28 of the optical fiber preform 1C after completion of the tip sealing step is a negative pressure.

In the tip sealing step, the second end portion of the glass material unit U3 is heated and reduced in diameter to be solidified and the second end portion of the glass material unit U3 softened by heating is processed into a tapered shape to form the tip sealing portion 27.

In the tip sealing step, the internal pressure of the inner holes 28 secured by the formation of the tip sealing portion 27 is equal to the pressure of the through-hole 22 of the cladding glass body 21 before the tip sealing portion 27 is formed.

In the tip sealing step, the tip sealing portion 27 is formed in a state where the inside of the through-hole 22 of the cladding glass body 21 is reduced from atmospheric pressure by approximately 100 kPa using a vacuum pump. In the tip sealing step, the internal pressure of the through-hole 22 of the cladding glass body 21 is suitably, for example, 1 kPa or less. By forming the tip sealing portion 27 while setting the internal pressure of the through-hole 22 of the cladding glass body 21 to 1 kPa or less, the optical fiber preform 1C having the inner holes 28 having an internal pressure of 1 kPa or less is obtained.

The producing of the optical fiber 2 from the optical fiber preform 1C (the method for producing the optical fiber 2, the drawing step) also uses the drawing device 50 (refer to FIG. 7) to make it possible to continuously draw the optical fiber 2 while the integration of the cladding glass body 21 with the glass rods 23 progresses.

In the drawing of the optical fiber 2 from the optical fiber preform 1C using the drawing device 50, the optical fiber preform 1C is supported (suspended) by the lifting frame 51*a* of the drawing device 50, and the lower end portion (tip sealing portion 27) of the optical fiber preform 1C is inserted into the inner side through-hole 52*a* of the heating furnace 52. The lower end portion of the optical fiber preform 1C is drawn downward while maintained in a state in which it is heated to the heating temperature during drawing, at which the glass viscosity is lowered (softened). Due to this, the optical fiber 2 is formed. In addition, the optical fiber preform 1C is lowered by the lifting frame 51*a* so as to feed the optical fiber preform 1C into the inner side through-hole 52*a* of the heating furnace 52. Due to this, it is possible to continuously draw the optical fiber 2 from the lower end portion of the optical fiber preform 1C while the integration of the cladding glass body 21 with the glass rods 23 progresses.

The internal pressure of the inner holes 28 of the optical fiber preform 1C before the start of drawing may be set such that it is possible to maintain a negative pressure from the start of the drawing step to the completion, and may be, for example, approximately more than 1 kPa to 20 kPa. In the tip sealing step, for example, the inner holes 28 having an internal pressure of 20 kPa or less are formed, and a negative pressure in the inner holes 28 is secured in the drawing step. If the internal pressure of the inner holes 28 of the optical fiber preform 1C before starting drawing is 20 kPa or less, it is possible to draw an optical fiber having a sufficient length while maintaining the negative pressure in the inner holes 28 in the drawing step.

The internal pressure of the inner holes 28 is, for example, 20 kPa or less, but may be 10 kPa or less, or 1 kPa or less.

Next, one or more embodiments of the optical fiber preform production method, optical fiber preform, and optical fiber production method will be described with reference to FIG. 21 to FIG. 26.

Here, in FIG. 21 to FIG. 26, the same reference numerals are assigned to the same components as those in FIG. 15 to FIG. 20 and description thereof will be omitted or simplified.

Figure 26:
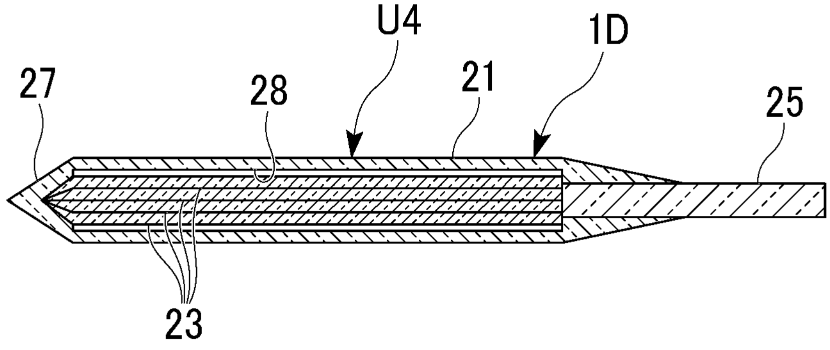
FIG. 26 is a cross-sectional view showing an optical fiber preform obtained by completing the tip sealing step of FIG. 25.

FIG. 26 is a vertical cross-sectional view showing the optical fiber preform 1D of one or more embodiments.

The optical fiber preform 1D shown in FIG. 26 is produced by the optical fiber preform production method of one or more embodiments.

Figure 21:
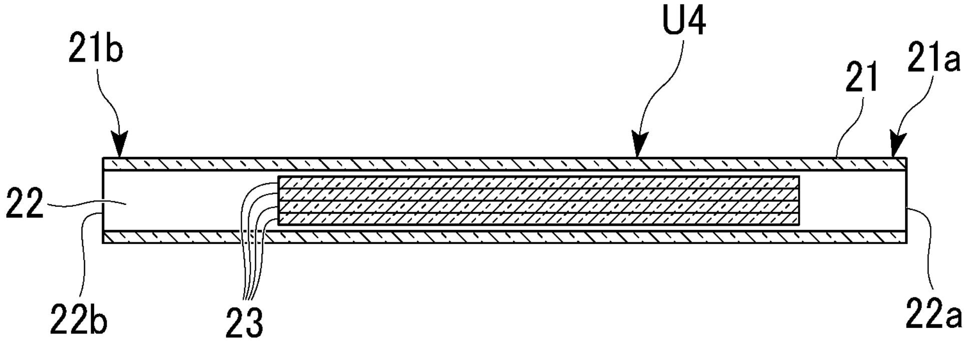
FIG. 21 is a cross-sectional view for illustrating a rod inserting step of the optical fiber preform production method according to one or more embodiments of the present invention.

In the optical fiber preform production method of one or more embodiments, as shown in FIG. 21, the plurality of glass rods 23 are inserted into the through-hole 22 inside the cylindrical shaped cladding glass body 21 (rod inserting step).

This rod inserting step is the same as the rod inserting step of one or more embodiments described above. It is also possible for the plurality of glass rods 23 inserted into the through-hole 22 inside the cladding glass body 21 to adopt the same configuration as that of one or more embodiments described above. That is, the plurality of glass rods 23 inserted into the through-hole 22 inside the cladding glass body 21 include one or more core glass rods. In addition, the plurality of glass rods 23 inserted into the through-hole 22 of the cladding glass body 21 may include one or more cladding glass rods. As the core glass rods, it is possible to use core glass rods with a configuration able to be adopted in one or more embodiments described above.

By performing the rod inserting step, a glass material unit U4 with a configuration in which the plurality of glass rods 23 are inserted into the through-hole 22 of the cladding glass body 21 is obtained.

Here, for the glass material unit U4, the axial direction of the through-hole 22 of the cladding glass body 21 is treated as the axial direction.

However, as shown in FIG. 21, a material is adopted in which the length of the glass rods 23 is shorter than the length of the cladding glass body 21 in the axial direction. In addition, the plurality of glass rods 23 in the through-hole 22 of the cladding glass body 21 are arranged at positions shifted from the first end portion 21*a* of the cladding glass body 21 to the second end portion 21*b* side of the cladding glass body 21. In the example of FIG. 21, there is a region where the glass rods 23 are not present in the first end portion 21*a* and the second end portion 21*b* of the cladding glass body 21 in the axial direction. In addition, in the axial direction, the region of the cladding glass body 21 where the glass rods 23 are not present is longer on the second end portion 21*b* side than on the first end portion 21*a* side.

As the plurality of glass rods 23 inserted into the through-hole 22 of the cladding glass body 21, glass rods having substantially the same length are used.

Figure 22:
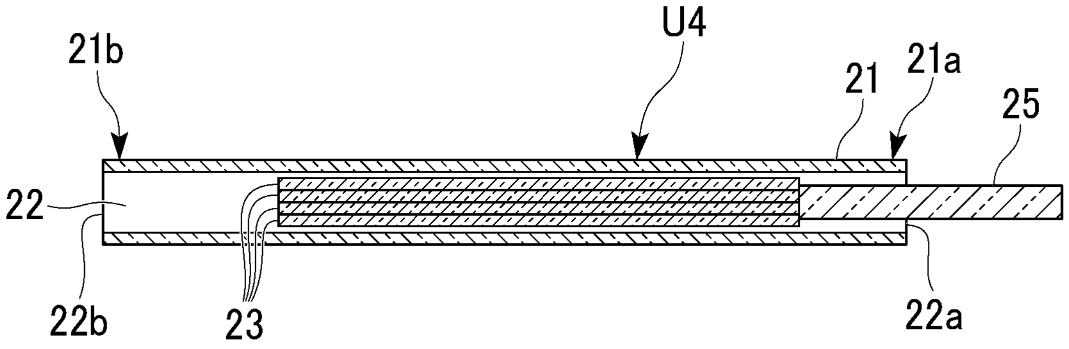
FIG. 22 is a cross-sectional view for illustrating the insertion of a dummy silica rod into the first end portion of the cladding glass body in a dummy rod integrating step performed after the step of FIG. 21.
Figure 23:
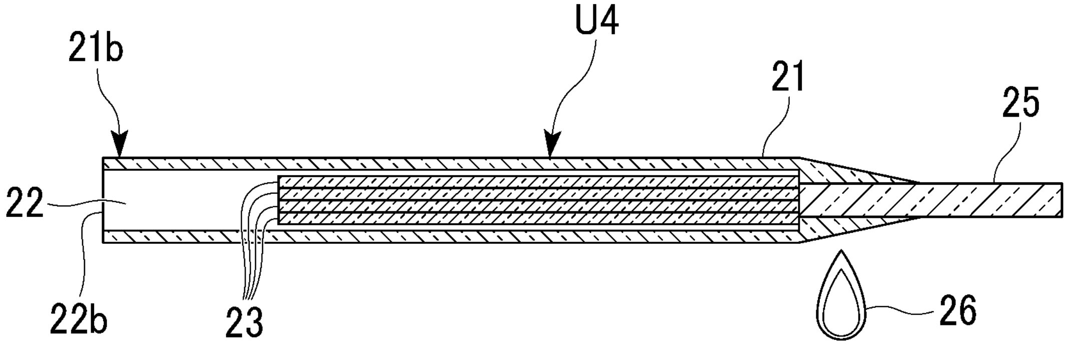
FIG. 23 is a cross-sectional view for illustrating a step of heating the first end portion of the cladding glass body to be integrated with the dummy silica rod after the step of FIG. 22 in the dummy rod integrating step.

Following the rod inserting step, as shown in FIG. 22 and FIG. 23, the first end portion 21*a* of the cladding glass body 21 is heated and integrated with the dummy silica rod 25 inserted on the first end portion 21*a* side of the cladding glass body 21 (dummy rod integrating step).

In this dummy rod integrating step, first, as shown in FIG. 22, the dummy silica rod 25 is inserted into the first end portion 21*a* side of the cladding glass body 21. In addition, in FIG. 22, the tips of the dummy silica rods 25 inserted into the first end portion 21*a* of the cladding glass body 21 abut against the tips of the plurality of glass rods 23 in the through-hole 22 of the cladding glass body 21.

The insertion of the dummy silica rod 25 into the first end portion 21*a* of the cladding glass body 21 is completed. Next, as shown in FIG. 23, the first end portion 21*a* of the cladding glass body 21 is heated and reduced in diameter using a flame 26 (for example, an oxyhydrogen flame) or the like and integrated with the dummy silica rod 25. As a result, the first opening portion 22*a* on the first end portion 21*a* side of the cladding glass body 21 is closed and hermetically sealed by the dummy silica rod 25.

The dummy silica rod 25 has a portion inserted in the first end portion 21*a* of the cladding glass body 21 in the axial direction and a portion protruding from the first end portion 21*a* of the cladding glass body 21. That is, in the axial direction, the length of the dummy silica rod 25 is longer than the region where the glass rods 23 of the first end portion 21*a* of the cladding glass body 21 are not present. The dummy silica rod 25 has a portion protruding from one end of the first end portion 21*a* of the cladding glass body 21 even after the dummy rod integrating step is completed.

Figure 24:
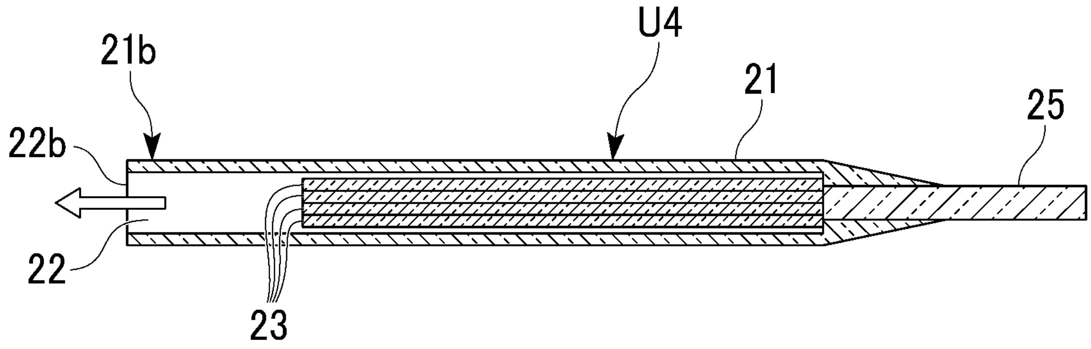
FIG. 24 is a cross-sectional view for illustrating a vacuum suctioning step performed after the step of FIG. 23.

After the dummy rod integrating step, as shown in FIG. 24, a vacuum pump (not shown) is connected to the second end portion 21*b* of the cladding glass body 21 and the inside of the through-hole 22 of the cladding glass body 21 is vacuum suctioned by driving of the vacuum pump (vacuum suctioning step).

In the vacuum suctioning step, for example, it is also possible to alternately perform the supply of helium gas from the gas supply device connected to the second end portion 21*b* of the cladding glass body 21 to the through-hole 22 of the cladding glass body 21 and the vacuum suctioning by a vacuum pump.

Figure 25:
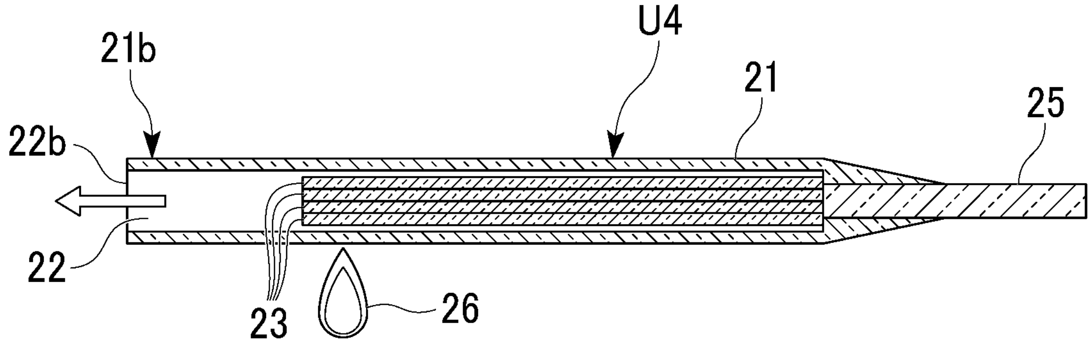
FIG. 25 is a cross-sectional view for illustrating thermal cutting of the second end portion tip of the cladding glass body in the tip sealing step performed after the step of FIG. 24.

As shown in FIG. 25 and FIG. 26, in the optical fiber preform production method of one or more embodiment, after starting the vacuum suctioning step, in a state where vacuum suctioning by the vacuum pump is continued, the second end portion of the glass material unit U4 including the second end portion 21*b* of the cladding glass body 21 is heated and reduced in diameter using the flame 26 (for example, oxyhydrogen flame) or the like. Due to this, the second opening portion 22*b* of the second end portion 21*b* of the cladding glass body 21 is closed and hermetically sealed (tip sealing step).

In the tip sealing step, the second end portion 21*b* of the cladding glass body 21 is heated and reduced in diameter to solidify together with the tip end portions of the core glass rods 23 on the inside thereof at the second end portion of the glass material unit U4. Due to this, the tip sealing portion 27 is formed at the second end portion of the glass material unit U4. In addition, the second opening portion 22*b* of the through-hole 22 is hermetically sealed.

As shown in FIG. 26, in the tip sealing step of one or more embodiments, the second end portion of the glass material unit U4 is processed into a tapered shape at the tip to form the tip sealing portion 27.

In addition, in the tip sealing step embodiments, the tip of the second end portion of the glass material unit U4 is thermal cut and the tip sealing portion 27 with a tapered shape at the tip is formed.

The optical fiber preform production method embodiments is completed by completing the tip sealing step and enables the optical fiber preform 1D shown in FIG. 26 to be obtained.

In the inside of the cladding glass body 21 of the optical fiber preform 1D in FIG. 26, the first end portion side of the through-hole 22 is hermetically sealed by the dummy silica rod 25 and the inner holes 28 in which the second end portion is hermetically sealed by the tip sealing portion 27 are secured.

Also in the optical fiber preform production method of one or more embodiments, in the same manner one or more embodiments described above, the tip sealing step is performed while the vacuum suctioning of the through-hole 22 by the vacuum pump is continued to form the tip sealing portion 27. Due to this, a state where the internal pressure of the inner holes 28 of the optical fiber preform 1D after completion of the tip sealing step is a negative pressure (negative pressure with respect to atmospheric pressure) is secured.

In the same manner as the optical fiber preform production method described above, in the tip sealing step, the tip sealing portion 27 is formed in a state where the inside of the through-hole 22 of the cladding glass body 21 is reduced from atmospheric pressure by approximately 100 kPa using a vacuum pump. In the tip sealing step, the internal pressure of the inner holes 28 after the tip sealing portion 27 is formed is equal to the internal pressure of the through-hole 22 of the cladding glass body 21 before the tip sealing portion 27 is formed.

In the tip sealing step, the internal pressure of the through-hole 22 of the cladding glass body 21 is suitably, for example, 1 kPa or less.

The producing of the optical fiber using the optical fiber preform 1D (the optical fiber production method) is performed in the same manner as the producing of the optical fiber from the optical fiber preform 1C of one or more embodiments using the drawing device 50 (refer to FIG. 7).

The internal pressure of the inner holes 28 of the optical fiber preform 1D before starting drawing is set to 20 kPa or less. With the optical fiber preform 1D where the internal pressure of the inner holes 28 before starting the drawing is 20 kPa or less, it is possible to draw an optical fiber having a sufficient length while maintaining the negative pressure in the inner holes 28 in the drawing step.

The internal pressure of the inner holes 28 is, for example, 20 kPa or less, but may be 10 kPa or less, or 1 kPa or less.

Next, one or more embodiments of the optical fiber preform production method, optical fiber preform, and optical fiber production method will be described with reference to FIG. 27 to FIG. 32.

Here, in FIG. 27 to FIG. 32, the same reference numerals are assigned to the same components as those in FIG. 8 to FIG. 14 and description thereof will be omitted or simplified.

Figure 32:
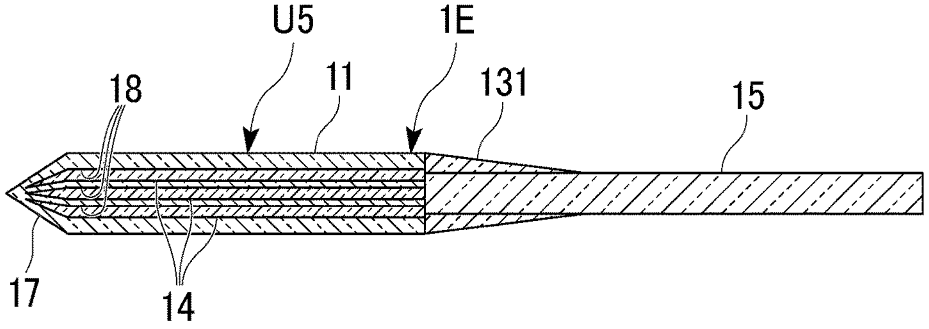
FIG. 32 is a cross-sectional view showing an optical fiber preform obtained by completing the tip sealing step of FIG. 31.

FIG. 32 is a vertical cross-sectional view showing the optical fiber preform 1E of one or more embodiments.

The optical fiber preform 1E shown in FIG. 32 is produced by the optical fiber preform production method of one or more embodiments.

Figure 27:
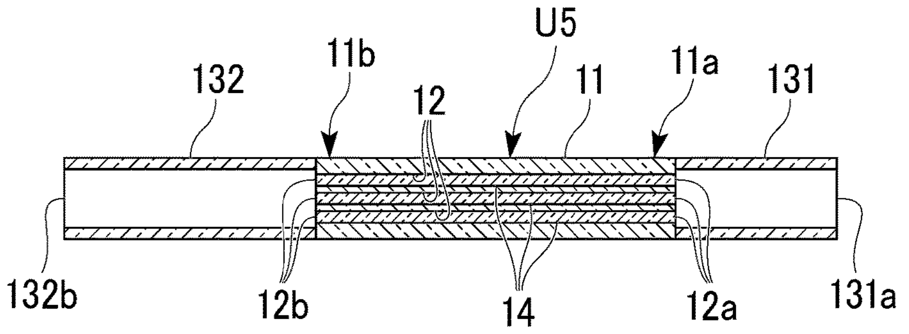
FIG. 27 is a cross-sectional view for illustrating a rod inserting step and a dummy silica tube welding step in the optical fiber preform production method according to one or more embodiments of the present invention.

In the optical fiber preform production method of one or more embodiments, as shown in FIG. 27, first, in the same manner as the optical fiber preform production method described above, a dummy silica tube welding step and a rod inserting step are performed. That is, dummy silica tubes 131 and 132 are welded and connected to both ends in the axial direction of the cladding glass body 11 in which the plurality of through-holes 12 are formed, and the core glass rods 14 are inserted into the through-holes 12 of the cladding glass body 11.

Also in the optical fiber preform production method of one or more embodiments, between the dummy silica tube welding step and the rod inserting step, an etching step for etching the inner surface of each through-hole 12 of the cladding glass body 11 with an etching gas or an etching solution, a cleaning step for cleaning the insides of the through-holes 12, and a drying step may be performed.

Figure 28:
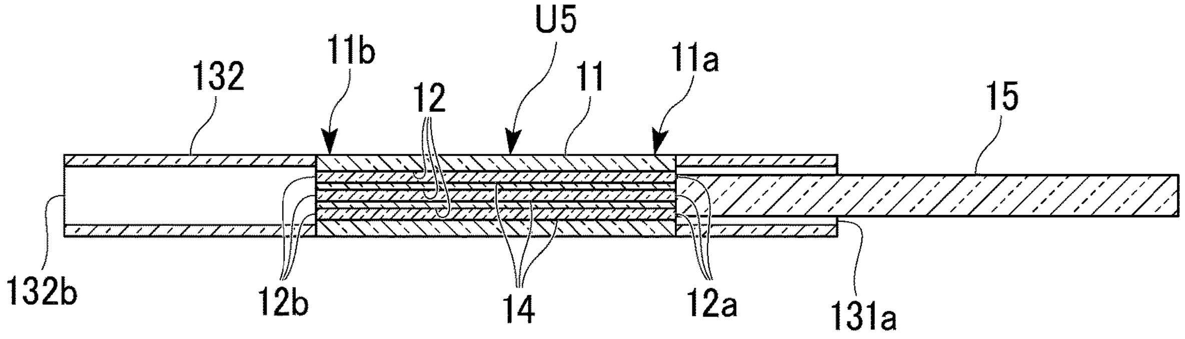
FIG. 28 is a cross-sectional view for illustrating the insertion of a dummy silica rod into the first end portion of the cladding glass body in the dummy rod integrating step performed after the step of FIG. 27.
Figure 29:
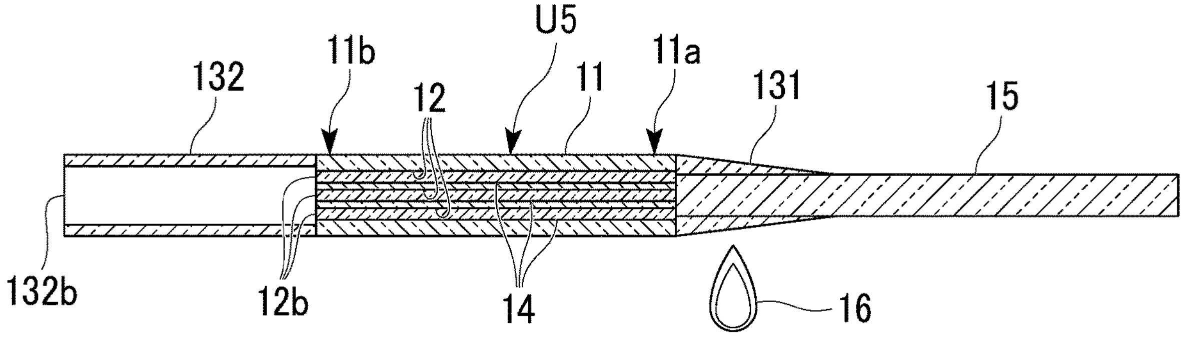
FIG. 29 is a cross-sectional view for illustrating a step of heating the first dummy silica tube to be integrated with the dummy silica rod after the step of FIG. 28 in the dummy rod integrating step.

Following the dummy silica tube welding step and the rod inserting step, the dummy silica rod 15 is inserted into the first dummy silica tube 131 as shown in FIG. 28. Furthermore, as shown in FIG. 29, the first dummy silica tube 131 is heated and reduced in diameter to integrate the first dummy silica tube 131 with the dummy silica rod 15 (dummy rod integrating step).

In the dummy rod integrating step, the first dummy silica tube 131 is heated and reduced in diameter using the flame 16 such as an oxyhydrogen flame and integrated with the dummy silica rod 15. Due to this, the first tip opening end 131*a* of the first dummy silica tube 131 is closed (hermetically sealed).

The dummy silica rod 15 is fixed to the cladding glass body 11 through the first dummy silica tube 131. The first dummy silica tube 131 is a connecting glass tube for connecting the dummy silica rod 15 to the cladding glass body 11. Below, the dummy silica rod 15 is also referred to as a connecting glass tube.

In FIG. 28, the tip of the dummy silica rod 15 inserted into the first dummy silica tube 131 abuts the first end portion 11*a* of the cladding glass body 11. As the dummy silica rod 15, a rod having a length which protrudes from the first tip opening end 131*a* of the first dummy silica tube 131 when the tip thereof abuts one end of the cladding glass body 11 is used. That is, in the axial direction, the dummy silica rod 15 has a portion inserted in the first end portion 11*a* of the cladding glass body 11 and a portion protruding from the first tip opening end 131*a* of the first dummy silica tube 131.

As shown in FIG. 29, in the dummy rod integrating step, the first dummy silica tube 131 is heated and reduced in diameter to be integrated with the dummy silica rod 15 while maintaining the state where the tip of the dummy silica rod 15 abuts the first end portion 11*a* of the cladding glass body 11. As a result, the first dummy silica tube 131 is integrated with the entire portion of the dummy silica rod 15 inserted into the first dummy silica tube 131. Due to this, the first opening portion 12*a* of the cladding glass body 11 is sealed by the dummy silica rod 15 and the dummy silica tube 131.

Figure 30:
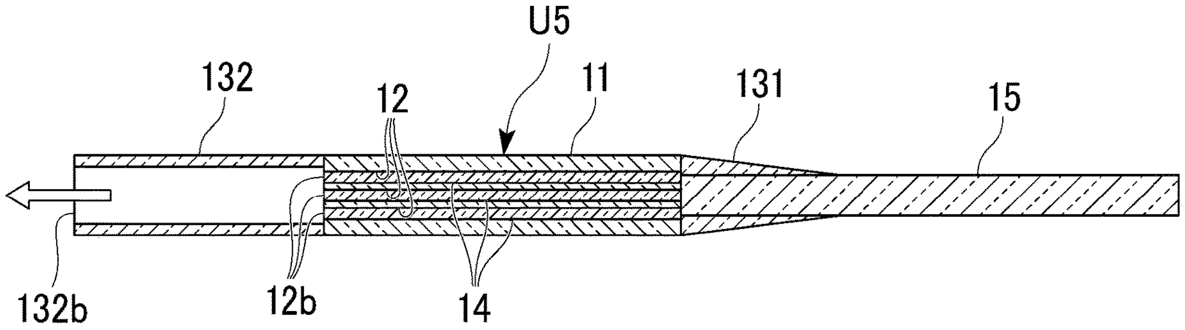
FIG. 30 is a cross-sectional view for illustrating a vacuum suctioning step performed after the step of FIG. 29.

Following the dummy rod integrating step, as shown in FIG. 30, the insides of the through-holes 12 of the cladding glass body 11 are vacuum suctioned (vacuum suctioning step) using a vacuum pump (not shown) connected to the second tip opening end 132*b* of the second dummy silica tube 132.

The vacuum suctioning step is the same as the vacuum suctioning step of the optical fiber preform production method of one or more embodiments.

Figure 31:
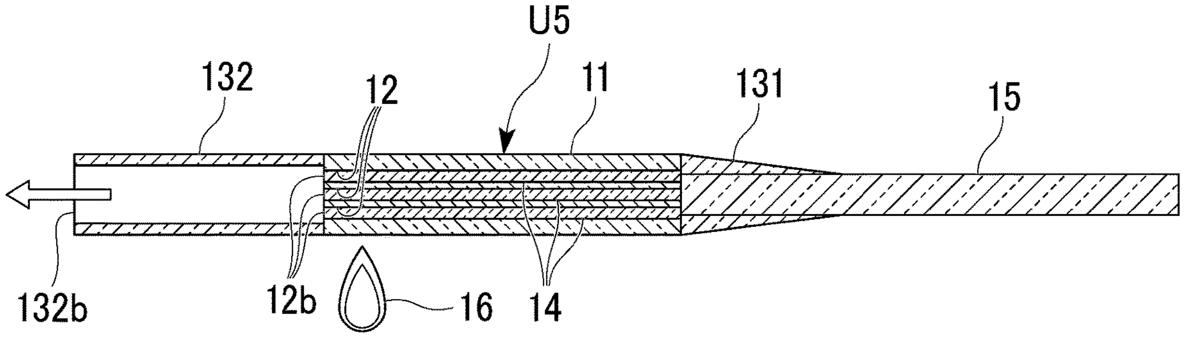
FIG. 31 is a cross-sectional view for illustrating thermal cutting of the second end portion tip of the cladding glass body in the tip sealing step performed after the step of FIG. 30.

In addition, in the optical fiber preform production method according to one or more embodiments, as shown in FIG. 31 and FIG. 32, after the vacuum suctioning step is started, in a state where the vacuum suctioning is continued by the vacuum pump, the tip sealing portion 17 is formed at the second end portion of the glass material unit U5 (the tip sealing step). The tip sealing step of one or more embodiments is the same as the tip sealing step of the optical fiber preform production method described above.

As shown in FIG. 32, in the same manner as the tip sealing step of the optical fiber preform production method described above, the tip sealing portion 17 in which the second end portion of the glass material unit U5 is processed into a tapered shape at the tip is formed. Furthermore, in the process of forming the tip sealing portion 17, the tip of the second end portion of the glass material unit U5 is thermal cut to remove the second dummy silica tube 132 from the cladding glass body 11.

The optical fiber preform production method of one or more embodiments is completed by completing the tip sealing step and enables an optical fiber preform 1E shown in FIG. 32 to be obtained.

The inner holes 18 are secured in the inside of the cladding glass body 11 of the optical fiber preform 1E in FIG. 32. The inner holes 18 are hermetically sealed at the first end portions of the through-holes 12 by the dummy silica rod 15 and hermetically sealed at the second end portion by the tip sealing portion 17.

In the tip sealing step, the tip sealing portion 17 is formed in a state where the insides of the through-holes 12 of the cladding glass body 11 are reduced from atmospheric pressure by approximately 100 kPa using a vacuum pump. In the tip sealing step, the internal pressure of the through-holes 12 of the cladding glass body 11 is suitably, for example, 1 kPa or less. By forming the tip sealing portion 17 while setting the internal pressure of the through-holes 12 of the cladding glass body 11 to 1 kPa or less, the optical fiber preform 1E having the inner holes 18 with an internal pressure of 1 kPa or less is obtained.

The producing of the optical fiber using the optical fiber preform 1E (the method for producing the optical fiber) is performed in the same manner as the producing of the optical fiber from the optical fiber preform 1B using the drawing device 50 (refer to FIG. 7).

The internal pressure of the inner holes 18 of the optical fiber preform 1E before starting drawing is 20 kPa or less. With the optical fiber preform 1E where the internal pressure of the inner holes 18 before starting drawing is 20 kPa or less, it is possible to draw an optical fiber of sufficient length while maintaining the negative pressure for the internal pressure of the inner holes 18 in the drawing step.

The internal pressure of the inner holes 18 is, for example, 20 kPa or less, but may be 10 kPa or less, or 1 kPa or less.

As the insertion glass rods such as the core glass rods 14 used for producing the optical fiber preform 1E, it is possible to suitably use insertion glass rods having outer diameters of 80% to 98% of the inner diameters of the through-holes 12 of the cladding glass body 11. In the optical fiber 2 obtained by drawing, in order to increase the precision of arranging the core at the target position, the outer diameters of the insertion glass rods may be 90% to 98% of the inner diameters of the through-holes 12 of the cladding glass body 11, or may be 95% to 98%.

According to the optical fiber preform production method and the optical fiber preform of one or more embodiments, since inner holes with a negative pressure are secured in the optical fiber preform, there is no need to perform vacuum suctioning inside the preform when drawing the optical fiber. As a result, it is possible to secure a large effective drawing region in the optical fiber preform in the axial direction and to easily realize an increase in the drawing length of the optical fiber.

For the optical fiber preforms of one or more embodiments, it is possible to use the drawing device 50 illustrated in FIG. 7 for drawing an optical fiber.

The optical fiber preforms of one or more embodiments each have dummy silica rods 15 or 25 in which protruding portions that protrude from the first tip opening end 131*a* (refer to FIG. 29) of the first dummy silica tube 131 welded to the cladding glass body 11 or the first end portion 21*a* of the cladding glass body 21 are secured.

In the optical fiber preforms of one or more embodiments, in a case where the drawing device 50 illustrated in FIG. 7 is used in the drawing of the optical fiber, the protruding portions of the dummy silica rods 15 or 25 described above welded to the cladding glass body 11 or the first end portion 21*a* of the cladding glass body 21 are attached to the lifting frame 51*a*, and suspended on the lifting frame 51*a* such that the tip sealing portions 17 or 27 are at the lower ends.

According to the optical fiber preform production method and the optical fiber preform of one or more embodiments, since the internal pressure of the optical fiber preform is a negative pressure, there is no need to perform the vacuum suctioning inside the preform when drawing the optical fiber. As a result, it is possible to secure a long drawing effective region in the optical fiber preform in the axial direction and to easily realize an increase in the drawing length of the optical fiber.

Next, one or more embodiments of the optical fiber preform production method, optical fiber preform, and optical fiber production method will be described with reference to FIG. 33A to FIG. 33G.

In FIG. 33A to FIG. 33G, the same reference numerals are assigned to the same components as those in FIG. 8 to FIG. 14 and description thereof will be omitted or simplified.

Figure 33A:
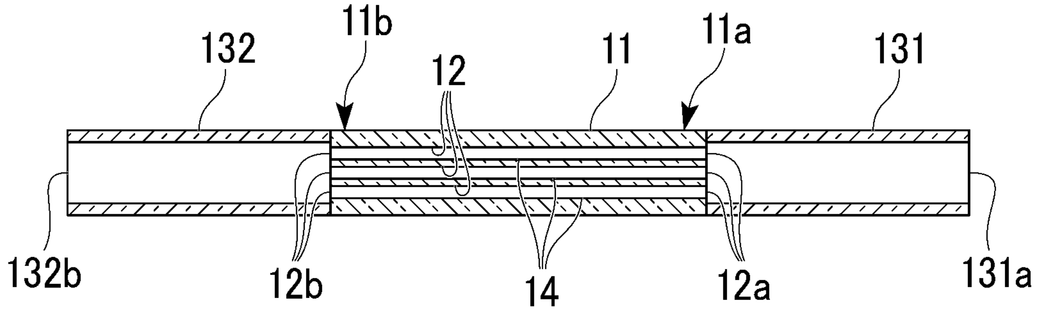
FIG. 33A is a cross-sectional view for illustrating a dummy silica tube welding step of an optical fiber preform production method according to one or more embodiments of the present invention.
Figure 33B:
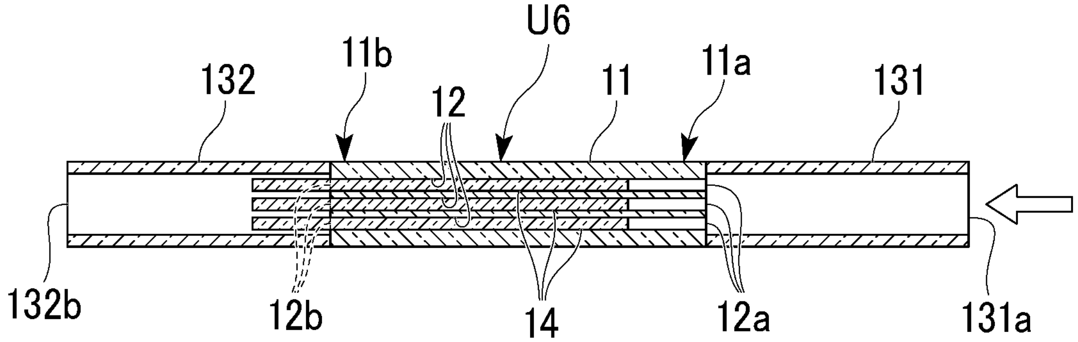
FIG. 33B is a cross-sectional view for illustrating a rod inserting step performed after the step of FIG. 33A.
Figure 33C:
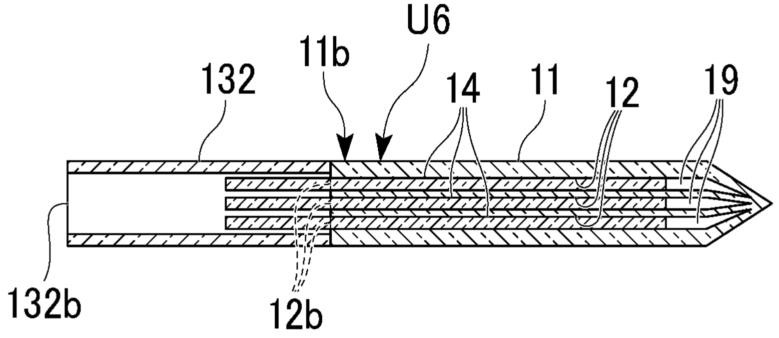
FIG. 33C is a cross-sectional view for illustrating a one-end thermal cutting step performed after the step of FIG. 33B.
Figure 33D:
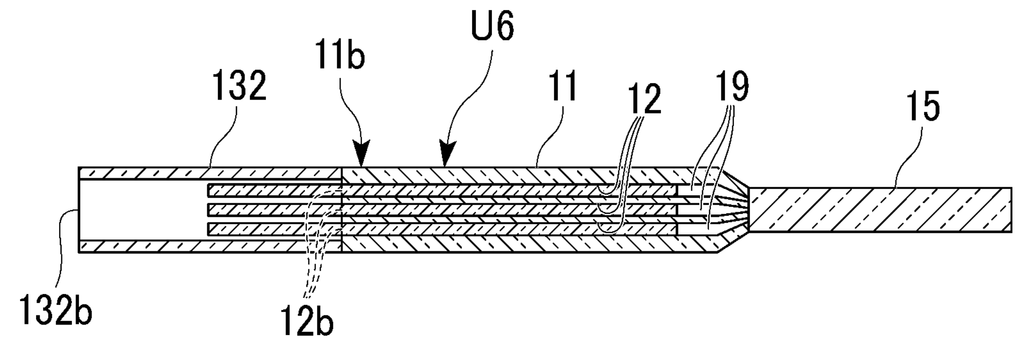
FIG. 33D is a cross-sectional view for illustrating a dummy rod integrating step performed after the step of FIG. 33C.
Figure 33E:
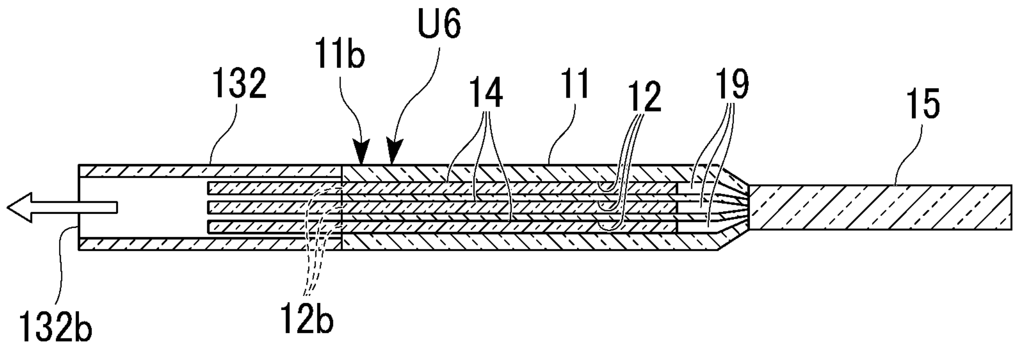
FIG. 33E is a cross-sectional view for illustrating a vacuum suctioning step performed after the step of FIG. 33D.
Figure 33F:
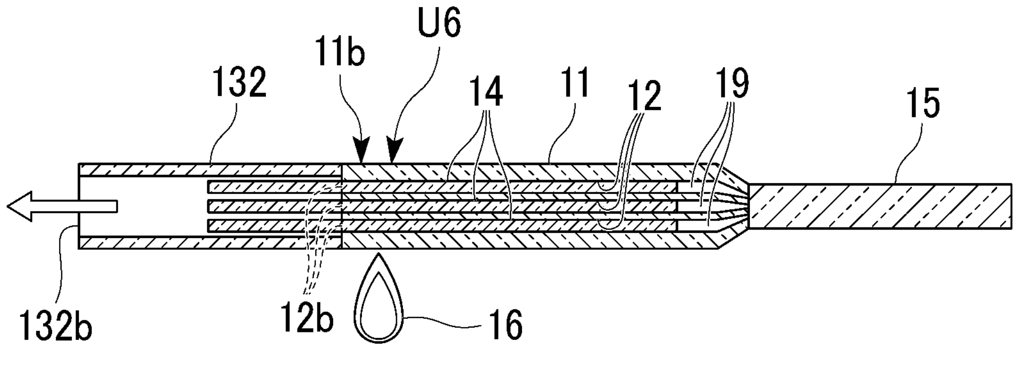
FIG. 33F is a cross-sectional view for illustrating thermal cutting of the second end portion tip of the cladding glass body in the tip sealing step performed after the step of FIG. 33E.
Figure 33G:
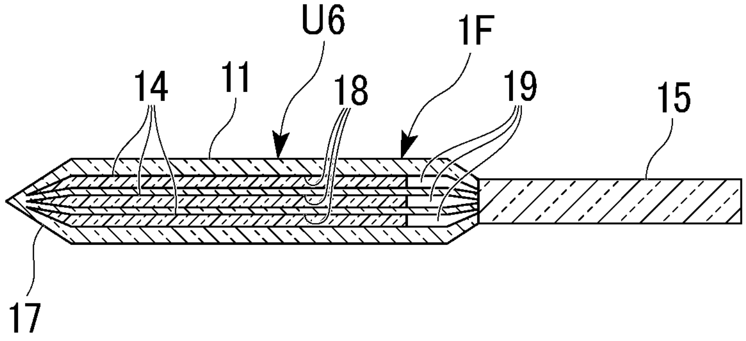
FIG. 33G is a cross-sectional view showing an optical fiber preform obtained by completing the tip sealing step of FIG. 33F.

FIG. 33G is a vertical cross-sectional view showing an optical fiber preform 1F of one or more embodiments.

The optical fiber preform 1F in which a gap portion 19 is secured in the inside as shown in FIG. 33G is produced by the optical fiber preform production method of one or more embodiments.

The optical fiber preform production method according to one or more embodiments discussed below is based on the optical fiber preform production method according to one or more embodiments discussed above, with the following points changed. The core glass rods 14 inserted into the through-holes 12 of the cladding glass body 11 are away from one end of the through-holes 12 to the other end side. That is, in the axial direction, the first end portions of the core glass rods 14 are positioned further inward than the first end portion 11*a* of the cladding glass body 11. In addition, the second end portions of the core glass rods 14 are positioned to the outside of the second end portion 11*b* of the cladding glass body 11 in the axial direction. In a state where the second end portions of the core glass rods 14 protrude from the second end portion 11*b* of the cladding glass body 11, the dummy rod integrating step (FIG. 33C and FIG. 33D) and the tip sealing step (FIG. 33F) are performed.

The gap portion 19 of the optical fiber preform 1F shown in FIG. 33G is a region (space) in which the core glass rods 14 are not inserted. The gap portion 19 is formed by sealing both ends in the axial direction of the through-holes 12 of the cladding glass body 11 by the dummy rod integrating step and the tip sealing step after the rod inserting step. The gap portion 19 is secured on one end (the right end in FIG. 33G) side of the inner holes 18.

In the optical fiber preform production method of one or more embodiments, first the dummy silica tube welding step (FIG. 33A) and the rod inserting step (FIG. 33B) are performed.

In the dummy silica tube welding step shown in FIG. 33A, a first silica tube welding operation for welding the first dummy silica tube 131 to the first end portion 11*a* of the cladding glass body 11 and a second silica tube welding operation for welding the second dummy silica tube 132 to the second end portion 11B of the cladding glass body 11 are performed while causing dry air to flow through each of the through-holes 12 of the cladding glass body 11. For these steps, it is possible to adopt various methods in the dummy silica tube welding step according to one or more embodiments. Since the methods which are able to be used in the dummy silica tube welding step are the same the methods in the dummy silica tube welding step according to one or more embodiments, detailed description thereof will be omitted here.

Following the dummy silica tube welding step, the rod inserting step shown in FIG. 33B is performed. Due to this, a glass material unit U6 with a configuration in which the core glass rods 14 are inserted into each of the plurality of through-holes 12 of the cladding glass body 11 is obtained.

However, as shown in FIG. 33B, the rod inserting step of one or more embodiments may include setting a state in which the core glass rods 14 inserted into the through-holes 12 of the cladding glass body 11 are away from the first end portions of the through-holes 12 to the side near to the second end portion and the second end portions of the core glass rods 14 protrude from the second end portion 11*b* of the cladding glass body 11.

The rod inserting step may include inserting a core identifying marker glass rod instead of the core glass rods 14 into one or more through-holes among the plurality of through-holes 12 of the cladding glass body 11. For both types of insertion glass rods, that is, the core glass rods 14 and the core identifying marker glass rod, an insertion manner which is the same as the insertion manner of the core glass rods 14 described in one or more embodiments with respect to the cladding glass body 11 is adopted.

Between the dummy silica tube welding step and the rod inserting step, an etching step for etching the inner surface of each through-hole 12 of the cladding glass body 11 with an etching gas or an etching solution, a cleaning step for cleaning the insides of the through-holes 12, and a drying step may be performed.

It is possible to perform the etching step, the cleaning step, and the drying step in the same manner as described in the optical fiber preform production method of one or more embodiments and the details thereof will be omitted here.

Following the rod inserting step, as shown in FIG. 33C, the tip of the first end portion 11*a* of the cladding glass body 11 is thermal cut to remove the first dummy silica tube 131 from the cladding glass body 11 (one-end thermal cutting step). Furthermore, as shown in FIG. 33D, the dummy silica rod 15 is welded and integrated with the first end portion 11*a* of the cladding glass body 11 after the first dummy silica tube 131 is removed (dummy rod integrating step).

In the dummy rod integrating step, as shown in FIG. 33C and FIG. 33D, the core glass rods 14 inserted into the through-holes 12 of the cladding glass body 11 is away from the first end portions of the through-holes 12 to the side near to the second end portion. As described above, it is possible to perform the above step in the same manner as the dummy rod integrating step according to one or more embodiments except that the second end portions of the core glass rods 14 are set to protrude from the second end portion 11*b* of the cladding glass body 11.

As shown in FIG. 33C, in the one-end thermal cutting step, the tip of the first end portion 11*a* of the cladding glass body 11 is thermal cut and the first end portion 11*a* of the cladding glass body 11 is formed in a tapered shape at the tip.

After removing the first dummy silica tube 131, the dummy silica rod 15 is welded and integrated with the first end portion 11*a* of the cladding glass body 11 (base end dummy rod integrating step). In the base end dummy rod integrating step, the dummy silica rod 15 is abutted while heating the first end portion 11*a* of the cladding glass body 11 formed with a tapered shape at the tip and the dummy silica rod 15 is coaxially aligned, welded, and integrated with the cladding glass body 11.

The base end dummy rod integrating step is performed in a state where the core glass rods 14 inserted into the through-holes 12 of the cladding glass body 11 protrude from the second end portion 11*b* of the cladding glass body 11. That is, since the core glass rods 14 are away from the base end sealing portion, it is possible to prevent thermal welding or the like of the base end sealing portion to the core glass rods 14.

Following the dummy rod integrating step, as shown in FIG. 33E, a vacuum pump (not shown) is connected to the second tip opening end 132*b* of the second dummy silica tube 132 and the insides of the through-holes 12 of the cladding glass body 11 are vacuum suctioned by the driving of the vacuum pump (vacuum suctioning step). It is possible to perform the vacuum suctioning step in the same manner as the vacuum suctioning step described in one or more embodiments.

As shown in FIG. 33F and FIG. 33G, in the optical fiber preform production method of one or more embodiments, after the vacuuming suctioning step is started, the second end portion of the glass material unit U6 is heated and reduced in diameter to close and hermetically seal all of the second opening portions 12*b* of the cladding glass body 11 (tip sealing step).

It is possible to perform the tip sealing step in the same manner as the tip sealing step according to one or more embodiments except that the core glass rods 14 inserted into the through-holes 12 of the cladding glass body 11 are away from the first end portions of the through-holes 12 to the side near to the second end portion and the second end portions of the core glass rods 14 are set to protrude from the second end portion 11*b* of the cladding glass body 11.

In the tip sealing step, the second end portion of the glass material unit U6 including the second end portion 11*b* of the cladding glass body 11 is heated and reduced in diameter using the flame 16 (for example, an oxyhydrogen flame) or the like in a state where the vacuum suctioning is continued by the vacuum pump. By closing and hermetically sealing all the second opening portions 12*b* of the cladding glass body 11, the tip sealing portion 17 is formed. The tip sealing portion 17 is solidified by heating and reducing the diameter of the second end portion 11*b* of the cladding glass body 11 together with the tip end portion of the core glass rods 14 on the inside thereof.

As shown in FIG. 33G, in the tip sealing step of one or more embodiments, the tip sealing portion 17 in which the second end portion of the glass material unit U6 is processed into a tapered shape at the tip is formed.

In addition, in the tip sealing step of one or more embodiments, in the process of forming the tip sealing portion 17 with a tapered shape at the tip, the tip of the second end portion of the glass material unit U6 is thermal cut, and the second dummy silica tube 132 and the parts of core glass rods 14 from which protrudes from the second end portion 11*b* of the cladding glass body 11 are removed from the cladding glass body 11.

When the tip sealing step is completed, the inner holes 18 are secured in the inside of the cladding glass body 11. In the inner holes 18, the first end portions of the through-holes 12 are hermetically sealed by the dummy silica rod 15 and the second end portions are hermetically sealed by the tip sealing portion 17.

In the tip sealing step, the tip sealing portion 17 is formed while applying a vacuum pressure of 1 kPa or less to the through-holes 12 of the cladding glass body 11 by vacuum suctioning by a vacuum pump. Due to this, the optical fiber preform 1F having the inner holes 18 where the internal pressure is a negative pressure (for example, 1 kPa or less) is obtained.

However, as shown in FIG. 33F, the tip sealing step is performed in a state where the core glass rods 14 in the through-holes 12 are away from the first end portions of the through-holes 12 to the side near to the second end portion.

For this reason, when the tip sealing step is completed, the inner holes 18 with a configuration having the gap portion 19 are secured in the cladding glass body 11. The gap portion 19 is arranged on the first end portion (the right end in FIG. 33G) side of the cladding glass body 11. In the axial direction, the core glass rods 14 are not inserted into the gap portion 19. In the axial direction, the core glass rods 14 are inserted in a region other than the gap portion 19 of the inner holes 18.

The optical fiber preform production method of one or more embodiments is completed by completing the tip sealing step, and as shown in FIG. 33G, enables the optical fiber preform 1F in which the inner holes 18 having the gap portion 19 are secured in the inside of the cladding glass body 11 to be obtained.

The producing of the optical fiber using the optical fiber preform 1F (the optical fiber production method) is performed in the same manner as the producing of the optical fiber from the optical fiber preform 1B using the drawing device 50 (refer to FIG. 7).

The internal pressure of the inner holes 18 of the optical fiber preform 1F before starting drawing is 20 kPa or less.

In the producing of the optical fiber using the optical fiber preform 1F, it is possible to continuously draw the optical fiber 2 from the tip sealing portion 17 while the integration of the cladding glass body 11 with the insertion glass rods in the cladding glass body 11 progresses. The volume of the inner holes 18 of the cladding glass body 11 decreases as the integration of the cladding glass body 11 with the insertion glass rods progresses.

In the production of an optical fiber using the optical fiber preform 1F, the volumes of the inner holes 18 are reduced as the integration of the cladding glass body 11 with the insertion glass rods progresses. Even in this case, it is possible to suppress an increase in the internal pressure of the inner holes 18 by the gap portion 19 in the cladding glass body 11 in one or more embodiments. As a result, in the producing of an optical fiber using the optical fiber preform 1F, it is possible to draw an optical fiber having a sufficient length while maintaining the negative pressure for the internal pressure of the inner holes 18 in the drawing step.

Next, one or more embodiments of the optical fiber preform production method, optical fiber preform, and optical fiber production method will be described with reference to FIG. 34A to FIG. 34G.

In FIG. 34A to FIG. 34G, the same reference numerals are assigned to the same components as those in FIG. 33A to FIG. 33G and description thereof will be omitted or simplified.

Figure 34A:
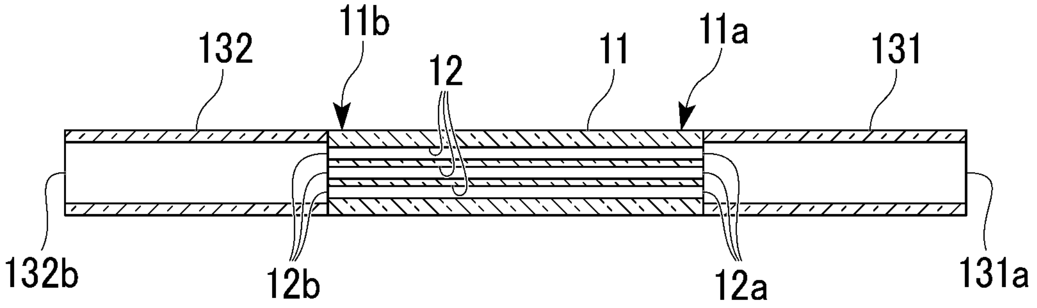
FIG. 34A is a cross-sectional view for illustrating a dummy silica tube welding step of an optical fiber preform production method according to one or more embodiments of the present invention.
Figure 34B:
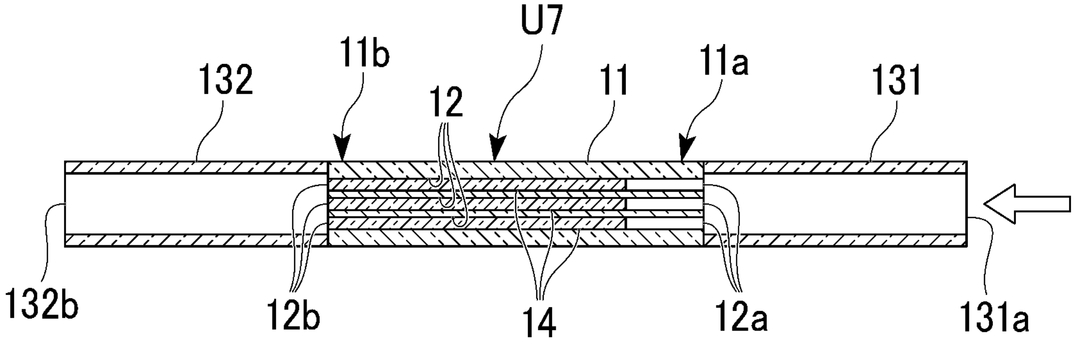
FIG. 34B is a cross-sectional view for illustrating a rod inserting step performed after the step of FIG. 34A.
Figure 34C:
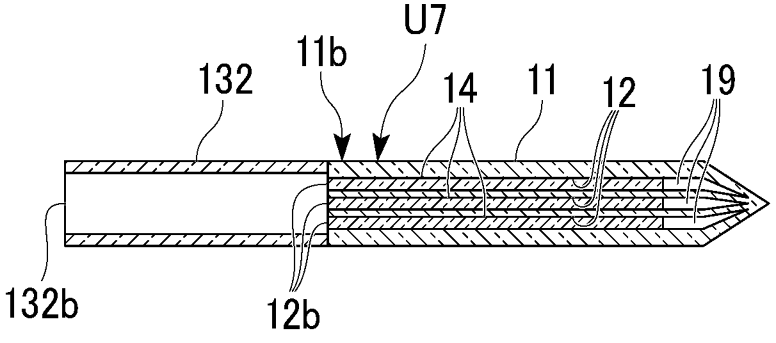
FIG. 34C is a cross-sectional view for illustrating a one-end thermal cutting step performed after the step of FIG. 34B.
Figure 34D:
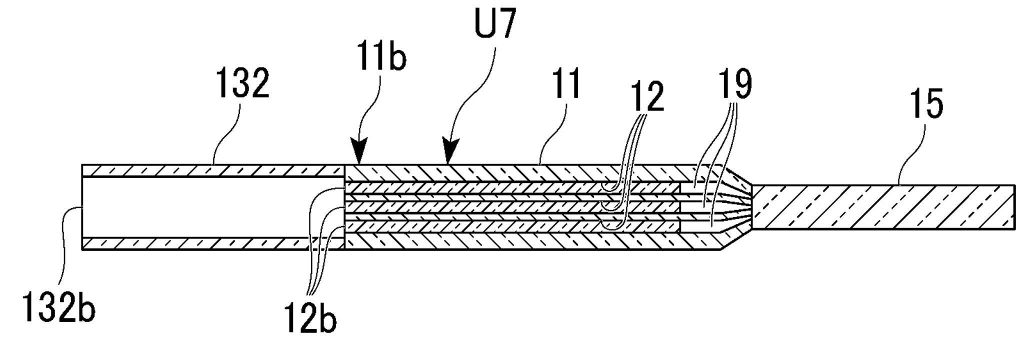
FIG. 34D is a cross-sectional view for illustrating a dummy rod integrating step performed after the step of FIG. 34C.
Figure 34E:
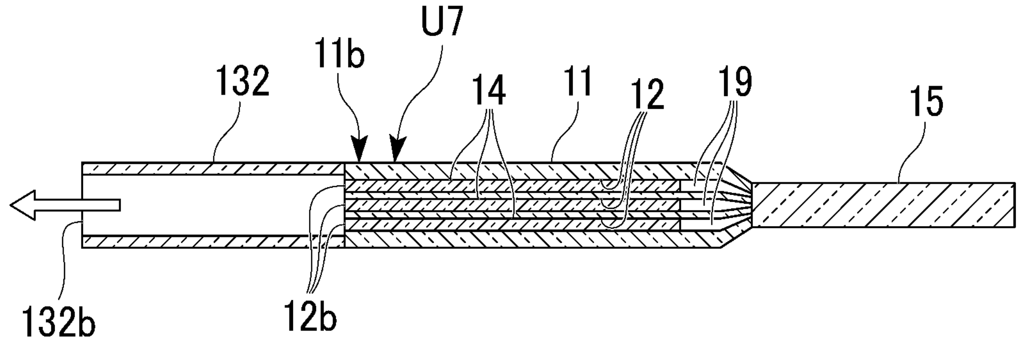
FIG. 34E is a cross-sectional view for illustrating a vacuum suctioning step performed after the step of FIG. 34D.
Figure 34F:
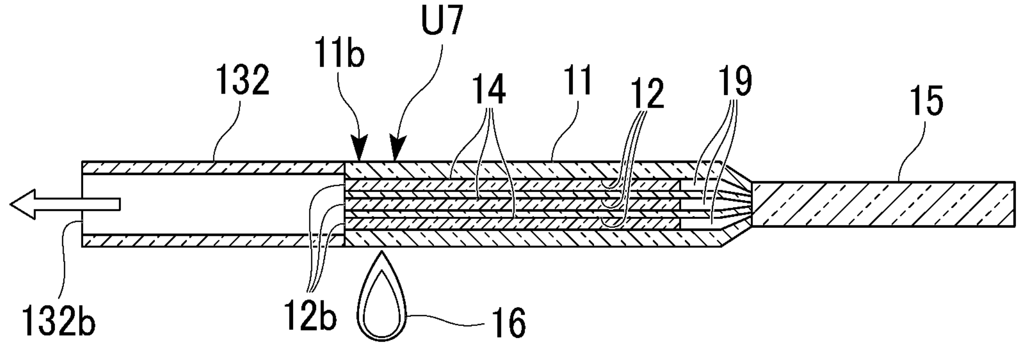
FIG. 34F is a cross-sectional view for illustrating thermal cutting of the second end portion tip of the cladding glass body in the tip sealing step performed after the step of FIG. 34E.
Figure 34G:
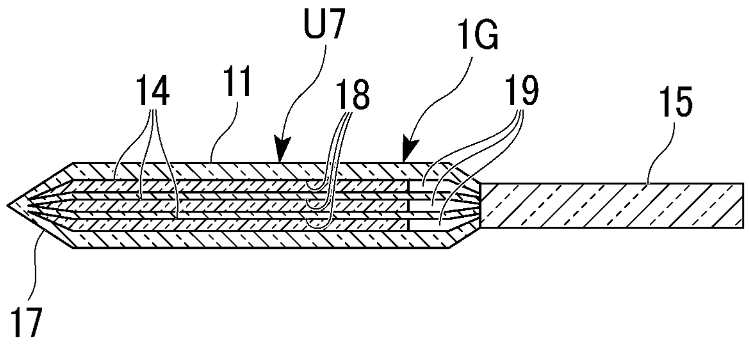
FIG. 34G is a cross-sectional view showing an optical fiber preform obtained by completing the tip sealing step of FIG. 34F.

FIG. 34G is a vertical cross-sectional view showing the optical fiber preform 1G of one or more embodiments.

The optical fiber preform 1G in which the gap portion 19 is secured in the inside is produced as shown in FIG. 34G by the optical fiber preform production method of one or more embodiments.

The configuration of the optical fiber preform 1G in FIG. 34G is the same as the configuration of the optical fiber preform 1F (FIG. 33G).

The optical fiber preform production method of one or more embodiments discussed below is different from the optical fiber preform production method of one or more embodiments described above in the following points. The core glass rods 14 shorter than the length of the through-holes 12 of the cladding glass body 11 in the axial direction are used.

In the optical fiber preform production method of one or more embodiments, the core glass rods 14 inserted into the through-holes 12 of the cladding glass body 11 are away from the first end portions of the through-holes 12 to the side near to the second end portion. The positions of the second end portions of the core glass rods 14 are aligned with the second end portion 11*b* of the cladding glass body 11. That is, the dummy rod integrating step (FIG. 34C and FIG. 34D) and the tip sealing step (FIG. 34F) are performed in a state where the core glass rods 14 do not protrude from the second end portion 11*b* of the cladding glass body 11.

The gap portion 19 of the optical fiber preform 1F shown in FIG. 34G is a region (space) where the core glass rods 14 are not inserted. The gap portion 19 is formed by sealing both ends in the axial direction of the through-holes 12 of the cladding glass body 11 by the dummy rod integrating step and the tip sealing step after the rod inserting step. The gap portion 19 is formed on one end (right end in FIG. 34G) side of the inner holes 18.

In the optical fiber preform production method of one or more embodiments, first a dummy silica tube welding step (FIG. 34A) and a rod inserting step (FIG. 34B) are performed.

Since the methods which are able to be adopted in the dummy silica tube welding step are the same methods as in the dummy silica tube welding step according to one or more embodiments, detailed description thereof is omitted here. For example, in the dummy silica tube welding step, a first silica tube welding operation for welding the first dummy silica tube 131 to one end of the cladding glass body 11 and a second silica tube welding operation for welding the second dummy silica tube 132 to the other end of the cladding glass body 11 are performed while causing dry air to flow through each of the through-holes 12 of the cladding glass body 11. For these steps, it is possible to adopt various methods which are able to be adopted in the dummy silica tube welding step according to one or more embodiments.

Following the dummy silica tube welding step, the rod inserting step shown in FIG. 34B is performed. Due to this, a glass material unit U7 with a configuration in which the core glass rods 14 are inserted into each of the plurality of through-holes 12 of the cladding glass body 11 is obtained.

However, as shown in FIG. 34B, the rod inserting step of one or more embodiments may include setting a state in which the core glass rods 14 inserted into the through-holes 12 of the cladding glass body 11 are away from the first end portions of the through-holes 12 to the side near to the second end portion, the positions of the second end portions of the core glass rods 14 are aligned with the second end portion 11*b* of the cladding glass body 11, and the core glass rods 14 do not protrude from the other end of the cladding glass body 11.

The rod inserting step may include inserting a core identifying marker glass rod instead of the core glass rods 14 into one or more through-holes among the plurality of through-holes 12 of the cladding glass body 11. For both types of insertion glass rods, that is, the core glass rods 14 and the core identifying marker glass rod, an insertion manner which is the same as the insertion manner of the core glass rods 14 described one or more embodiments with respect to the cladding glass body 11 is adopted.

In the same manner as one or more embodiments, an etching step, a cleaning step, and a drying step may be performed between the dummy silica tube welding step and the rod inserting step.

It is possible to perform the etching step, the cleaning step, and the drying step in the same manner as described in the optical fiber preform production method of one or more embodiments and detailed description thereof is omitted here.

Following the rod inserting step, a dummy rod integrating step is performed as shown in FIG. 34C and FIG. 34D.

In the dummy rod integrating step, first, as shown in FIG. 34C, the first dummy silica tube 131 is removed from the cladding glass body 11 by thermal cutting the tip of the first end portion 11*a* of the cladding glass body 11 (one-end thermal cutting step). Furthermore, as shown in FIG. 34D, the dummy silica rod 15 is welded and integrated with the first end portion 11*a* of the cladding glass body 11 after the first dummy silica tube 131 is removed (dummy rod integrating step).

As shown in FIG. 34C and FIG. 34D, the dummy rod integrating step is performed in a state where the core glass rods 14 inserted into the through-holes 12 of the cladding glass body 11 are away from the first end portions of the through-holes 12 to the side near to the second end portion, the positions of the second end portions of the core glass rods 14 are aligned with the second end portion 11*b* of the cladding glass body 11, and the core glass rods 14 do not protrude from the second end portion 11*b* of the cladding glass body 11.

That is, the dummy rod integrating step is performed in the same manner as in the dummy rod integrating step according to one or more embodiments except that the core glass rods 14 do not protrude from the second end portion 11*b* of the cladding glass body 11 as described above.

When the dummy rod integrating step is completed, next, as shown in FIG. 34E, the vacuum suctioning step is performed in the same manner as in one or more embodiments.

As shown in FIG. 34F and FIG. 34G, in the optical fiber preform production method of one or more embodiments, after starting the vacuum suctioning step, the second end portion of the glass material unit U7 is heated and reduced in diameter to close and hermetically seal all the second opening portions 12*b* of the cladding glass body 11 (tip sealing step).

The tip sealing step is performed in the same manner as the tip sealing step according to one or more embodiments except that the core glass rods 14 are set not to be allowed to protrude from the second end portion 11*b* of the cladding glass body 11 as described above.

In the tip sealing step, in a state where the vacuum suctioning by the vacuum pump is continued, the second end portion of the glass material unit U7 including the second end portion 11*b* of the cladding glass body 11 is heated and reduced in diameter using the flame 16 (for example, an oxyhydrogen flame) or the like. By closing and hermetically sealing all the second opening portions 12*b* of the cladding glass body 11, the tip sealing portion 17 is formed. The tip sealing portion 17 is solidified by heating and reducing the diameter of the second end portion 11*b* of the cladding glass body 11 together with the tip end portion of the core glass rod 14 on the inside thereof.

As shown in FIG. 34G, in the tip sealing step of one or more embodiments, the tip sealing portion 17 in which the second end portion of the glass material unit U7 is processed into a tapered shape at the tip is formed.

In addition, in the tip sealing step of one or more embodiments, in the process of forming the tip sealing portion 17 with a tapered shape at the tip, the tip of the second end portion of the glass material unit U7 is thermal cut to remove the second dummy silica tube 132 from the cladding glass body 11.

When the tip sealing step is completed, the inner holes 18 are secured in the inside of the cladding glass body 11. In the inner holes 18, the first end portions of the through-holes 12 are hermetically sealed by the dummy silica rod 15 and the second end portion 11*b* sides are hermetically sealed by the tip sealing portion 17.

In the tip sealing step, the tip sealing portion 17 is formed while applying a vacuum pressure of 1 kPa or less to the through-holes 12 of the cladding glass body 11 by vacuum suctioning by a vacuum pump. Due to this, the optical fiber preform 1G having the inner holes 18 in which the internal pressure is a negative pressure (for example, 1 kPa or less) is obtained.

When the tip sealing step is completed, the inner holes 18 with a configuration having the gap portion 19 are secured in the cladding glass body 11. The gap portion 19 is arranged on the first end portion (the right end in FIG. 34G) side of the cladding glass body 11. In the axial direction, the core glass rods 14 are not inserted into the gap portion 19. The core glass rods 14 are inserted in a region other than the gap portion 19 of the inner holes 18 in the axial direction.

The optical fiber preform production method of one or more embodiments is completed by completing the tip sealing step and enables the optical fiber preform 1G in which the inner holes 18 having the gap portion 19 are secured in the inside of the cladding glass body 11 as shown in FIG. 34G to be obtained.

Next, one or more embodiments of an optical fiber preform production method, an optical fiber preform, and an optical fiber production method will be described with reference to FIG. 35A to FIG. 35G.

In FIG. 35A to FIG. 35G, the same reference numerals are assigned to the same components as those in FIG. 33A to FIG. 33G and description thereof will be omitted or simplified.

Figure 35A:
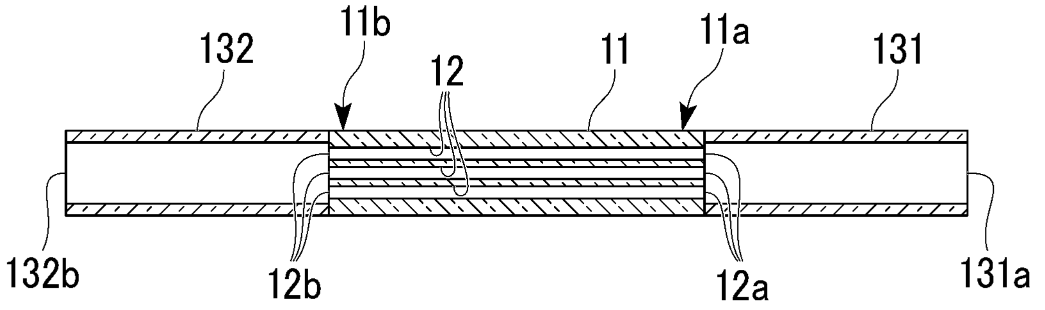
FIG. 35A is a cross-sectional view for illustrating a dummy silica tube welding step in an optical fiber preform production method according to one or more embodiments of the present invention.
Figure 35B:
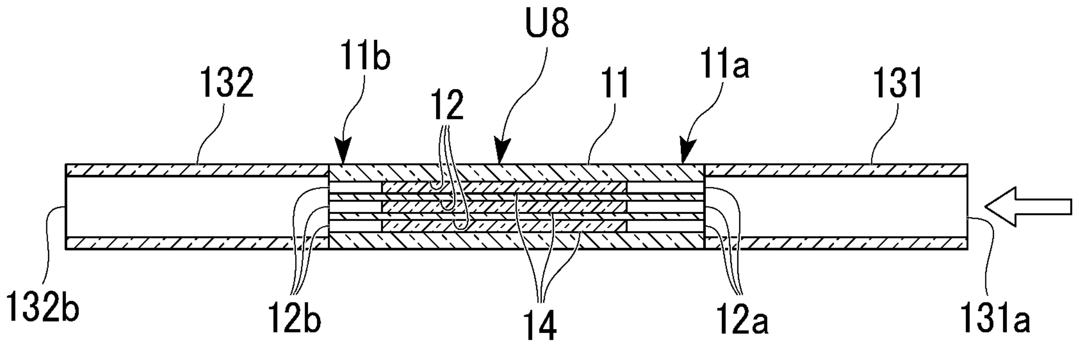
FIG. 35B is a cross-sectional view for illustrating a rod inserting step performed after the step of FIG. 35A.
Figure 35C:
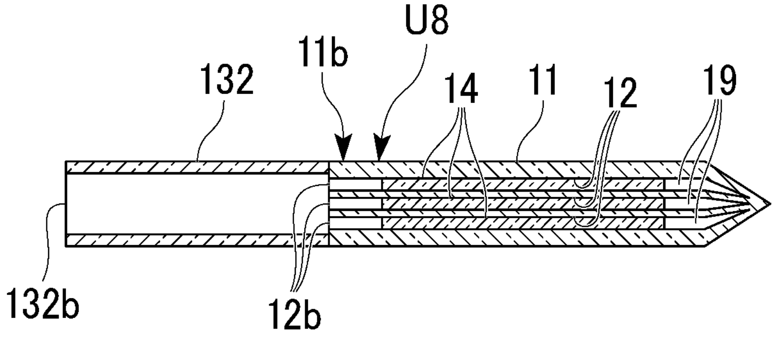
FIG. 35C is a cross-sectional view for illustrating a one-end thermal cutting step performed after the step of FIG. 35B.
Figure 35D:
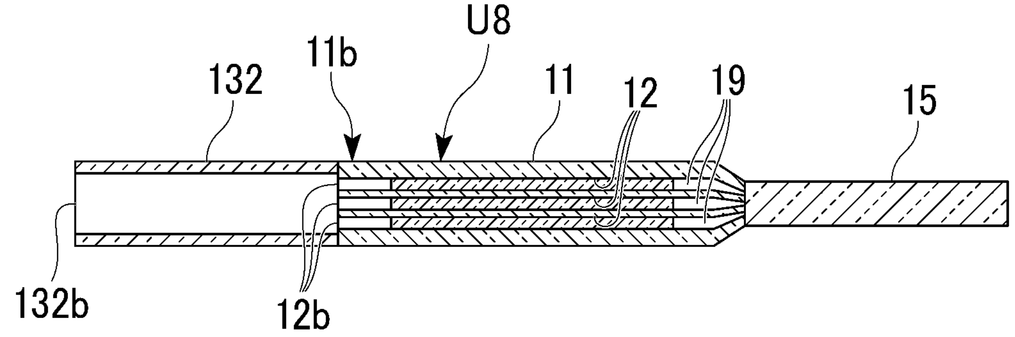
FIG. 35D is a cross-sectional view for illustrating a dummy rod integrating step performed after the step of FIG. 35C.
Figure 35E:
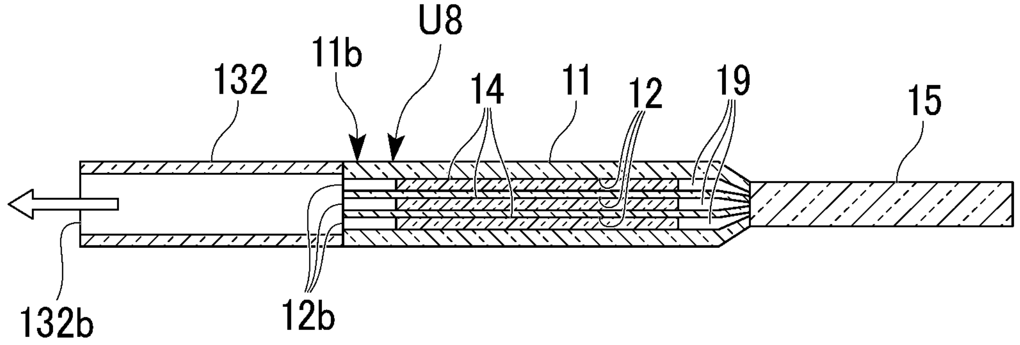
FIG. 35E is a cross-sectional view for illustrating a vacuum suctioning step performed after the step of FIG. 35D.
Figure 35F:
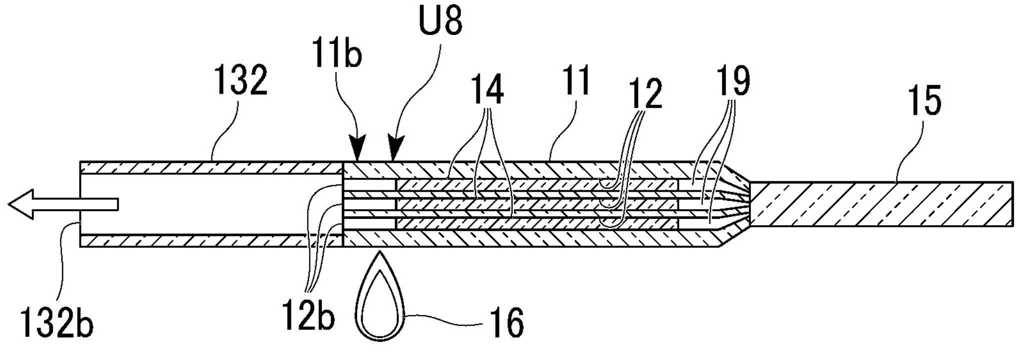
FIG. 35F is a cross-sectional view for illustrating thermal cutting of the second end portion tip of the cladding glass body in the tip sealing step performed after the step of FIG. 35E.
Figure 35G:
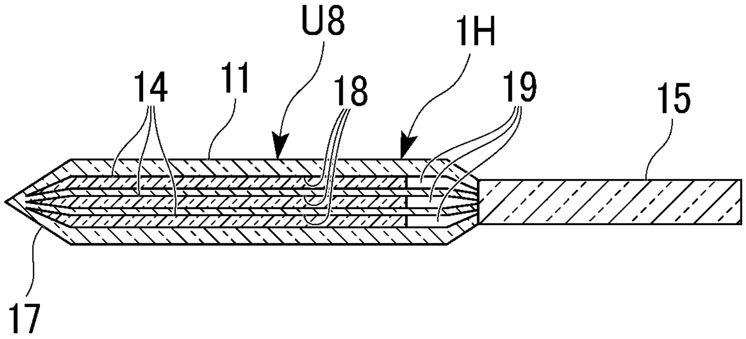
FIG. 35G is a cross-sectional view showing an optical fiber preform obtained by completing the tip sealing step of FIG. 35F.

FIG. 35G is a vertical cross-sectional view showing an optical fiber preform 1H of one or more embodiments.

According to the optical fiber preform production method of one or more embodiments, the optical fiber preform 1H in which the gap portion 19 is secured in the inside thereof is produced as shown in FIG. 35G.

The configuration of the optical fiber preform 1H in FIG. 35G is the same as the configuration of the optical fiber preform 1F (FIG. 33G) described in one or more embodiments.

The optical fiber preform production method of one or more embodiments discussed below is different from the optical fiber preform production method of one or more embodiments discussed above in the following points. The core glass rods 14 shorter than the length of the through-holes 12 of the cladding glass body 11 in the axial direction are used.

In the optical fiber preform production method of one or more embodiments, in a state where the core glass rods 14 inserted into the through-holes 12 of the cladding glass body 11 are away from both ends in the axial direction of the through-holes 12 to the central portion side, a dummy rod integrating step (FIG. 35C and FIG. 35D) and a tip sealing step (FIG. 35F) are performed.

The gap portion 19 of the optical fiber preform 1H shown in FIG. 35G is a region (space) where the core glass rods 14 are not inserted. The gap portion 19 is formed by sealing both ends in the axial direction of the through-hole 12 of the cladding glass body 11 by the dummy rod integrating step and the tip sealing step after the rod inserting step. The gap portion 19 is formed on the first end portion (the right end in FIG. 35G) side of the inner holes 18.

In the optical fiber preform production method of one or more embodiments, first, a dummy silica tube welding step (FIG. 35A) and a rod inserting step (FIG. 35B) are performed.

Since the techniques which are able to be adopted in the dummy silica tube welding step are the same as in the dummy silica tube welding step according to one or more embodiments, detailed description thereof is omitted here. For example, in the dummy silica tube welding step, a first silica tube welding operation for welding the first dummy silica tube 131 to one end of the cladding glass body 11 and a second silica tube welding operation for welding the second dummy silica tube 132 to the other end of the cladding glass body 11 are performed while causing dry air to flow through each of the through-holes 12 of the cladding glass body 11. For these steps, it is possible to adopt various methods able to be adopted in the dummy silica tube welding step according to one or more embodiments.

Following the dummy silica tube welding step, the rod inserting step shown in FIG. 35B is performed. Due to this, a glass material unit U8 with a configuration in which the core glass rods 14 are inserted into each of the plurality of through-holes 12 of the cladding glass body 11 is obtained.

However, as shown in FIG. 35B, the rod inserting step of one or more embodiments may include setting the core glass rods 14 inserted into the through-holes 12 of the cladding glass body 11 to be away from both ends in the axial direction of the through-holes 12 to the central portion side.

The rod inserting step may include inserting a core identifying marker glass rod instead of the core glass rods 14 into one or more through-holes among the plurality of through-holes 12 of the cladding glass body 11. For both types of insertion glass rods, that is, the core glass rods 14 and the core identifying marker glass rod, an insertion manner which is the same as the insertion manner of the core glass rods 14 described in one or more embodiments with respect to the cladding glass body 11 is adopted.

In the same manner as one or more embodiments, an etching step, a cleaning step, and a drying step may be performed between the dummy silica tube welding step and the rod inserting step.

It is possible to perform the etching step, the cleaning step, and the drying step in the same manner as described in the optical fiber preform production method of one or more embodiments and detailed description thereof is omitted here.

Following the rod inserting step, a dummy rod integrating step is performed as shown in FIG. 35C and FIG. 35D.

In the dummy rod integrating step, first, as shown in FIG. 35C, the tip of the first end portion 11*a* of the cladding glass body 11 is thermal cut to remove the first dummy silica tube 131 from the cladding glass body 11 (one-end thermal cutting step). Furthermore, as shown in FIG. 35D, the dummy silica rod 15 is welded and integrated with the first end portion 11*a* of the cladding glass body 11 after the first dummy silica tube 131 is removed (dummy rod integrating step).

As shown in FIG. 35C and FIG. 35D, the dummy rod integrating step is performed in a state where the core glass rods 14 inserted into the through-holes 12 of the cladding glass body 11 are away from both ends in the axial direction of the through-holes 12 to the central portion side.

That is, the dummy rod integrating step of one or more embodiments discussed below is performed in the same manner as the dummy rod integrating step according to one or more embodiments described above except that the core glass rods 14 inserted into the through-holes 12 of the cladding glass body 11 are set to be away from the both ends in the axial direction of the through-hole 12 to the central portion side.

When the dummy rod integrating step is completed, as shown in FIG. 35E, the vacuum suctioning step is then performed in the same manner as in one or more embodiments.

As shown in FIG. 35F and FIG. 35G, in the optical fiber preform production method of one or more embodiments, after the vacuum suctioning step is started, the second end portion of the glass material unit U8 is heated and reduced in diameter to close and hermetically seal all the second opening portions 12*b* of the cladding glass body 11 (tip sealing step).

In the tip sealing step, in a state where the vacuum suction by the vacuum pump is continued, the second end portion of the glass material unit U8 and the core glass rods 14 are heated and reduced in diameter using the flame 16 (for example, an oxyhydrogen flame). The tip sealing portion 17 is formed by closing and hermetically sealing all the second opening portions 12*b* of the cladding glass body 11. The tip sealing portion 17 is solidified by heating and reducing the diameter of the second end portion 11*b* of the cladding glass body 11 and the core glass rods 14.

As shown in FIG. 35G, in the tip sealing step of one or more embodiments, the tip sealing portion 17 in which the second end portion of the glass material unit U8 is processed into a tapered shape at the tip is formed.

In addition, in the tip sealing step of one or more embodiments, in the process of forming the tip sealing portion 17 with a tapered shape at the tip, the tip side of the second end portion of the glass material unit U8 is thermal cut and the second dummy silica tube 132 is removed from the cladding glass body 11.

However, the tip sealing step starts in a state where the core glass rods 14 inserted into the through-holes 12 of the cladding glass body 11 are away from both ends in the axial direction of the through-holes 12 to the central portion side. Furthermore, the second end portion of the glass material unit U8 is thermal cut such that the tips on the side near to the second end portions of the core glass rods 14 inserted into the through-holes 12 of the cladding glass body 11 are also removed. Due to this, the second dummy silica tube 132 is removed from the cladding glass body 11. In the tip sealing step of one or more embodiments, the tip sealing portion 17 is formed by heating and reducing the diameter of the second end portion of the glass material unit U8 after thermal cutting, together with the core glass rods 14 in the inside thereof. Here, the second end portion 11*b* of the cladding glass body 11 is heated and reduced in diameter together with the core glass rods 14, and the second dummy silica tube 132 side is thermal cut. For this reason, the gap portion 19 may not be formed in the side near to the second end portion of the optical fiber preform 1H.

The tip sealing step of one or more embodiments starts in a state where the core glass rods 14 inserted into the through-holes 12 of the cladding glass body 11 are away from both ends in the axial direction of the through-holes 12 to the central portion side, and the tip side of the second end portion of the glass material unit U8 is thermal cut to remove the second dummy silica tube 132 and the core glass rod 14 tips from the cladding glass body 11. Otherwise, the tip sealing step is performed in the same manner as the tip sealing step of one or more embodiments.

When the tip sealing step is completed, the inner holes 18 are secured in the inside of the cladding glass body 11. In the inner holes 18, the first end portions of the through-holes 12 are hermetically sealed by the dummy silica rod 15 and the second end portions are hermetically sealed by the tip sealing portion 17.

In the tip sealing step, the tip sealing portion 17 is formed while applying a vacuum pressure of 1 kPa or less to the through-holes 12 of the cladding glass body 11 by vacuum suctioning by a vacuum pump. Due to this, the optical fiber preform 1H having the inner holes 18 with an internal pressure which is a negative pressure (for example, 1 kPa or less) is obtained.

When the tip sealing step is completed, the inner holes 18 with a configuration having the gap portion 19 are secured in the cladding glass body 11. The gap portion 19 is arranged on the first end portion 11*a* (the right end in FIG. 35G) side of the cladding glass body 11. The core glass rods 14 are not inserted into the gap portion 19 in the axial direction. In the axial direction, the core glass rods 14 are inserted in a region other than the gap portion 19 of the inner holes 18.

The optical fiber preform production method of one or more embodiments is completed by completing the tip sealing step, as shown in FIG. 35G, and enables the optical fiber preform 1H in which the inner hole 18 having the gap portion 19 is secured in the inside of the cladding glass body 11 to be obtained.

Next, one or more embodiments of the optical fiber preform production method, the optical fiber preform, and the optical fiber production method will be described with reference to FIG. 36A to FIG. 36F.

In FIG. 36A to FIG. 36F, the same reference numerals are assigned to the same components as those in FIG. 1 to FIG. 6 and description thereof will be omitted or simplified.

Figure 36A:
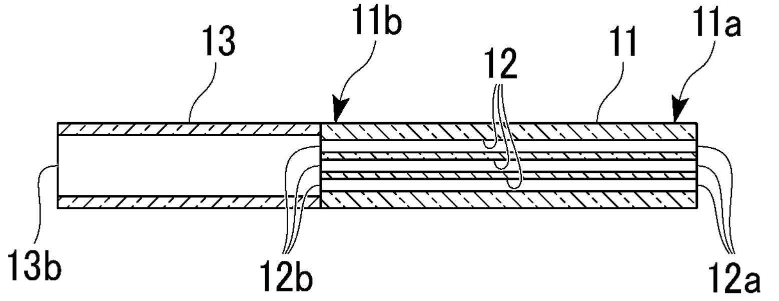
FIG. 36A is a cross-sectional view for illustrating a dummy silica tube welding step of an optical fiber preform production method according to one or more embodiments of the present invention.
Figure 36B:
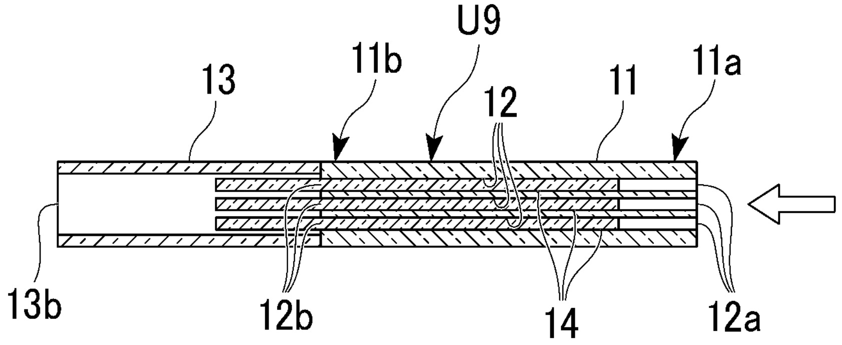
FIG. 36B is a cross-sectional view for illustrating a rod inserting step performed after the step of FIG. 36A.
Figure 36C:
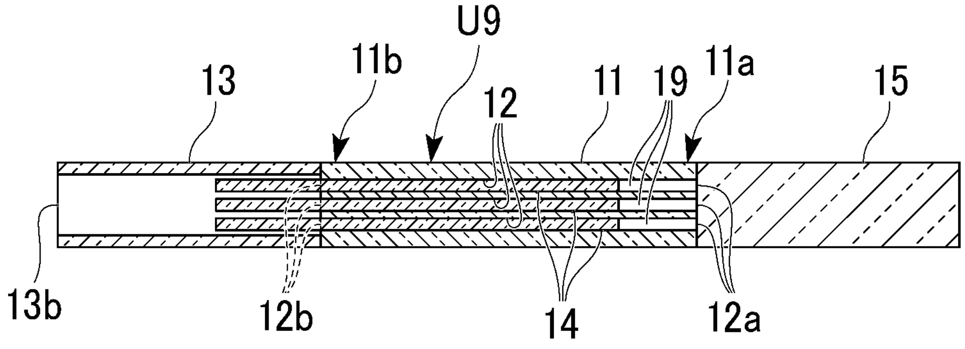
FIG. 36C is a cross-sectional view for illustrating a dummy rod integrating step performed after the step of FIG. 36B.
Figure 36D:
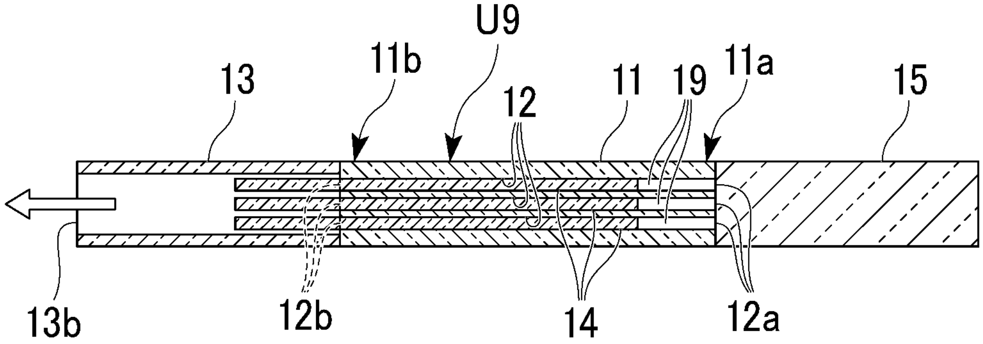
FIG. 36D is a cross-sectional view for illustrating a vacuum suctioning step performed after the step of FIG. 36C.
Figure 36E:
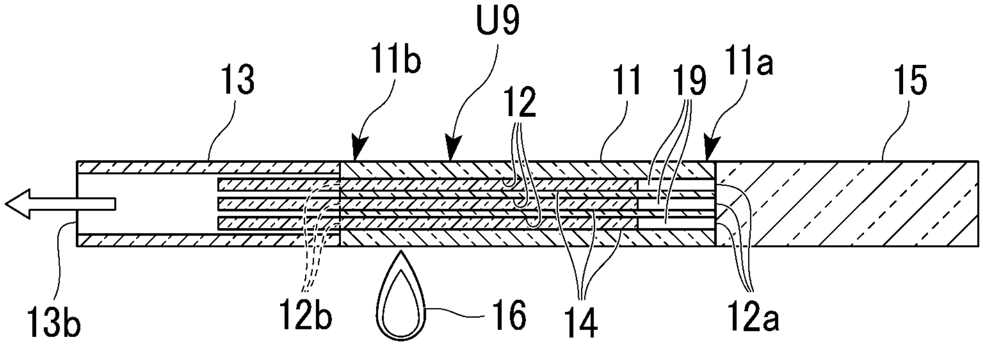
FIG. 36E is a cross-sectional view for illustrating thermal cutting of the second end portion tip of the cladding glass body in the tip sealing step performed after the step of FIG. 36D.
Figure 36F:
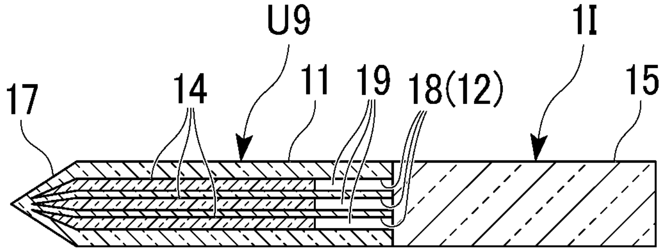
FIG. 36F is a cross-sectional view showing the structure of the optical fiber preform obtained by completing the tip sealing step of FIG. 36E.

FIG. 36F is a vertical cross-sectional view showing the optical fiber preform 1I of one or more embodiments.

The optical fiber preform 1I in which the gap portion 19 is secured in the inside thereof as shown in FIG. 36F is produced by the optical fiber preform production method of one or more embodiments.

The optical fiber preform production method of one or more embodiments discussed below is the optical fiber preform production method of one or more embodiments described above, changed as follows. The core glass rods 14 inserted into the through-holes 12 of the cladding glass body 11 are away from the first end portions of the through-holes 12 to the side near to the second end portion. Furthermore, in a state where the second end portions of the core glass rods 14 protrude from the second end portion 11*b* of the cladding glass body 11, the dummy rod integrating step (FIG. 36C and FIG. 36D) and the tip sealing step (FIG. 36F) are performed.

In the optical fiber preform production method of one or more embodiments, as shown in FIG. 36A, first, the dummy silica tube 13 is welded and connected to the second end portion 11*b* of the cladding glass body 11 (dummy silica tube welding step).

This dummy silica tube welding step is performed in the same manner as the dummy silica tube welding step of one or more embodiments, and detailed description thereof will be omitted.

Next, as shown in FIG. 36B, the core glass rods 14 are inserted into each of the plurality of through-holes 12 of the cladding glass body 11 (rod inserting step).

It is possible to perform the rod inserting step in the same manner as the rod inserting step of one or more embodiments.

However, as shown in FIG. 36B, the rod inserting step may include setting a state in which the core glass rods 14 inserted into the through-holes 12 of the cladding glass body 11 are away from the first end portion of the through-holes 12 to the side near to the second end portion, and the second end portions of the core glass rods 14 protrude from the second end portion 11*b* of the cladding glass body 11.

By performing the rod inserting step, a glass material unit U9 with a configuration in which the core glass rods 14 are inserted into each of the plurality of through-holes 12 of the cladding glass body 11 is obtained.

The rod inserting step may include inserting a core identifying marker glass rod instead of the core glass rods 14 into one or more through-holes among the plurality of through-holes 12 of the cladding glass body 11. For both types of insertion glass rods, that is, the core glass rods 14 and the core identifying marker glass rod, an insertion manner which is the same as the insertion manner of the core glass rods 14 described one or more embodiments with respect to the cladding glass body 11 is adopted.

In the same manner as one or more embodiments, an etching step, a cleaning step, and a drying step may be performed between the dummy silica tube welding step and the rod inserting step.

Since the etching step, the cleaning step, and the drying step are the same as one or more embodiments, detailed description thereof is omitted.

Following the rod inserting step, as shown in FIG. 36C, a solid dummy silica rod 15 made of silica glass is welded and integrated with the first end portion 11*a* of the cladding glass body 11. The first opening portion 12*a* of the cladding glass body 11 is closed and hermetically sealed with a dummy silica rod 15 (dummy rod integrating step).

However, as shown in FIG. 36C, the dummy rod integrating step is performed in a state where the core glass rods 14 inserted into the through-holes 12 of the cladding glass body 11 are away from the first end portions of the through-holes 12 to the side near to the second end portion and the second end portions of the core glass rods 14 protrude from the second end portion 11*b* of the cladding glass body 11.

The dummy rod integrating step is performed in the same manner as the dummy rod integrating step of one or more embodiments as described above except that the second end portions of the core glass rods 14 are set to protrude from the second end portion 11*b* of the cladding glass body 11. For this reason, detailed description of the dummy rod integrating step is omitted.

When the dummy rod integrating step is completed, next, as shown in FIG. 36D, in the same manner as the vacuum suctioning step of one or more embodiments, a vacuum pump (not shown) is connected to the second tip opening end 13*b* and the insides of the through-holes 12 of the cladding glass body 11 are vacuum suctioned by driving the vacuum pump (vacuum suctioning step).

Since the vacuum suctioning step is the same as the vacuum suctioning step of one or more embodiments, detailed description thereof is omitted.

As shown in FIG. 36E and FIG. 36F, in the optical fiber preform production method of one or more embodiments, after the start of the vacuum suctioning step, in a state where vacuum suctioning by a vacuum pump is continued, the second end portion of the glass material unit U9 including the second end portion 11*b* of the cladding glass body 11 is heated and reduced in diameter using the flame 16 (for example, an oxyhydrogen flame) or the like such that all the second opening portions 12*b* of the cladding glass body 11 are closed and hermetically sealed (tip sealing step).

It is possible to perform the tip sealing step in the same manner as the tip sealing step according to one or more embodiments except that the core glass rods 14 inserted into the through-holes 12 of the cladding glass body 11 are away from the first end portions of the through-holes 12 to the side near to the second end portion and the second end portions of the core glass rods 14 are set to protrude from the second end portion 11*b* of the cladding glass body 11.

The second end portion of the glass material unit U9 in a state in which the second opening portions 12*b* of all the through-holes 12 are hermetically sealed in the tip sealing step is also referred to below as the tip sealing portion 17. The tip sealing portion 17 is solidified by heating and reducing the diameter of the second end portion 11*b* of the cladding glass body 11 together with the tip end portion of the core glass rod 14 on the inside thereof.

As shown in FIG. 36F, in the tip sealing step of one or more embodiments, the tip sealing portion 17 in which the second end portion of the glass material unit U9 is processed into a tapered shape at the tip is formed.

In addition, in the tip sealing step of one or more embodiments, in the process of forming the tip sealing portion 17 having a tapered shape at the tip, the tip of the second end portion of the glass material unit U9 is thermal cut. Due to this, the dummy silica tube 13 and the portions of the core glass rods 14 which protrude from the cladding glass body 11 second end portion 11*b* are removed from the cladding glass body 11.

The optical fiber preform production method of one or more embodiments is completed by completing the tip sealing step and enables the optical fiber preform 1I shown in FIG. 36F to be obtained.

The inner holes 18 are secured in the inside of the cladding glass body 11 of the optical fiber preform 1I in FIG. 36F. In the inner holes 18, the first end portions of the through-holes 12 are hermetically sealed by the dummy silica rod 15 and the second end portions are hermetically sealed by the tip sealing portion 17.

In the tip sealing step, the tip sealing portion 17 is formed while applying a vacuum pressure of 1 kPa or less to the through-holes 12 of the cladding glass body 11 by vacuum suctioning by a vacuum pump. Due to this, an optical fiber preform 1I having the inner holes 18 with an internal pressure which is a negative pressure (for example, 1 kPa or less) is obtained.

However, as shown in FIG. 36E, the tip sealing step is performed in a state in which the core glass rods 14 in the through-holes 12 are away from the ends on the first end portions of the through-holes 12 to the side near to the second end portion.

For this reason, when the tip sealing step is completed, the inner holes 18 with a configuration having the gap portion 19 is secured in the cladding glass body 11. The gap portion 19 is arranged on the first end portion (the right end in FIG. 36F) side of the cladding glass body 11. In the axial direction, the core glass rods 14 are not inserted into the gap portion 19. In the axial direction, the core glass rods 14 are inserted in a region other than the gap portion 19 of the inner holes 18.

Next, one or more embodiments of the optical fiber preform production method, optical fiber preform, and optical fiber production method will be described with reference to FIG. 37A to FIG. 37F.

In FIG. 37A to FIG. 37F, the same reference numerals are assigned to the same components as those in FIG. 36A to FIG. 36F and description thereof will be omitted or simplified.

Figure 37A:
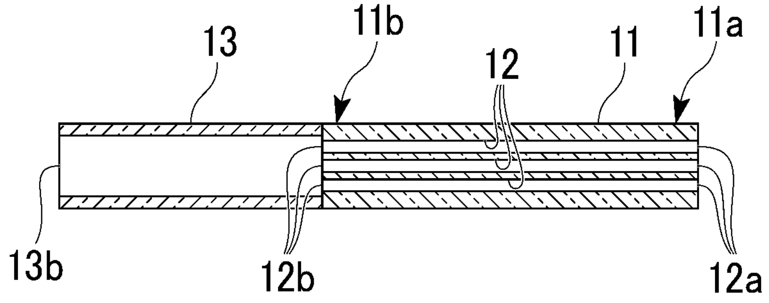
FIG. 37A is a cross-sectional view for illustrating a dummy silica tube welding step of an optical fiber preform production method according to one or more embodiments of the present invention.
Figure 37B:
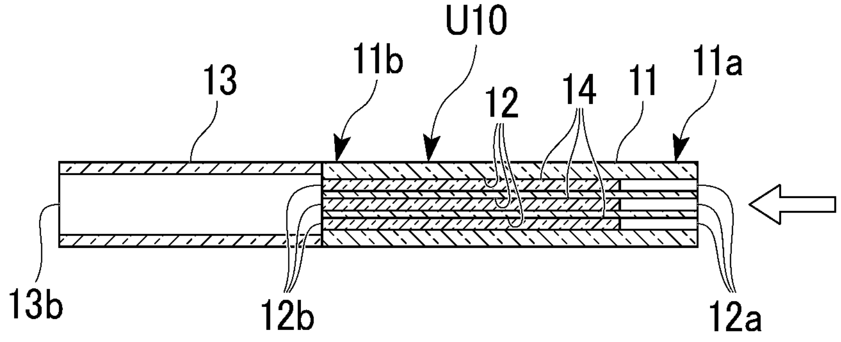
FIG. 37B is a cross-sectional view for illustrating a rod inserting step performed after the step of FIG. 37A.
Figure 37C:
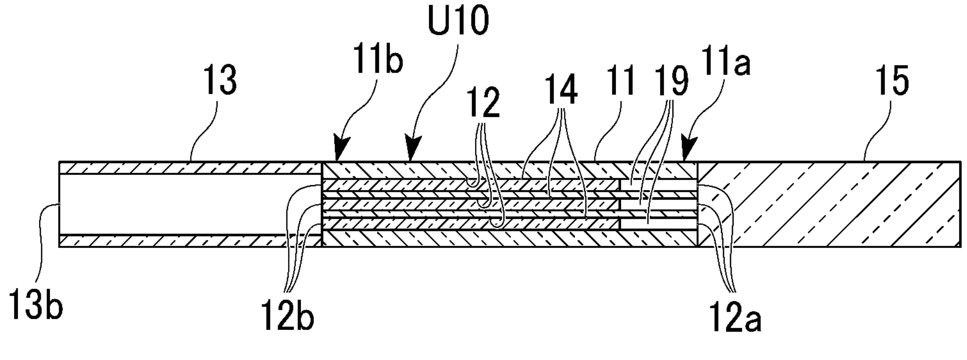
FIG. 37C is a cross-sectional view for illustrating a dummy rod integrating step performed after the step of FIG. 37B.
Figure 37D:
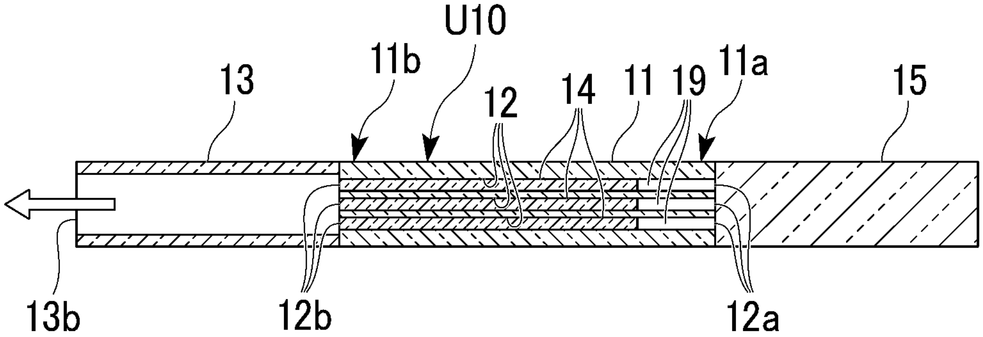
FIG. 37D is a cross-sectional view for illustrating a vacuum suctioning step performed after the step of FIG. 37C.
Figure 37E:
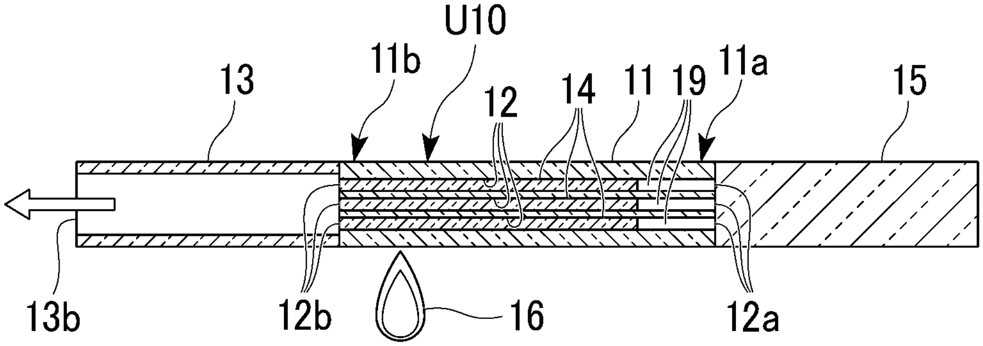
FIG. 37E is a cross-sectional view for illustrating thermal cutting of the second end portion tip of the cladding glass body in the tip sealing step performed after the step of FIG. 37D.
Figure 37F:
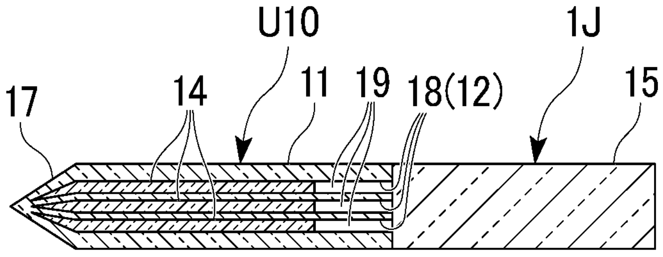
FIG. 37F is a cross-sectional view showing the structure of the optical fiber preform obtained by completing the tip sealing step of FIG. 37E.

FIG. 37F is a vertical cross-sectional view showing the optical fiber preform 1J of one or more embodiments.

The optical fiber preform 1J in which the gap portion 19 is secured in the inside thereof is produced as shown in FIG. 37F by the optical fiber preform production method of one or more embodiments.

The configuration of the optical fiber preform 1J in FIG. 37F is the same as the configuration of the optical fiber preform 1I (FIG. 36G) described in one or more embodiments.

The optical fiber preform production method of one or more embodiments discussed below differs from the optical fiber preform production method of one or more embodiments described above in the following points. The core glass rods 14 shorter than the length of the through-holes 12 of the cladding glass body 11 in the axial direction are used.

In the optical fiber preform production method of one or more embodiments, the core glass rods 14 inserted into the through-holes 12 of the cladding glass body 11 are away from the first end portions of the through-holes 12 to the side near to the second end portion. Furthermore, a dummy rod integrating step (FIG. 37C) and a tip sealing step (FIG. 37E and FIG. 37F) are performed in a state where the positions of the second end portions of the core glass rods 14 are aligned with the second end portion 11*b* of the cladding glass body 11, and the core glass rods 14 do not protrude from the second end portion 11*b* of the cladding glass body 11.

The gap portion 19 of the optical fiber preform 1J shown in FIG. 37F is a region (space) where the core glass rods 14 are not inserted. The gap portion 19 is formed by sealing both ends in the axial direction of the through-holes 12 of the cladding glass body 11 by the dummy rod integrating step and the tip sealing step after the rod inserting step. The gap portion 19 is formed on the first end portion (right end in FIG. 37F) sides of the inner holes 18.

In the optical fiber preform production method of one or more embodiments, as shown in FIG. 37A, first, the dummy silica tube 13 is welded and connected to the second end portion 11*b* of the cladding glass body 11 (dummy silica tube welding step).

This dummy silica tube welding step is performed in the same manner as the dummy silica tube welding step of one or more embodiments and detailed description thereof will be omitted.

Next, as shown in FIG. 37B, the core glass rods 14 are inserted into each of the plurality of through-holes 12 of the cladding glass body 11 (rod inserting step).

It is possible to perform the rod inserting step in the same manner as the rod inserting step of one or more embodiments.

However, as shown in FIG. 37B, the rod inserting step may include setting a state where the core glass rods 14 inserted into the through-holes 12 of the cladding glass body 11 are away from the first end portions of the through-holes 12 to the side near to the second end portion, the positions of the second end portions of the core glass rods 14 are aligned with the second end portion 11*b* of the cladding glass body 11, and the core glass rods 14 do not protrude from the second end portion 11*b* of the cladding glass body 11.

By performing the rod inserting step, a glass material unit U10 with a configuration in which the core glass rods 14 are inserted into each of the plurality of through-holes 12 of the cladding glass body 11 is obtained.

The rod inserting step may include inserting a core identifying marker glass rod instead of the core glass rods 14 into one or more through-holes among the plurality of through-holes 12 of the cladding glass body 11. For both types of insertion glass rods, that is, the core glass rods 14 and the core identifying marker glass rod, an insertion manner which is the same as the insertion manner of the core glass rods 14 described in one or more embodiments with respect to the cladding glass body 11 is adopted.

In the same manner as one or more embodiments, an etching step, a cleaning step, and a drying step may be performed between the dummy silica tube welding step and the rod inserting step.

Since the etching step, the cleaning step, and the drying step are the same as one or more embodiments, detailed description thereof is omitted.

Following the rod inserting step, as shown in FIG. 37C, a solid dummy silica rod 15 made of silica glass is welded and integrated with the first end portion 11*a* of the cladding glass body 11. Due to this, the first opening portions 12*a* of the cladding glass body 11 are closed and hermetically sealed by the dummy silica rod 15 (dummy rod integrating step).

However, as shown in FIG. 37C, the dummy rod integrating step is performed in a state where the core glass rods 14 inserted into the through-holes 12 of the cladding glass body 11 are away from the first end portions of the through-holes 12 to the side near to the second end portion, the positions of the second end portions of the core glass rods 14 are aligned with the second end portion 11*b* of the cladding glass body 11, and the core glass rods 14 do not protrude from the second end portion 11*b* of the cladding glass body 11.

The dummy rod integrating step is the same as the dummy rod integrating step of one or more embodiments except that the core glass rods 14 described above do not protrude from the other end of the cladding glass body 11, and detailed description thereof will be omitted.

Following the dummy rod integrating step, as shown in FIG. 37D, in the same manner as the vacuum suctioning step of one or more embodiments, a vacuum pump (not shown) is connected to the second tip opening end 13*b* of the dummy silica tube 13 and the insides of the through-holes 12 of the cladding glass body 11 are vacuum suctioned by driving the vacuum pump (vacuum suctioning step).

Since the vacuum suctioning step is the same as the vacuum suctioning step of one or more embodiments, detailed description thereof is omitted.

As shown in FIG. 37E and FIG. 37F, in the optical fiber preform production method of one or more embodiments, after the vacuum suctioning step is started, the glass material unit U10 second end portion including the cladding glass body 11 second end portion 11*b* is heated and reduced in diameter to close and hermetically seal all of the second opening portions 12*b* of the cladding glass body 11 (tip sealing step).

It is possible to perform the tip sealing step in the same manner as the tip sealing step according to one or more embodiments except that the core glass rods 14 inserted into the through-holes 12 of the cladding glass body 11 are away from the first end portions of the through-holes 12 to the side near to the second end portion, the positions of the second end portions of the core glass rods 14 are aligned with the second end portion 11*b* of the cladding glass body 11, and the core glass rods 14 are set not to protrude from the second end portion 11*b* of the cladding glass body 11.

In the tip sealing step, in a state where the vacuum suctioning by the vacuum pump is continued, the glass material unit U7 second end portion including the cladding glass body 11 second end portion 11*b* is heated and reduced in diameter using the flame 16 (for example, an oxyhydrogen flame) or the like. The tip sealing portion 17 is formed by closing and hermetically sealing all the second opening portions 12*b* of the cladding glass body 11.

The tip sealing portion 17 is solidified by heating and reducing the diameter of the second end portion 11*b* of the cladding glass body 11 together with the tip end portions of the core glass rods 14 on the inside thereof.

As shown in FIG. 37F, in the tip sealing step of one or more embodiments, the tip sealing portion 17 in which the second end portion of the glass material unit U10 is processed into a tapered shape at the tip is formed.

In addition, in the tip sealing step of one or more embodiments, in the process of forming the tip sealing portion 17 with a tapered shape at the tip, the tip of the second end portion of the glass material unit U10 is thermal cut to remove the dummy silica tube 13 from the cladding glass body 11.

When the tip sealing step is completed, the inner holes 18 are secured in the inside of the cladding glass body 11. In the inner holes 18, the first end portions of the through-holes 12 are hermetically sealed by the dummy silica rod 15 and the second end portions are hermetically sealed by the tip sealing portion 17.

In the tip sealing step, the tip sealing portion 17 is formed while applying a vacuum pressure of 1 kPa or less to the through-holes 12 of the cladding glass body 11 by vacuum suctioning by a vacuum pump. Due to this, the optical fiber preform 1J having the inner holes 18 with an internal pressure which is a negative pressure (for example, 1 kPa or less) is obtained.

When the tip sealing step is completed, the inner holes 18 with a configuration having the gap portion 19 are secured in the cladding glass body 11. The gap portion 19 is arranged on the first end portion 11*a* (the right end in FIG. 37F) side of the cladding glass body 11. The core glass rods 14 are not inserted into the gap portion 19 in the axial direction. In the axial direction, the core glass rods 14 are inserted in a region other than the gap portion 19 of the inner holes 18.

Next, one or more embodiments of an optical fiber preform production method, an optical fiber preform, and an optical fiber production method will be described with reference to FIG. 38A to FIG. 38F.

In FIG. 38A to FIG. 38F, the same reference numerals are assigned to the same components as those in FIG. 36A to FIG. 36F and description thereof will be omitted or simplified.

Figure 38A:
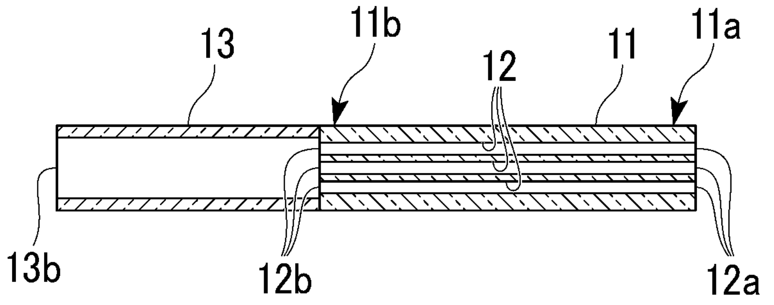
FIG. 38A is a cross-sectional view for illustrating a dummy silica tube welding step in the optical fiber preform production method according to one or more embodiments of the present invention.
Figure 38B:
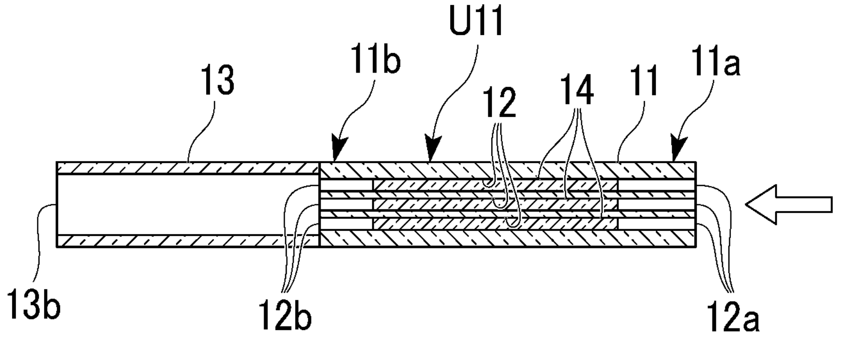
FIG. 38B is a cross-sectional view for illustrating a rod inserting step performed after the step of FIG. 38A.
Figure 38C:
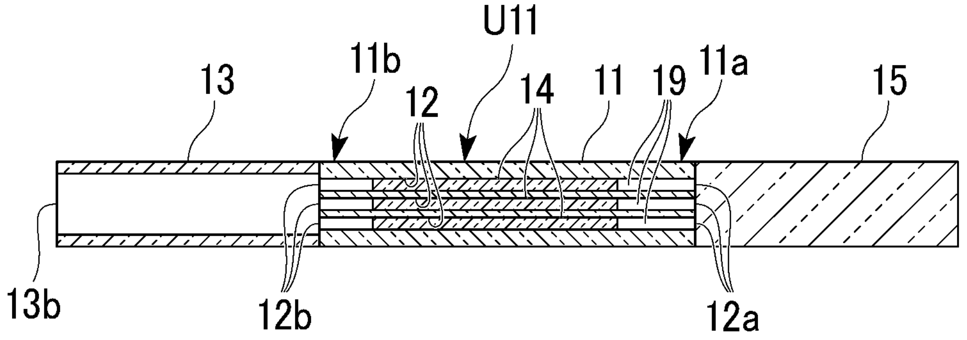
FIG. 38C is a cross-sectional view for illustrating a dummy rod integrating step performed after the step of FIG. 38B.
Figure 38D:
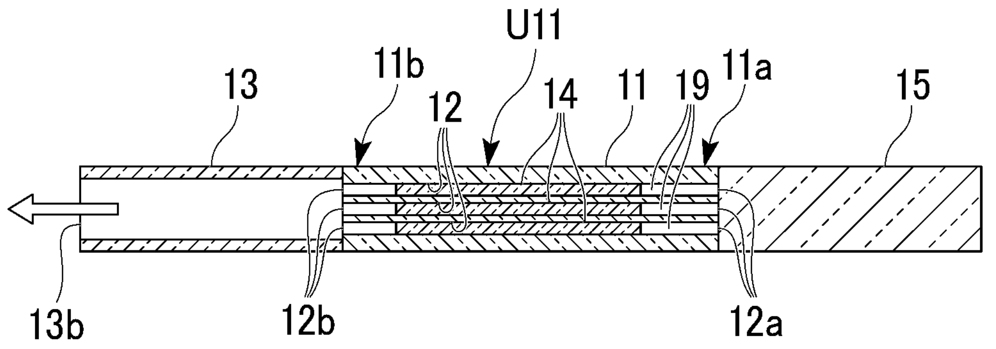
FIG. 38D is a cross-sectional view for illustrating a vacuum suctioning step performed after the step of FIG. 38C.
Figure 38E:
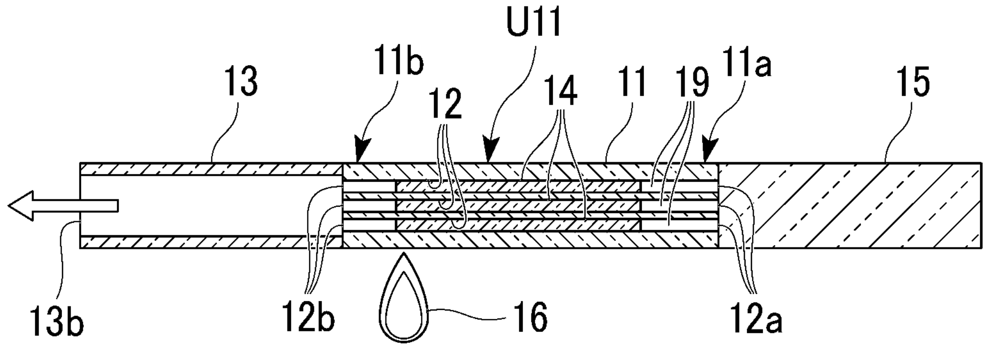
FIG. 38E is a cross-sectional view for illustrating thermal cutting of the second end portion tip of the cladding glass body in the tip sealing step performed after the step of FIG. 38D.
Figure 38F:
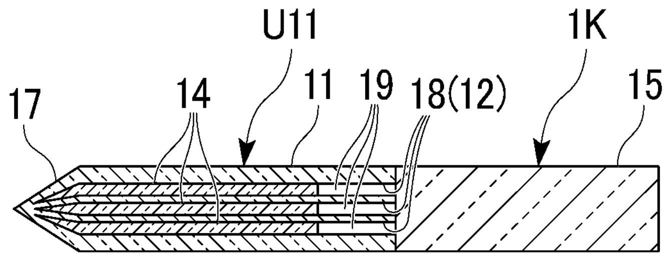
FIG. 38F is a cross-sectional view showing the structure of the optical fiber preform obtained by completing the tip sealing step of FIG. 38E.

FIG. 38F is a vertical cross-sectional view showing the optical fiber preform 1K of one or more embodiments.

The optical fiber preform 1K in which the gap portion 19 is secured in the inside thereof as shown in FIG. 38F is produced by the optical fiber preform production method of one or more embodiments.

The configuration of the optical fiber preform 1K in FIG. 38F is the same as the configuration of the optical fiber preform 1I (FIG. 36G) described in one or more embodiments.

The optical fiber preform production method of one or more embodiments discussed below is the optical fiber preform production method of one or more embodiments described above, with the following points changed. The core glass rods 14 shorter than the length of the through-holes 12 of the cladding glass body 11 in the axial direction are used.

In the optical fiber preform production method of one or more embodiments, in a state where the core glass rods 14 inserted into the through-holes 12 of the cladding glass body 11 are away from both ends in the axial direction of the through-holes 12 to the central portion side, the dummy rod integrating step (FIG. 38C) and the tip sealing step (FIG. 38E and FIG. 38F) are performed.

The gap portion 19 of the optical fiber preform 1K shown in FIG. 38F is a region (space) where the core glass rods 14 are not inserted. The gap portion 19 is formed by sealing both ends in the axial direction of the through-holes 12 of the cladding glass body 11 by the dummy rod integrating step and the tip sealing step after the rod inserting step. The gap portion 19 is formed on the first end portion 11_a_ (right end in FIG. 38F) side of the inner holes 18.

In the optical fiber preform production method of one or more embodiments, as shown in FIG. 38A, first, the dummy silica tube 13 is welded and connected to the second end portion 11_b_ of the cladding glass body 11 in the same manner as the dummy silica tube welding step of one or more embodiments described above (dummy silica tube welding step).

This dummy silica tube welding step is performed in the same manner as the dummy silica tube welding step of one or more embodiments and detailed description thereof will be omitted.

Next, as shown in FIG. 38B, the core glass rods 14 are inserted into each of the plurality of through-holes 12 of the cladding glass body 11 (rod inserting step).

It is possible to perform the rod inserting step in the same manner as the rod inserting step of one or more embodiments.

However, as shown in FIG. 38B, the rod inserting step may include setting a state in which the core glass rods 14 inserted into the through-holes 12 of the cladding glass body 11 are away from both ends in the axial direction of the through-holes 12 to the central portion side.

By performing the rod inserting step, a glass material unit U11 with a configuration in which the core glass rods 14 are inserted into each of the plurality of through-holes 12 of the cladding glass body 11 is obtained.

The rod inserting step may include inserting a core identifying marker glass rod instead of the core glass rods 14 into one or more through-holes among the plurality of through-holes 12 of the cladding glass body 11. For both types of insertion glass rods, that is, the core glass rods 14 and the core identifying marker glass rod, an insertion manner which is the same as the insertion manner of the core glass rods 14 described in one or more embodiments with respect to the cladding glass body 11 is adopted.

In the same manner as one or more embodiments, an etching step, a cleaning step, and a drying step may be performed between the dummy silica tube welding step and the rod inserting step.

Since the etching step, the cleaning step, and the drying step are the same as one or more embodiments, detailed description thereof is omitted.

Following the rod inserting step, a solid dummy silica rod 15 made of silica glass is welded and integrated with the first end portion 11_a_ of the cladding glass body 11 as shown in FIG. 38C. Due to this, the first opening portion 12_a_ of the cladding glass body 11 is closed and hermetically sealed by the dummy silica rod 15 (dummy rod integrating step).

However, as shown in FIG. 38C, the dummy rod integrating step is performed in a state where the core glass rods 14 inserted into the through-holes 12 of the cladding glass body 11 are away from both ends in the axial direction of the through-holes 12 to the central portion side.

The dummy rod integrating step is the same as the dummy rod integrating step of one or more embodiments, except that the core glass rods 14 inserted into the through-holes 12 of the cladding glass body 11 are away from both ends in the axial direction of the through-holes 12 to the central portion side and detailed description thereof is omitted.

When the dummy rod integrating step is completed, next, as shown in FIG. 38D, in the same manner as the vacuum suctioning step of one or more embodiments, a vacuum pump (not shown) is connected to the second tip opening end 13_b_ of the dummy silica tube 13 and the insides of the through-holes 12 of the cladding glass body 11 are vacuum suctioned by driving the vacuum pump (vacuum suctioning step).

Since the vacuum suctioning step is the same as the vacuum suctioning step of one or more embodiments, detailed description thereof is omitted.

As shown in FIG. 38E and FIG. 38F, in the optical fiber preform production method of one or more embodiments, after starting the vacuum suctioning step, the glass material unit U11 second end portion including the cladding glass body 11 second end portion 11_b_ is heated and reduced in diameter to close and hermetically seal all of the second opening portions 12_b_ of the cladding glass body 11 (tip sealing step).

It is possible to perform the tip sealing step in the same manner as one or more embodiments, except that the core glass rods 14 inserted into the through-holes 12 of the cladding glass body 11 are away from both ends in the axial direction of the through-holes 12 to the central portion side.

In the tip sealing step, in a state where the vacuum suctioning by the vacuum pump is continued, the glass material unit U7 second end portion including the cladding glass body 11 second end portion 11_b_ is heated and reduced in diameter using the flame 16 (for example, an oxyhydrogen flame) or the like. The tip sealing portion 17 is formed by closing and hermetically sealing the second opening portions 12_b_ of all the through-holes 12 of the cladding glass body 11.

The tip sealing portion 17 is solidified by heating and reducing the diameter of the cladding glass body 11 second end portion 11*b* together with the tip end portions of the core glass rods 14 on the inside thereof.

As shown in FIG. 38F, in the tip sealing step of one or more embodiments, the tip sealing portion 17 in which the second end portion of the glass material unit U11 is processed into a tapered shape at the tip is formed.

In addition, in the tip sealing step of one or more embodiments, in the process of forming the tip sealing portion 17 with a tapered shape at the tip, the tip of the glass material unit U11 second end portion is thermal cut to remove the dummy silica tube 13 from the cladding glass body 11.

However, the tip sealing step starts in a state where the core glass rods 14 inserted into the through-holes 12 of the cladding glass body 11 are away from both ends in the axial direction of the through-holes 12 to the central portion side. Furthermore, the glass material unit U11 second end portion is thermal cut to remove the dummy silica tube 13 from the cladding glass body 11, so as to also remove the tips of the side near to the second end portions of the core glass rods 14 inserted into the through-holes 12 of the cladding glass body 11. Then, in the tip sealing step of one or more embodiments, the tip sealing portion 17 is formed by heating and reducing the diameter of the glass material unit U11 second end portion after thermal cutting, together with the core glass rods 14 in the inside thereof.

The tip sealing step of one or more embodiments discussed below is performed in the same manner as the tip sealing step of one or more embodiments described above, except for the following points. The tip sealing step starts in a state where the core glass rods 14 inserted into the through-holes 12 of the cladding glass body 11 are away from both ends in the axial direction of the through-holes 12 to the central portion side, and the tip side of the second end portion of the glass material unit U11 is thermal cut to remove the dummy silica tube 13 and the core glass rods 14 from the cladding glass body 11.

When the tip sealing step is completed, the inner holes 18 are secured in the inside of the cladding glass body 11. In the inner holes 18, the first end portion 11*a* sides of the through-holes 12 are hermetically sealed by the dummy silica rod 15 and the second end portion 11*b* sides are hermetically sealed by the tip sealing portion 17.

In the tip sealing step, the tip sealing portion 17 is formed by applying a vacuum pressure of 1 kPa or less to the through-holes 12 of the cladding glass body 11 by vacuum suctioning by a vacuum pump, so as to obtain an optical fiber preform 1K having the inner holes 18 with an internal pressure which is a negative pressure (for example, 1 kPa or less).

When the tip sealing step is completed, the inner holes 18 with a configuration having the gap portion 19 are secured in the cladding glass body 11. The gap portion 19 is arranged on the first end portion (right end in FIG. 38F) side of the cladding glass body 11. In the axial direction, the core glass rods 14 are not inserted into the gap portion 19. In the axial direction, the core glass rods 14 are inserted in a region other than the gap portion 19 of the inner holes 18.

As the insertion glass rods such as the core glass rods 14 used for producing the optical fiber preform according to one or more embodiments of the present invention, it is possible to suitably use glass rods with outer diameters of 80% to 98% of the inner diameters of the through-holes 12 of the cladding glass body 11. In order to increase the accuracy of arranging the core at the target position in the optical fiber 2 obtained by drawing, the outer diameters of the insertion glass rods may be 90% to 98% of the inner diameters of the through-holes 12 of the cladding glass body 11, or may be 95% to 98%.

Even in the optical fiber preform production method and the optical fiber preform of one or more embodiments, since inner holes with a negative pressure are secured in the optical fiber preform, there is no need to perform vacuum suctioning in the preform when drawing the optical fiber. As a result, it is possible to secure a large effective drawing region in the optical fiber preform in the axial direction and to easily realize an increase in the drawing length of the optical fiber.

In addition, in the optical fiber preform production method and the optical fiber preform of one or more embodiments, in the producing of the optical fiber using the optical fiber preform, the volumes of the inner holes 18 are reduced as the integration of the cladding glass body 11 with the insertion glass rods progresses. Even in this case, in one or more embodiments, it is possible to suppress an increase in the internal pressure of the inner holes 18 by the gap portion 19 in the cladding glass body 11. As a result, in the production of an optical fiber using an optical fiber preform, it is possible to draw an optical fiber having a sufficient length while maintaining a negative pressure in the internal pressure of the inner holes 18 in the drawing step.

Here, for the optical fiber preforms of one or more embodiments, it is also possible to use the drawing device 50 illustrated in FIG. 7 for the drawing of the optical fiber in the same manner as the optical fiber preform 1A.

The optical fiber preforms of one or more embodiments each have a dummy silica rod 15 connected to the first end portion 11*a* of the cladding glass body. The dummy silica rod 15 secures a protruding portion which protrudes from the first end portion 11*a* of the cladding glass body 11.

In the optical fiber preforms of one or more embodiments, in a case where the drawing device 50 illustrated in FIG. 7 is used in the drawing of the optical fiber, the protruding portion of the dummy silica rod 15 protruding from the first end portion 11*a* of the cladding glass body 11 is attached to the lifting frame 51*a*, and is suspended from the lifting frame 51*a* such that the tip sealing portion 17 is at the lower end.

Next, one or more embodiments of an optical fiber preform production method, an optical fiber preform, and an optical fiber production method will be described with reference to FIG. 39A to FIG. 39E.

In FIG. 39A to FIG. 39E, the same reference numerals are assigned to the same components as those in FIG. 15 to FIG. 20 and description thereof will be omitted or simplified.

Figure 39A:
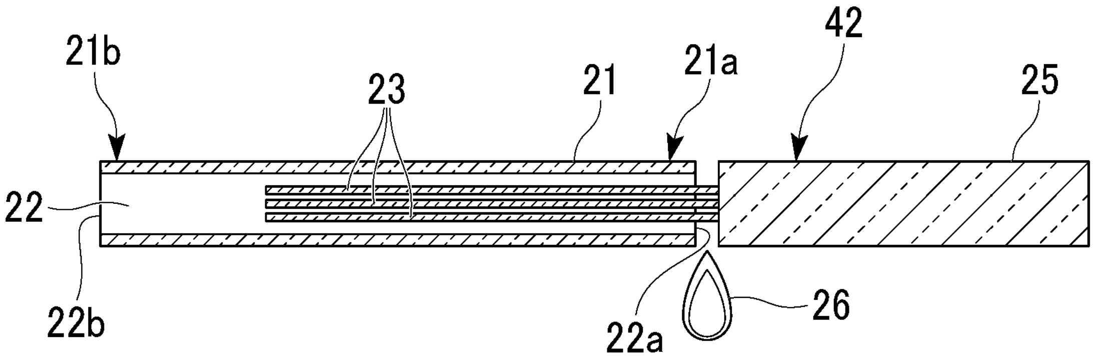
FIG. 39A is a cross-sectional view for illustrating an example of a method for assembling a glass material unit used in a silica powder filling step of an optical fiber preform production method according to one or more embodiments of the present invention.
Figure 39B:
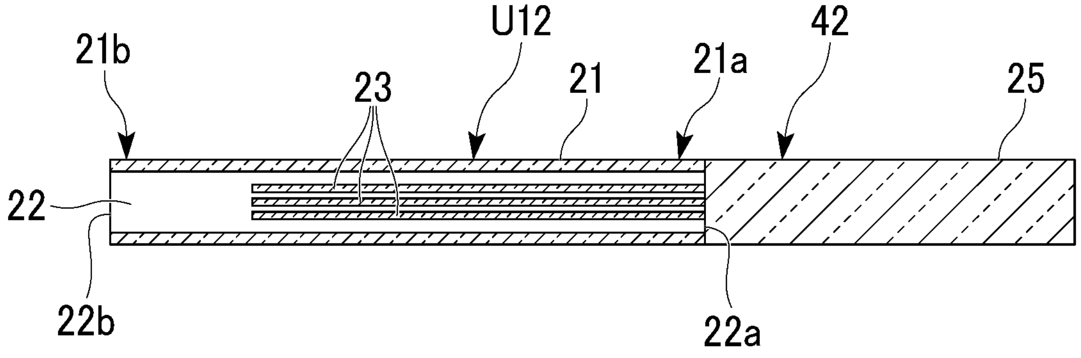
FIG. 39B is a cross-sectional view for illustrating a glass material unit assembled by the assembling method of FIG. 39A.
Figure 39C:
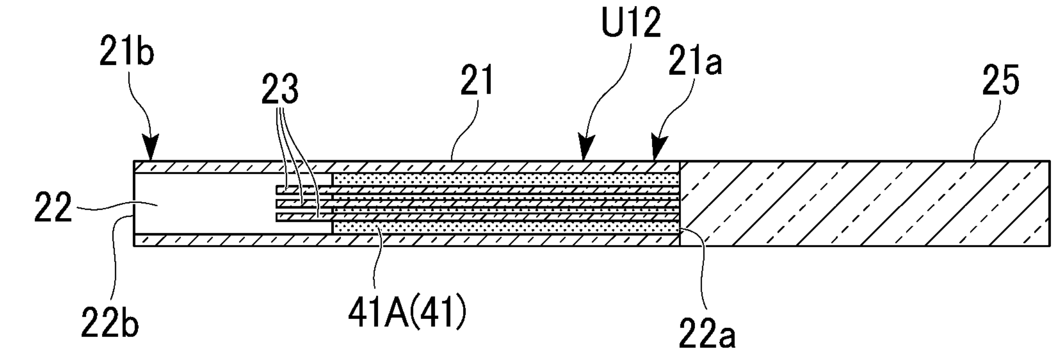
FIG. 39C is a cross-sectional view for illustrating the silica powder filling step of the optical fiber preform production method according to one or more embodiments of the present invention.
Figure 39D:
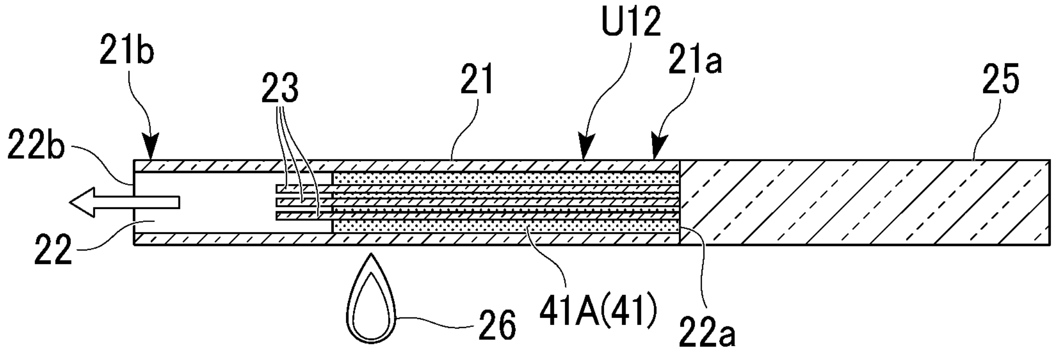
FIG. 39D is a cross-sectional view for illustrating a vacuum suctioning step performed after the step of FIG. 39C.
Figure 39E:
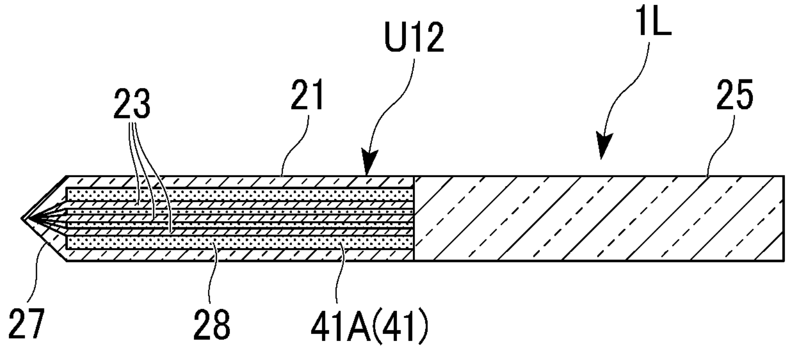
FIG. 39E is a cross-sectional view for illustrating the tip sealing step performed after the step of FIG. 39D.

FIG. 39E is a vertical cross-sectional view showing the optical fiber preform 1L of one or more embodiments.

An optical fiber preform 1L having the inner holes 28 filled with silica powder 41 in the inside thereof as shown in FIG. 39E is produced by the optical fiber preform production method of one or more embodiments.

In the optical fiber preform production method of one or more embodiments, first, a glass material unit U12 with the configuration shown in FIG. 39B is prepared by the method described below. As shown in FIG. 39C, the silica powder 41 is filled into the through-hole 22 of the cylindrical shaped cladding glass body 21 of the glass material unit U12 (silica powder filling step).

The glass material unit U12 has the cladding glass body 21, the dummy silica rod 25, and the plurality of glass rods 23. The cladding glass body 21 has a cylindrical shape and the through-holes 22. The plurality of glass rods 23 are arranged inside the through-holes 22. The dummy silica rod 25 is solid and is welded and integrated with the first end portion 21*a* of the cladding glass body 21 and the first end portions of the plurality of glass rods 23. The dummy silica rod 25 seals the first end portions of the through-holes 22.

The glass rods 23 are supported by the dummy silica rod 25 with an orientation along the axis of the through-hole 22 of the cladding glass body 21.

The plurality of glass rods 23 of the glass material unit U12 shown in FIG. 39B are supported by the dummy silica rod 25 at intervals to each other. In addition, the glass rods 23 are supported by the dummy silica rod 25, and are positioned away from the inner surface of the through-hole 22 of the cladding glass body 21.

The glass material unit U12 is assembled, for example, as follows (refer to FIG. 39A).

(1) The glass rods 23 are inserted into the through-hole 22 of the cladding glass body 21. At this time, the first end portions of the glass rods 23 protrude from the first end portion 21*a* of the cladding glass body 21.

(2) The first end portions of the protruding glass rods 23 are welded to the dummy silica rod 25 to produce a rod unit 42 with a configuration in which the glass rods 23 are fixed to one end of the dummy silica rod 25.

(3) Furthermore, the dummy silica rod 25 is welded and integrated with the first end portion 21*a* of the cladding glass body 21.

However, the assembling method of the glass material unit U12 is not limited to the method illustrated in FIG. 39A and it is possible to change the method as appropriate.

As shown in FIG. 39C, silica powder is filled into the through-hole 22 from the second opening portion 22*b* of the cladding glass body 21 (silica powder filling step).

For example, in the silica powder filling step shown in FIG. 39C, silica powder is not filled in the side near to the second end portion of the glass rods 23. A configuration in which, in the through-hole 22 of the cladding glass body 21, the silica powder 41 is filled in the through-hole 22 so as to fill in the entire region on the side near to the first end portion of the glass rods 23 is illustrated. In the silica powder filling step shown in FIG. 39C, the silica powder 41 is not filled between the region where the second end portions of the glass rods 23 are positioned in the axial direction and the region on the side near to the second end portion of the through-hole 22.

However, in the silica powder filling step, the filling length of the silica powder 41 in the axial direction may be longer than the accommodation length of the glass rods 23 (accommodated rod length). That is, the entire accommodated rod length of the glass rods 23 positioned in the through-hole 22 may be filled in with the silica powder 41.

Following the silica powder filling step, as shown in FIG. 39D, a vacuum pump (not shown) is connected to the second end portion 21*b* of the cladding glass body 21, and the inside of the through-hole 22 of the cladding glass body 11 is vacuum suctioned by driving the vacuum pump (vacuum suctioning step).

Since the vacuum suctioning step is the same as the vacuum suctioning step of the one or more embodiments, detailed description thereof is omitted.

As shown in FIG. 39D and FIG. 39E, in the optical fiber preform production method of one or more embodiments, after the vacuum suctioning step is started, the second end portion of the glass material unit U12 including the second end portion 21*b* of the cladding glass body 21 is heated and reduced in diameter to close and hermetically seal the second opening portion 22*b* of the cladding glass body 21 (second end portion sealing step).

It is possible to perform the second end portion sealing step in the same manner as the tip sealing step according to one or more embodiments.

In the second end portion sealing step, in a state where the vacuum suctioning is continued by the vacuum pump, the second end portion of the glass material unit U12 including the second end portion 21*b* of the cladding glass body 21 is heated and reduced in diameter using the flame 26 (for example, an oxyhydrogen flame) or the like to form the tip sealing portion 27 which closes the second opening portions 22*b* of the cladding glass body 21.

The tip sealing portion 27 is solidified by heating and reducing the diameter of the second end portion 21*b* of the cladding glass body 21 together with the tip end portions (second end portions) of the glass rods 23 on the inside thereof.

In one or more embodiments, the second end portion sealing step is also referred to below as a tip sealing step.

As shown in FIG. 39E, in the tip sealing step of one or more embodiments, the tip sealing portion 27 in which the second end portion of the glass material unit U12 is processed into a tapered shape at the tip is formed.

When the tip sealing step is completed, the inner hole 28 is secured in the inside of the cladding glass body 21. In the inner hole 28, the first end portion of the through-hole 22 is hermetically sealed by the dummy silica rod 25 and the second end portion is hermetically sealed by the tip sealing portion 27.

In the tip sealing step, the tip sealing portion 27 is formed while applying a vacuum pressure of 1 kPa or less to the through-hole 22 of the cladding glass body 21 by vacuum suctioning by a vacuum pump. Due to this, the optical fiber preform 1L having the inner hole 28 with an internal pressure which is a negative pressure (for example, 1 kPa or less) is obtained.

In addition, in the optical fiber preform production method of one or more embodiments, as shown in FIG. 39E, the optical fiber preform 1L with a configuration in which the inner hole 28 is filled with the silica powder 41 is obtained.

The inner hole 28 of the optical fiber preform 1L shown in FIG. 39E is filled with silica powder 41 in a sufficient quantity which fills in the entirety thereof.

Also in the optical fiber preform production method and the optical fiber preform of one or more embodiments, since the negative pressure inner hole 28 is secured in the optical fiber preform 1M, there is no need to perform vacuum suctioning in the preform when drawing the optical fiber. As a result, it is possible to secure a large effective drawing region of the optical fiber preform in the axial direction and to easily realize an increase in the drawing length of the optical fiber.

In addition, many minute gaps are present in the region of the silica powder 41 filled in the inner hole 28 (referred to below as a silica powder region 41A).

In the producing of an optical fiber using an optical fiber preform having the inner hole 28 filled with silica powder 41, the volume of the inner hole 28 is reduced as the integration of the cladding glass body 21 with the glass rods 23 progresses. Even in this case, it is possible to suppress an increase in the internal pressure of the inner hole 28 by the gap in the silica powder region 41A in the cladding glass body 21. As a result, in the producing of an optical fiber using the optical fiber preform, it is possible to draw an optical fiber having a sufficient length while maintaining a negative pressure for the internal pressure of the inner hole 28 in the drawing step.

Next, one or more embodiments of the optical fiber preform production method, the optical fiber preform, and the optical fiber production method will be described with reference to FIG. 40A to FIG. 40D.

In FIG. 40A to FIG. 40D, the same reference numerals are assigned to the same components as those in FIG. 39A to FIG. 39E and description thereof will be omitted or simplified.

Figure 40A:
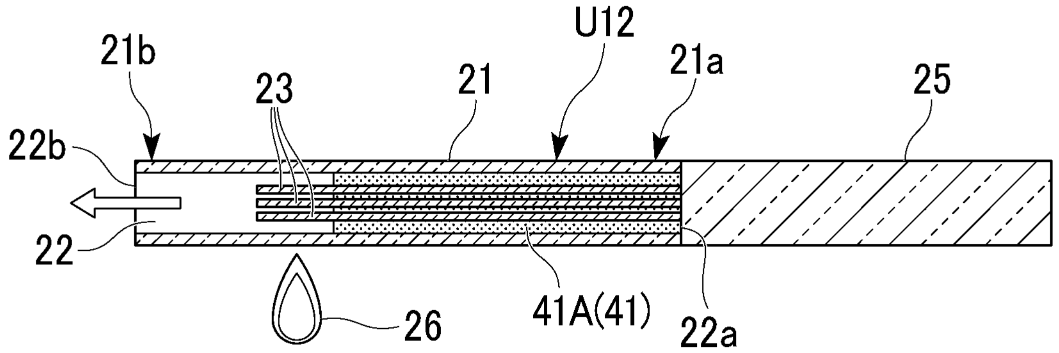
FIG. 40A is a cross-sectional view for illustrating a vacuum suctioning step performed after completion of a silica powder filling step of an optical fiber preform production method according to one or more embodiments of the present invention.
Figure 40B:
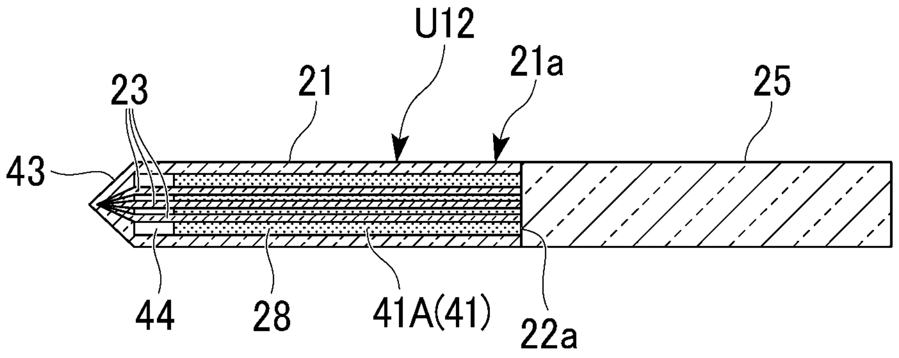
FIG. 40B is a cross-sectional view for illustrating a base end sealing step performed after the step of FIG. 40A.
Figure 40C:
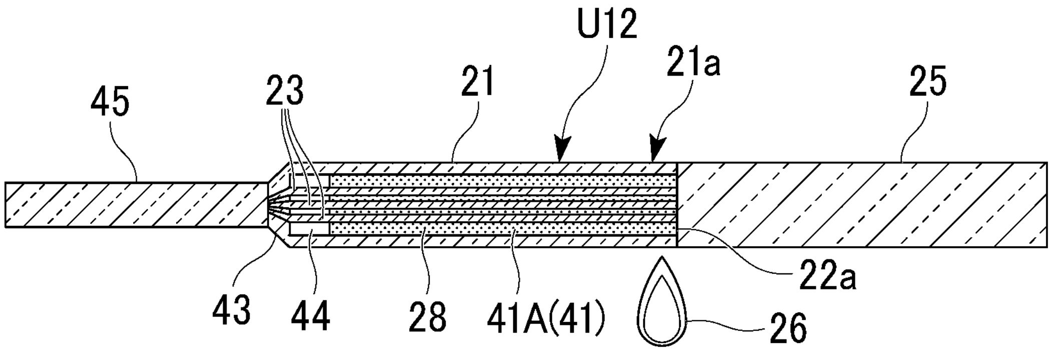
FIG. 40C is a cross-sectional view for illustrating a base end dummy rod integrating step performed after the step of FIG. 40B.
Figure 40D:
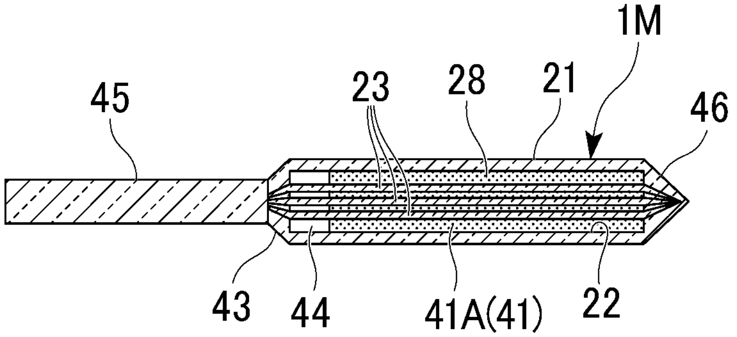
FIG. 40D is a cross-sectional view for illustrating the tip sealing step performed after the step of FIG. 40C.

FIG. 40D is a vertical cross-sectional view showing the optical fiber preform 1M of one or more embodiments.

The optical fiber preform 1M shown in FIG. 40D is produced by the optical fiber preform production method of one or more embodiments.

In the optical fiber preform 1M production method of one or more embodiments, first, a silica powder filling step and a vacuum suctioning step are performed on the glass material unit U12. Next, as shown in FIG. 40A and FIG. 40B, while continuing the vacuum suctioning step, the second end portion of the glass material unit U12 including the second end portion 21*b* of the cladding glass body 21 is heated and reduced in diameter to close and hermetically seal the second opening portion 22*b* of the cladding glass body 21 (second end portion sealing step). Due to this, a base end sealing portion 43 with the same configuration as the tip sealing portion 27 is formed at the second end portion of the glass material unit U12.

Here, the second end portion sealing step of one or more embodiments is also referred to below as a base end sealing step.

When the base end sealing step is completed, the inner hole 28 is secured in the inside of the cladding glass body 21. In the inner hole 28, the first end portion 21*a* side of the through-hole 22 is hermetically sealed by the dummy silica rod 25 and the second end portion 21*b* side is hermetically sealed by the base end sealing portion 43.

In the base end sealing step, the base end sealing portion 43 is formed while applying a vacuum pressure of 1 kPa or less to the through-hole 22 of the cladding glass body 21 by vacuum suctioning by a vacuum pump. Due to this, the inner hole 28 with an internal pressure which is a negative pressure (for example, 1 kPa or less) is formed.

In addition, as shown in FIG. 40B, in the base end sealing step, a gap portion 44 which is not filled with the silica powder 41 is secured at the second end portion of the inner hole 28. Specifically, the gap portion 44 is arranged in the through-hole 22. Furthermore, the gap portion 44 is arranged between the base end sealing portion 43 and the silica powder region 41A in the axial direction.

In the tip sealing step (second end portion sealing step) of one or more embodiments, the tip sealing portion 27 is formed using the flame 26 (for example, an oxyhydrogen flame). That is, the flame 26 heats the side near to the second end portion (the left side end portion of the silica powder region 41A in FIG. 39D) of the silica powder region 41A in the glass material unit U12 to reduce the diameter of the cladding glass body 21.

On the other hand, as shown in FIG. 40A, in the base end sealing step (second end portion sealing step) of one or more embodiments discussed below, a position where is heated by the flame 26 is different from a position where is heated in the tip sealing step of one or more embodiments described above. That is, the base end sealing portion 43 is formed by heating and reducing the diameter of the portion of the second end portion 21*b* of the cladding glass body 21 where the silica powder 41 is not present (refer to FIG. 40B). Due to this, a gap portion 44 between the base end sealing portion 43 and the silica powder region 41A in the inner hole 28 is secured.

When the base end sealing step is completed, as shown in FIG. 40C, the base end sealing portion 43 is heated to weld and integrate a solid dummy silica rod 45 to the base end sealing portion 43 (base end dummy rod integrating step).

The dummy silica rod 45 is positionally aligned with the glass material unit U12 to be coaxial with the cladding glass body 21, and one end thereof is welded to the base end sealing portion 43.

Following the base end dummy rod integrating step, as shown in FIG. 40C and FIG. 40D, the first end portion of the glass material unit U12 is processed to form the tip sealing portion 46. Furthermore, the dummy silica rod 25 is removed from the first end portion 21*a* of the cladding glass body 21 (first end portion processing step). Due to this, the optical fiber preform 1M shown in FIG. 40D is obtained.

As shown in FIG. 40C and FIG. 40D, in the first end portion processing step, the first end portion of the glass material unit U12 is heated and reduced in diameter by the flame 26. Due to this, the tip sealing portion 46 in which the first end portion of the glass material unit U12 is processed into a tapered shape at the tip is formed. In addition, in the first end portion processing step, in the process of forming the tip sealing portion 46, the dummy silica rod 25 is removed from the first end portion 21*a* of the cladding glass body 21.

The tip sealing portion 46 is solidified by heating and reducing the diameter of the first end portion 21*a* of the cladding glass body 21 together with the tip end portions of the glass rods 23 on the inside thereof. The tip sealing portion 46 may include a portion in which the silica powder 41 in the through-hole 22 of the cladding glass body 21 is vitrified by heating.

The tip sealing portion 46 hermetically seals the first end portion of the inner hole 28.

It is also possible for the production method for producing the optical fiber preform 1M of FIG. 40D to adopt a configuration in which the order of the base end dummy rod integrating step and the first end portion processing step after completion of the base end sealing step is reversed.

In addition, based on the production method described above, it is also possible for the production method for producing the optical fiber preform 1M of FIG. 40D to adopt a configuration which is changed such that the first end portion processing step is performed before the silica powder filling step or after completion of the silica powder filling step and before the vacuum suctioning step.

In the optical fiber preform 1M in FIG. 40D, the side where the dummy silica rod 45 is positioned is treated as the base end and the side where the tip sealing portion 46 is positioned is treated as the tip.

In the producing of an optical fiber using the optical fiber preform 1M in FIG. 40D, the volume of the inner hole 28 is reduced as the integration of the cladding glass body 21 with the glass rods 23 progresses. Even in such a case, it is possible to prevent the internal pressure of the inner hole 28 from increasing due to the gap in the silica powder region 41A in the cladding glass body 21 and the gap portion 44 in the inner hole 28. As a result, in the producing of an optical fiber using the optical fiber preform 1M, it is possible to draw an optical fiber with sufficient length while maintaining the negative pressure in the internal pressure of the inner hole 28 in the drawing step.

In the production methods of optical fiber preforms 1L and 1M according to one or more embodiments, in the vacuum suctioning step, after alternately performing the supply of helium gas from the gas supply apparatus connected to the second end portion 21*b* of the cladding glass body 21 to the through-hole 22 of the cladding glass body 21 and the vacuum suctioning by the vacuum pump, the second end portion sealing step may be performed while continuing the vacuum suctioning. With this configuration, it is possible to limit the gas remaining in the through-hole 22 of the cladding glass body 21 to helium gas. Even if helium gas remains in the inner hole 28 formed by the second end portion sealing step, the helium gas is easily released from the glass at the time of vitrification of the silica powder 41 together with the drawing of the optical fiber from the optical fiber preforms 1L and 1M. For this reason, limiting the gas remaining in the through-hole 22 of the cladding glass body 21 to helium gas makes it possible to prevent bubbles from being mixed into the optical fiber.

The glass material unit U12 used in one or more embodiments is not limited to the configuration illustrated in FIG. 39B.

Figure 41A:
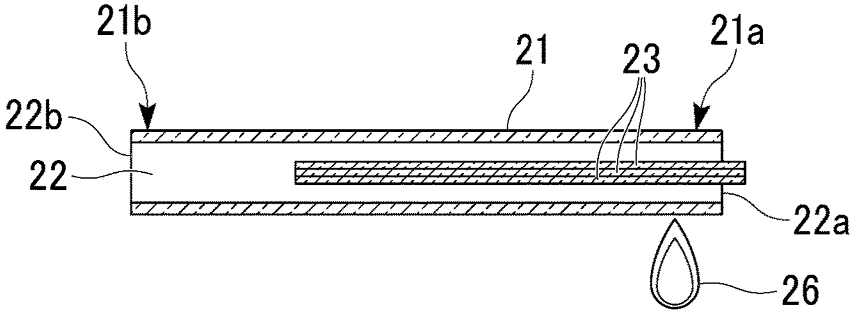
FIG. 41A is a cross-sectional view for illustrating a step of forming a first end portion sealing portion in a method for assembling a glass material unit of a modified example used in a silica powder filling step.
Figure 41B:
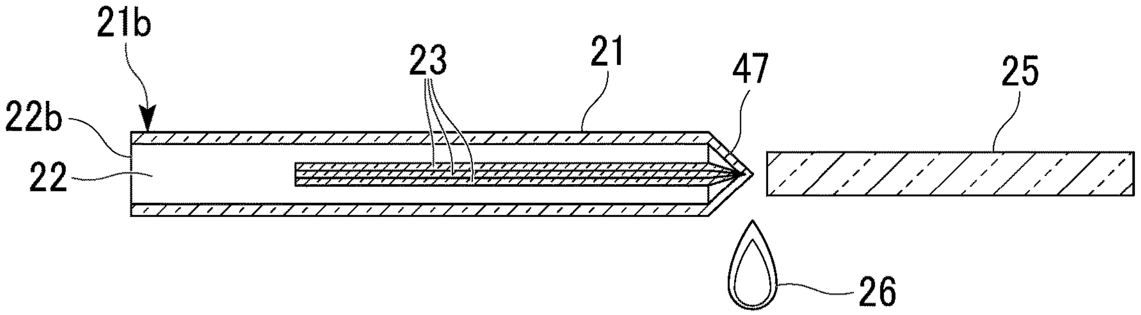
FIG. 41B is a cross-sectional view for illustrating a step of welding and integrating a dummy rod by heating the first end portion sealing portion formed in the step of FIG. 41A.
Figure 41C:
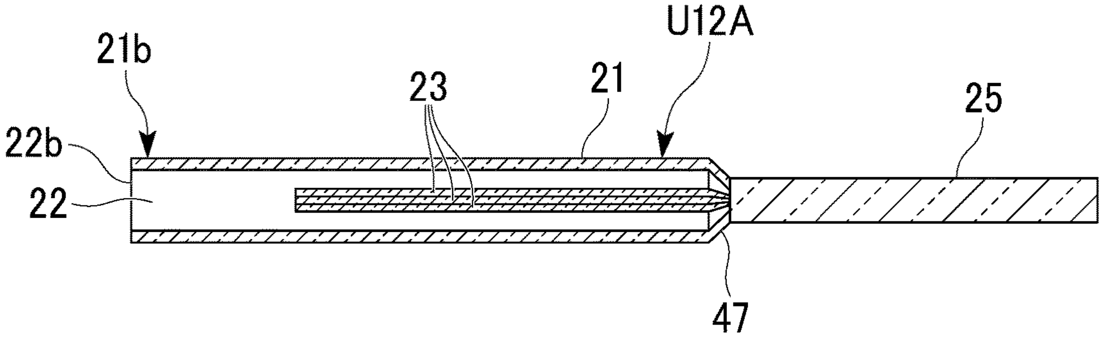
FIG. 41C is a cross-sectional view showing a glass material unit obtained by completing the step of FIG. 41B.

For example, as shown in FIG. 41C, it is also possible to adopt a glass material unit U12A with a configuration in which the dummy silica rod 25 is welded to and integrated with a first end portion sealing portion 47. The first end portion sealing portion 47 is formed by hermetically sealing the first opening portion 22*a* of the cladding glass body 21.

In the method for assembling the glass material unit U12A of FIG. 41C, (1) first, as shown in FIG. 41A, glass rods 23 are inserted into the through-hole 22 of the cladding glass body 21. (2) Next, as shown in FIG. 41A and FIG. 41B, the first end portion 21*a* of the cladding glass body 21 and the first end portions of the glass rods 23 are heated and reduced in diameter using the flame 26 to form the first end portion sealing portion 47. (3) Furthermore, the first opening portion 22*a* of the first end portion 21*a* of the cladding glass body 21 is hermetically sealed. (4) Next, as shown in FIG. 41B and FIG. 41C, the dummy silica rod 25 is welded to and integrated with the first end portion sealing portion 47.

In the method for assembling the glass material unit U12A shown in FIG. 41A to FIG. 41C, a glass rod bundle in which the plurality of glass rods 23 are bundled is inserted into the through-hole 22 of the cladding glass body 21. After the glass rod bundle is inserted, the first end portion sealing portion 47 in which the first end portion 21*a* of the cladding glass body 21 and the first end portion of the glass rod bundle on the inside thereof are heated and reduced in diameter is formed.

Figure 42:
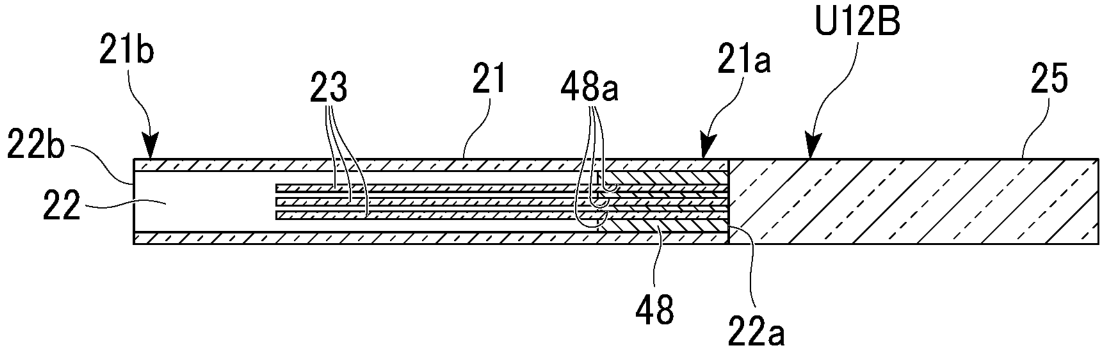
FIG. 42 is a cross-sectional view showing a glass material unit of another modified example used in the silica powder filling step.

However, it is also possible for the glass material unit to adopt a configuration having a first end portion sealing portion formed by the following method. As shown in FIG. 42, for example, using rod supports 48 or the like which are removable from the glass rods 23, both of each first end portion of the plurality of glass rods 23 supported at intervals from each other and a first end portion of the cladding glass body 21 may be heated and reduced in diameter.

For the glass material unit, for example, it is also possible to adopt a glass material unit U12B shown in FIG. 42. The glass material unit U12B is welded with the dummy silica rod 25 which hermetically seals the first opening portion 22*a* of the first end portion 21*a* of the cladding glass body 21. Furthermore, the glass rods 23 and the rod support 48 are accommodated in the through-hole 22 of the cladding glass body 21 of the glass material unit U12B. Rod support holes 48*a* are formed through the rod support 48.

The glass rods 23 of the glass material unit U12B of FIG. 42 are inserted into the rod support holes 48*a* of the rod support 48 and supported in the orientation along the axis of the cladding glass body 21.

The plurality of rod support holes 48*a* are formed to penetrate in an orientation along the axial direction in the rod support 48 in FIG. 42. It is possible for the rod support 48 in FIG. 42 to support the plurality of glass rods 23 in a state in which they are spaced apart from each other.

In the producing of the optical fiber preform 1M using the glass material unit U12B of FIG. 42, for example, a second end portion sealing step is performed as shown in FIG. 40B. Thereafter, for example, in the first end portion processing step shown in FIG. 40D, the tip sealing portion 46 is formed. In this process, both the rod support 48 and the dummy silica rod 25 are removed from the cladding glass body 21.

In addition, in a case where the rod support 48 which is adopted is made of glass which is a part of the cladding of the optical fiber, the tip sealing portion 46 including apart of the rod support 48 may be formed in the first end portion processing step.

The optical fiber preform production method having the silica powder filling step and the tip sealing step is not limited to any embodiments and is applicable to various embodiments of an optical fiber preform production method according to the present invention.

For the optical fiber preforms of one or more embodiments, in the same manner as the optical fiber preform 1A, it is possible to use the drawing device 50 illustrated in FIG. 7 for the drawing of the optical fiber.

In the optical fiber preforms of one or more embodiments, in a case where the drawing device 50 illustrated in FIG. 7 is used in the drawing of the optical fiber, the dummy silica rods 25 or 45 is attached to the lifting frame 51*a* and suspended on the lifting frame 51*a* such that the tip sealing portions 27 or 46 are at the lower end.

The internal pressure before the start of drawing the inner hole of the optical fiber preform according to one or more embodiments of the present invention may be set such that it is possible to maintain a negative pressure from the start of the drawing step to the completion, for example, approximately more than 1 kPa to 20 kPa. In the producing of the optical fiber preform, for example, inner holes having an internal pressure of 20 kPa or less are formed, and a negative pressure in the inner holes is secured in the drawing step. If the internal pressure of the inner holes of the optical fiber preform before the start of drawing is 20 kPa or less, it is possible to draw an optical fiber having a sufficient length while maintaining the negative pressure in the inner holes in the drawing step.

The internal pressure of the inner holes is, for example, 20 kPa or less, but may be 10 kPa or less, or 1 kPa or less.

The present invention was described based on one or more embodiments; however, the present invention is not limited to these embodiments described above and it is possible to make various modifications thereto without departing from the gist of the present invention.

For example, in the optical fiber preform production method having inner holes with an internal pressure of 10 kPa or less, the vacuum suctioning step may be omitted. In this case, an inner hole internal pressure of 10 kPa or less may be secured by a decrease in the internal pressure of the inner holes accompanying cooling of the heated optical fiber preform after completion of the tip sealing step.

In addition, it is sufficient if the rod inserting step of the optical fiber preform production method is performed before completion of one or both of the dummy rod integrating step and the tip sealing step, without being limited to the order of the steps of the embodiments described above.

In addition, the cladding glass bodies 11 and 21 described above may be formed in a shape other than a cylindrical shape such as a rectangular tube shape which accommodates the plurality of glass rods 14 and 23 in each one of the through-holes 12 and 22, without being limited to the cylindrical shape described above.

In the optical fiber preform production method, it is also possible to adopt the following configuration. For example, in the dummy rod integrating step, the core glass rods 14 inserted into the through-hole of the cladding glass body are away from the second end portions of the through-holes to the side near to the first end portion. Furthermore, the tip sealing step is performed in a state where a gap portion is not secured on the side near to the first end portion of the through-holes and a gap portion is secured only on the side near to the second end portion of the through-holes. In this case, in the tip sealing step, the second end portion tip side of the glass material unit is thermal cut. Due to this, the dummy silica tube 13 and the tips of the core glass rods 14 are removed from the side near to the second end portion of the cladding glass body 11. At the second end portion of the glass material unit after thermal cutting, a tip sealing portion is formed by the heating and reduction in the diameter of the glass material unit.

It is also possible for the optical fiber preform production method to adopt, for example, based on the optical fiber preform production methods of one or more embodiments, a configuration in which the dummy rod integrating step and the tip sealing step are changed to the dummy rod integrating step and the tip sealing step described above.

REFERENCE SIGNS LIST

1A to 1M optical fiber preform
2 optical fiber
11, 21 cladding glass body
11*a*, 21*a* first end portion
11*b*, 21*b* second end portion
12, 22 through-hole
12*a*, 22*a* first opening portion
12*b*, 22*b* second opening portion
13 dummy silica tube
13*b* second tip opening end
131 first dummy silica tube
131*a* first tip opening end
132 second dummy silica tube
131*b* second tip opening end
14, 23 glass rod (core glass rod)
15, 25, 45 dummy silica rod
16, 26 flame
17, 27, 46 tip sealing portion
18, 28 inner hole
19, 44 gap portion
24, 43 base end sealing portion
41 silica powder
41A silica powder region
42 rod unit
47 first end portion sealing portion
48 rod support
48*a* rod support hole
50 drawing device Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical fiber preform comprising:
a cladding glass body that is a cladding of an optical fiber, is cylindrical, and comprises inner holes along an axial direction;
glass rods that are cores of the optical fiber, and that are each accommodated in a respective one of the inner holes; and
a single dummy silica rod that is fixed to a first end of the cladding glass body and that has an outer diameter that covers all of the inner holes at the first end of the cladding glass body,
wherein
in the first end of the cladding glass body, a first end of the inner holes are closed by the single dummy silica rod, and
in a second end of the cladding glass body opposite to the first end of the cladding glass body, a second end of the inner holes are closed by a tip seal.

2. The optical fiber preform according to claim 1, wherein gaps in which the glass rods are not inserted into the inside of the inner holes in the axial direction are formed on a side closer to the first end of the inner holes.

3. The optical fiber preform according to claim 1, wherein the inner holes accommodate silica powder in a quantity that fills an entirety of the inner holes, or in a quantity that forms gaps in which the silica powder is not present in an inside of the inner holes in the axial direction.

4. The optical fiber preform according to claim 1, wherein an internal pressure of the inner holes is 20 kPa or less.

5. The optical fiber preform according to claim 4, wherein the internal pressure of the inner holes is 1 kPa or less.

6. The optical fiber preform according to claim 1, wherein the inner holes that accommodate the glass rods are hermetically sealed.

7. The optical fiber preform according to claim 1, wherein an internal pressure in the inner holes is negative relative to atmospheric pressure.

8. The optical fiber preform according to claim 1, wherein an outer diameter of each of the glass rods is within a range from 80% to 98% of an inner diameter of each of the inner holes.

9. An optical fiber preform comprising:
a cladding glass body that is a cladding of an optical fiber, is cylindrical, and comprises inner holes along an axial direction;
glass rods that are cores of the optical fiber, and that are each accommodated in a respective one of the inner holes;
a connecting glass tube fixed to a first end the cladding glass body; and
a single dummy silica rod that abuts the first end of the cladding glass body, that is accommodated inside of the connecting glass tube, and that is fixed to the connecting glass tube, wherein
in the first end of the cladding glass body, a first end of the inner holes are closed by the single dummy silica rod and the connecting glass tube,
in a second end of the cladding glass body opposite to the first end of the cladding glass body, a second end of the inner holes are closed by a tip seal.

10. The optical fiber preform according to claim 9, wherein the first end of the inner holes are closed without a gap between the single dummy silica rod and the connecting glass tube.

* * * * *